US007590976B2

(12) United States Patent
Kawai et al.

(10) Patent No.: US 7,590,976 B2
(45) Date of Patent: Sep. 15, 2009

(54) COMPILER PROGRAM, A COMPUTER-READABLE STORAGE MEDIUM STORING A COMPILER PROGRAM, A COMPILING METHOD AND A COMPILING UNIT

(75) Inventors: Masaki Kawai, Seto (JP); Takuji Kawamoto, Nagoya (JP); Shusuke Haruna, Itami (JP); Yutaka Fujihara, Yawata (JP)

(73) Assignee: Panasonic Corporation, Osaka (JP)

( * ) Notice: Subject to any disclaimer, the term of this patent is extended or adjusted under 35 U.S.C. 154(b) by 826 days.

(21) Appl. No.: 10/541,458

(22) PCT Filed: Dec. 26, 2003

(86) PCT No.: PCT/JP03/16916

§ 371 (c)(1),
(2), (4) Date: Jul. 6, 2005

(87) PCT Pub. No.: WO2004/161656

PCT Pub. Date: Jul. 22, 2004

(65) Prior Publication Data

US 2006/0095897 A1 May 4, 2006

(30) Foreign Application Priority Data

Jan. 6, 2003 (JP) ............................. 2003-000275
Dec. 1, 2003 (JP) ............................. 2003-402207

(51) Int. Cl.
*G06F 9/45* (2006.01)
(52) U.S. Cl. ........................ 717/140; 717/149; 717/161
(58) Field of Classification Search ....................... None
See application file for complete search history.

(56) References Cited

U.S. PATENT DOCUMENTS 5,339,422 A    8/1994    Brender et al.

(Continued)

FOREIGN PATENT DOCUMENTS

EP         0 745 939          4/1996

(Continued)

OTHER PUBLICATIONS

S. Hoxey, "The PowerPC Compiler Writer's Guide", 'Online! 1966, pp. 1-20, retrieved from the Internet: URL:http://the.wall.riscom.net/books/proc/ppc/cwg> 'retrieved on Jul. 6, 2005.

(Continued)

*Primary Examiner*—Chuck O Kendall
(74) *Attorney, Agent, or Firm*—Wenderoth, Lind & Ponack, L.L.P.

(57) ABSTRACT

The present invention relates a compiler program, a computer-readable storage medium storing such a compiler program, a compiling method and a compiling unit, and an object thereof is to automatically generate a reentrant object program. In order to accomplish this object, an address saving program generator 16a generates an address saving program for saving a data area address of a calling program module; an address setting program generator 16b generates an address setting program for setting a data area address of an other program module; a transferring program generator 16c generates a transferring program for the transfer from the calling program module to the other program module; an address resetting program generator 16d generates an address resetting program for reading and resetting the saved data area address; and an accessing program generator 16e generates an accessing program for accessing a data area for the other program module using a relative address from the set data area address.

29 Claims, 27 Drawing Sheets

U.S. PATENT DOCUMENTS 5,963,982 A     10/1999    Goldman
6,049,667 A *    4/2000    Bates ........................ 717/138
6,093,216 A *    7/2000    Adl-Tabatabai et al. ..... 717/128

FOREIGN PATENT DOCUMENTS

JP        11-272475      10/1999
JP        2001-134431      5/2001

OTHER PUBLICATIONS

D. Rogerson, "Microsoft Windows and the C Compiler Options", 'Online! May 5, 1992, pp. 1-21, retrieved from the Internet: URL:msdn.microsoft.com>, 'retrieved on Jun. 23, 2005.

Gordon Letwin, "Inside OS/2", 1988, Microsoft Press, Redmont, USA, paragraphs '7.5.1!-'7.5.2!

John Levine, "Linkers and Loaders", 'Online! May 1, 2001, pp. 1-25, retrieved from the Internet: URL:www.iecc.com/linker>, 'retrieved on Jul. 5, 2005.

V. Loia et al., "Optimizing Procedure Calls for Delayed Non-Local Execution Protocol", Software Practice & Experience, John Wiley & Sons Ltd. Chichester, GB, vol. 26, No. 12, Dec. 1996, pp. 1303-1334.

Ray Duncan, "Advanced OS/2 Programming", 1989, Microsoft Press, Redmond, USA, pp. 53-54, 459-469, and 481-482.

Amer Diwan, et al., "Compiler Support for Garbage Collection in a Statically Typed Language", ACM Sigplan Notices, Jul. 27, 1992, No. 7, pp. 273-281.

Charles Clark, et al., "Compacting Garbage Collection can be Fast and Simple", Software-Practice and Experience, vol. 26(2), Feb. 1996, pp. 177-194.

* cited by examiner

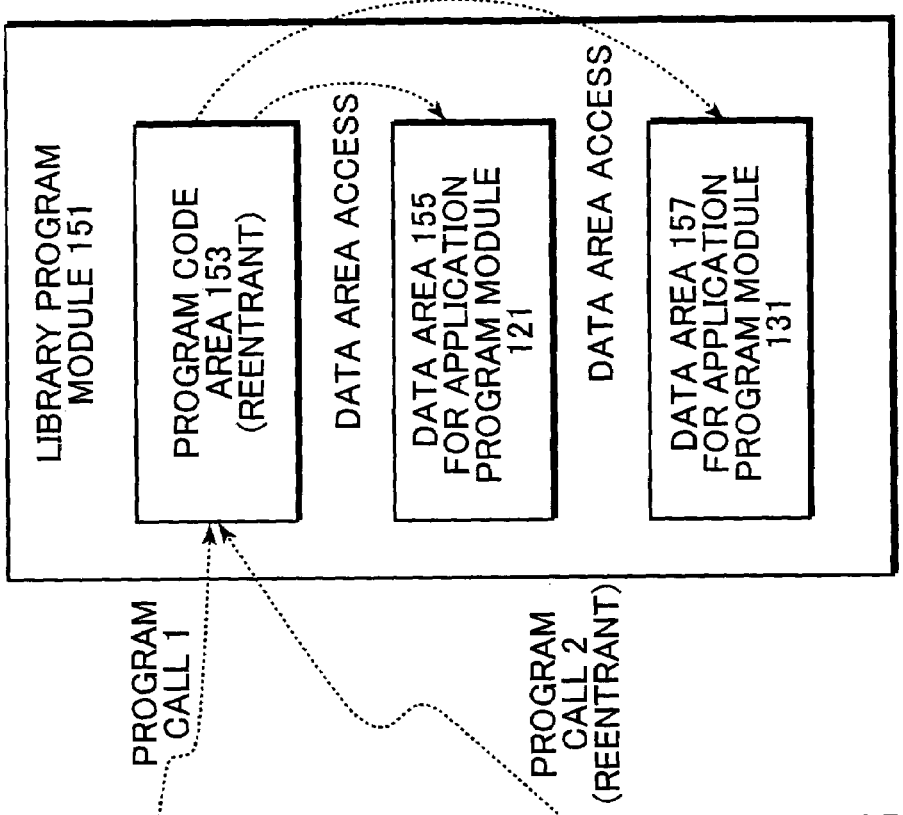
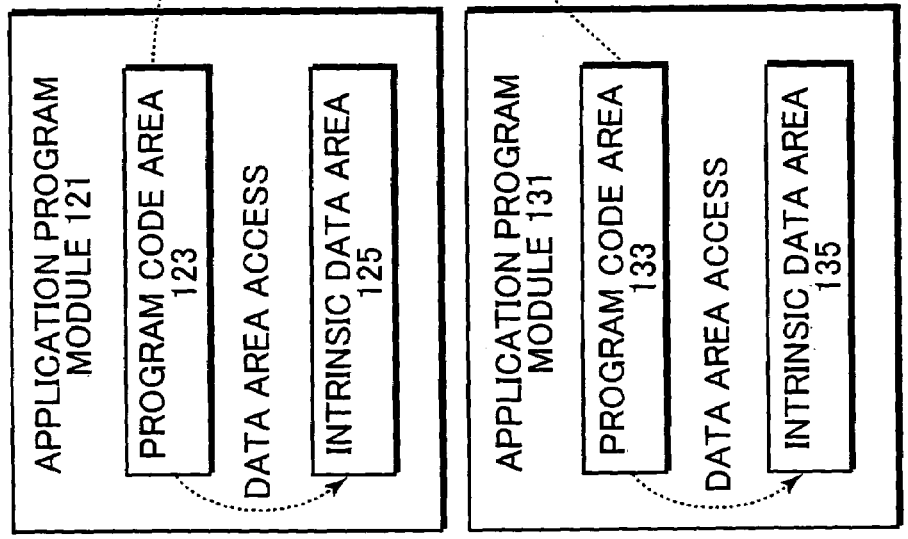
FIG. 4B
FIG. 4A

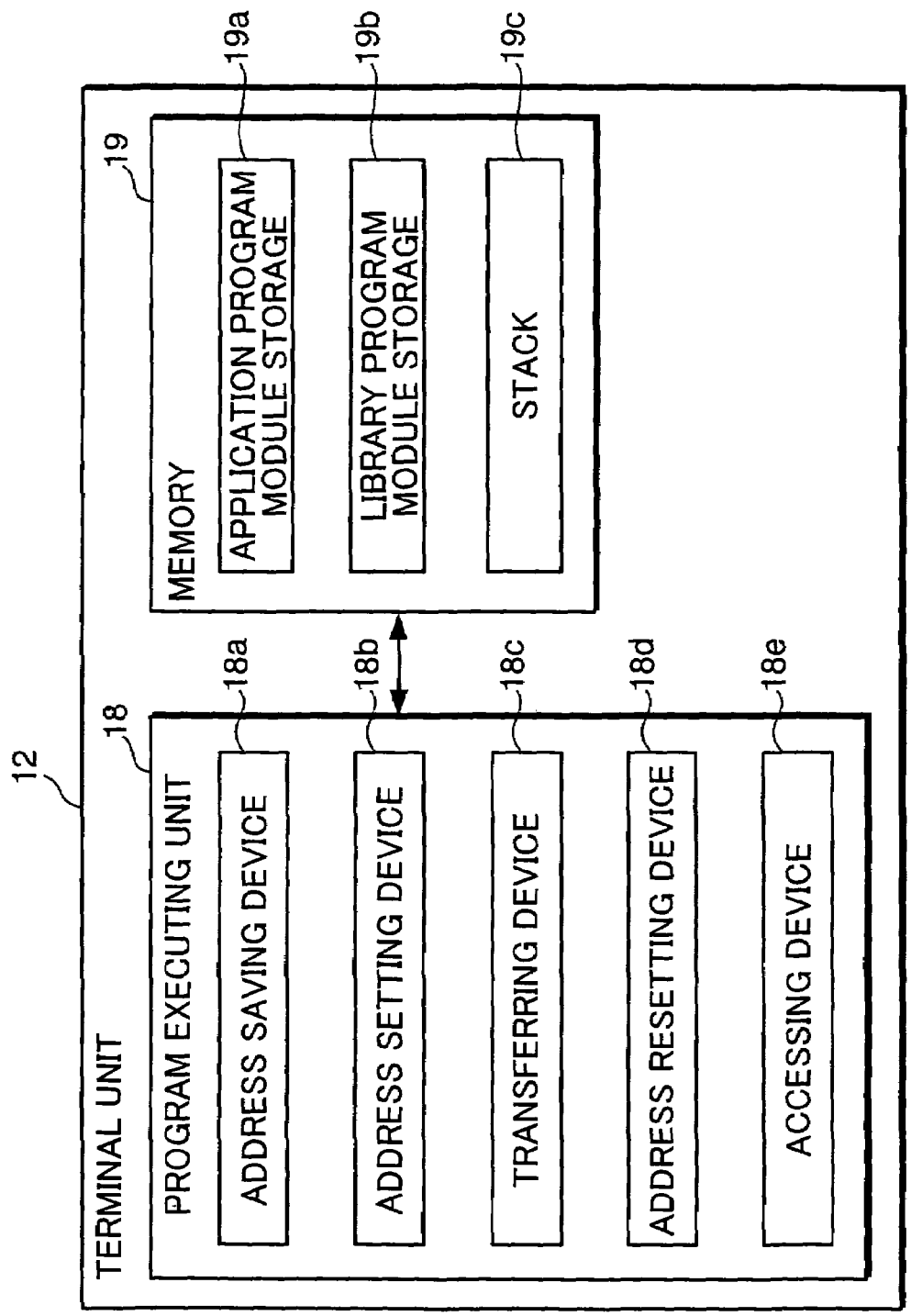

FIG. 10A

LIBRARY PROGRAM MODULE 151
SOURCE PROGRAM

```
int  C;
    ......
    bar(A,B);
    ......

private void bar(int A, int B)
{
    ......
    C=10;
    ......
    return;
}
```

PROGRAM CALL

FIG. 10B

LIBRARY PROGRAM MODULE 151
OBJECT PROGRAM

```
          :
    ⎧ ;1. SAVE ARGUMENTS
    ⎪    A, B IN STACK
    ⎨    add  -4, SP
    ⎪    mov  A, (SP)
    ⎪    add  -4, SP
    ⎩    mov  B, (SP)
    ⎧ ;2. CALL LIBRARY
    ⎨    FUNCTION "bar"
    ⎩    jsr  bar
    ⎧ ;4. DISCARD ARGUMENTS
    ⎨    A B FROM STACK
    ⎩    add  8,SP
          ......
bar
    ⎧ ;3. SUBSTITUTE 10 FOR
    ⎪    EXTERNAL VARIABLE C
    ⎨    mov  10, XReg
    ⎩    mov  XReg, (0×50,DP)
          ......
    rts
```

FIG. 14A

LIBRARY PROGRAM MODULE 551
(SOURCE PROGRAM)

```
int C;
common int D;
void bar(int A, int B)
{
    :
    :
/*SUBSTITUTE 10 FOR
EXTERNAL VARIABLE C*/
        C=10;
/*SUBSTITUTE 20 FOR
EXTERNAL VARIABLE D*/
        D=20;
    :
    :
    return;
}
```

FIG. 14B

LIBRARY PROGRAM MODULE 551
(OBJECT PROGRAM)

```
bar
    :
    :
SUBSTITUTE 10 FOR EXTERNAL   ┌ mov  10, XReg
VARIABLE C                   └ mov  XReg, (0×50, DP)
SUBSTITUTE 20 FOR EXTERNAL   ┌ mov  20, XReg
VARIABLE D                   └ mov  XReg, (0×60, SDP)
    :
    :
    rts
```

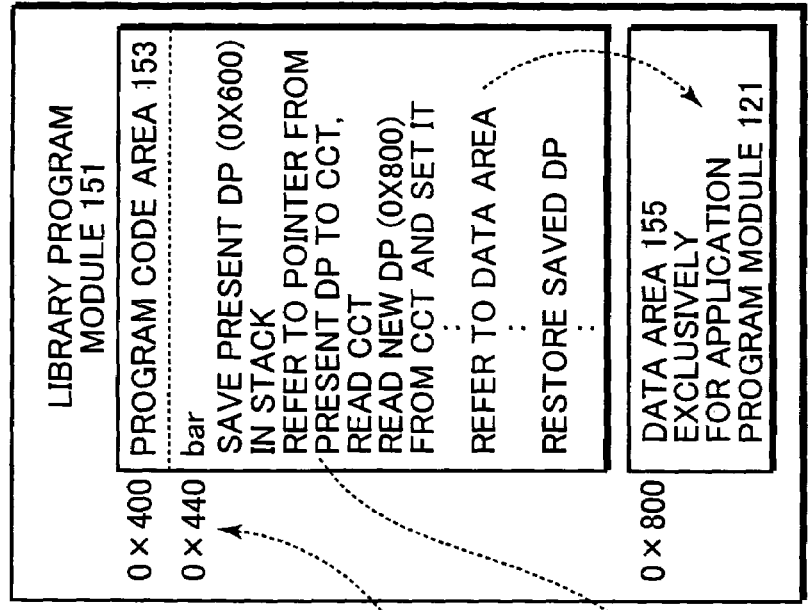
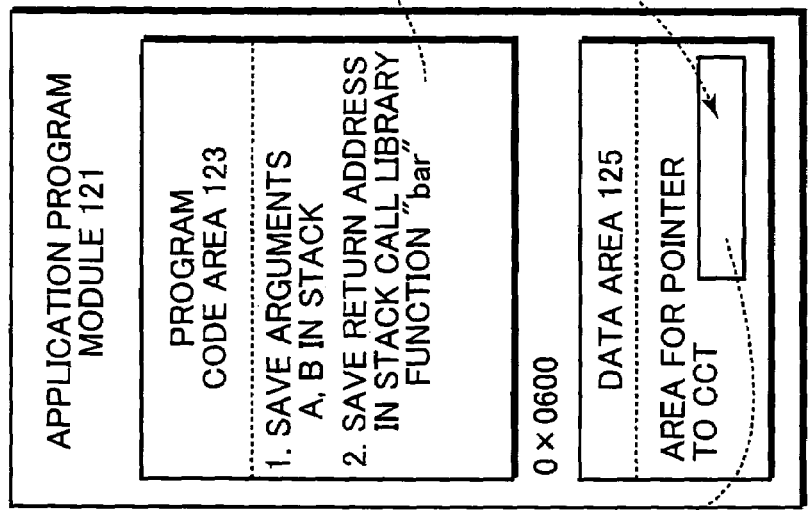
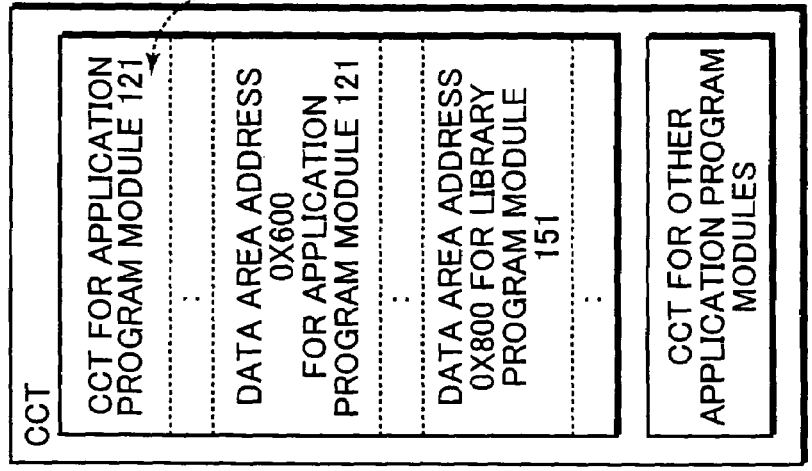

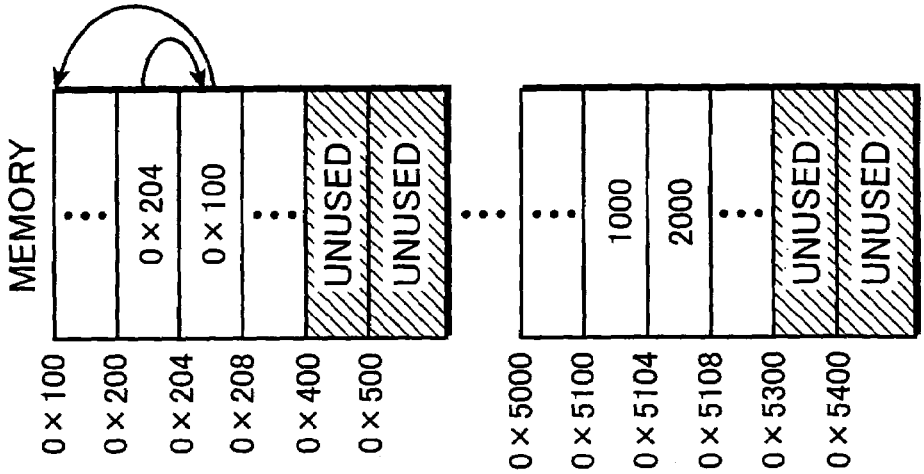
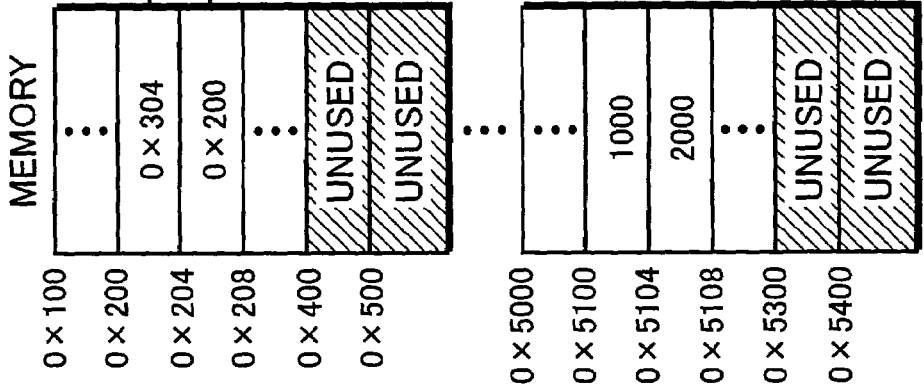
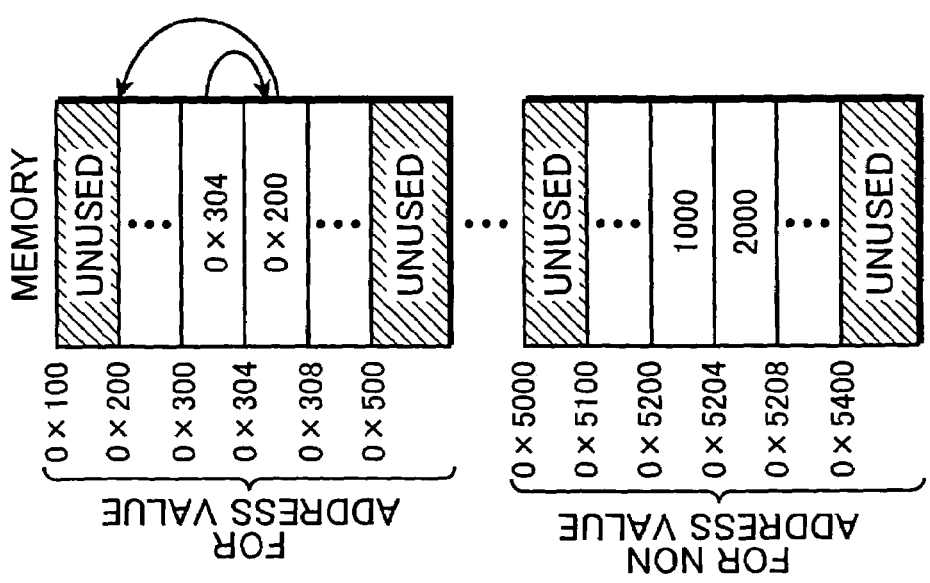

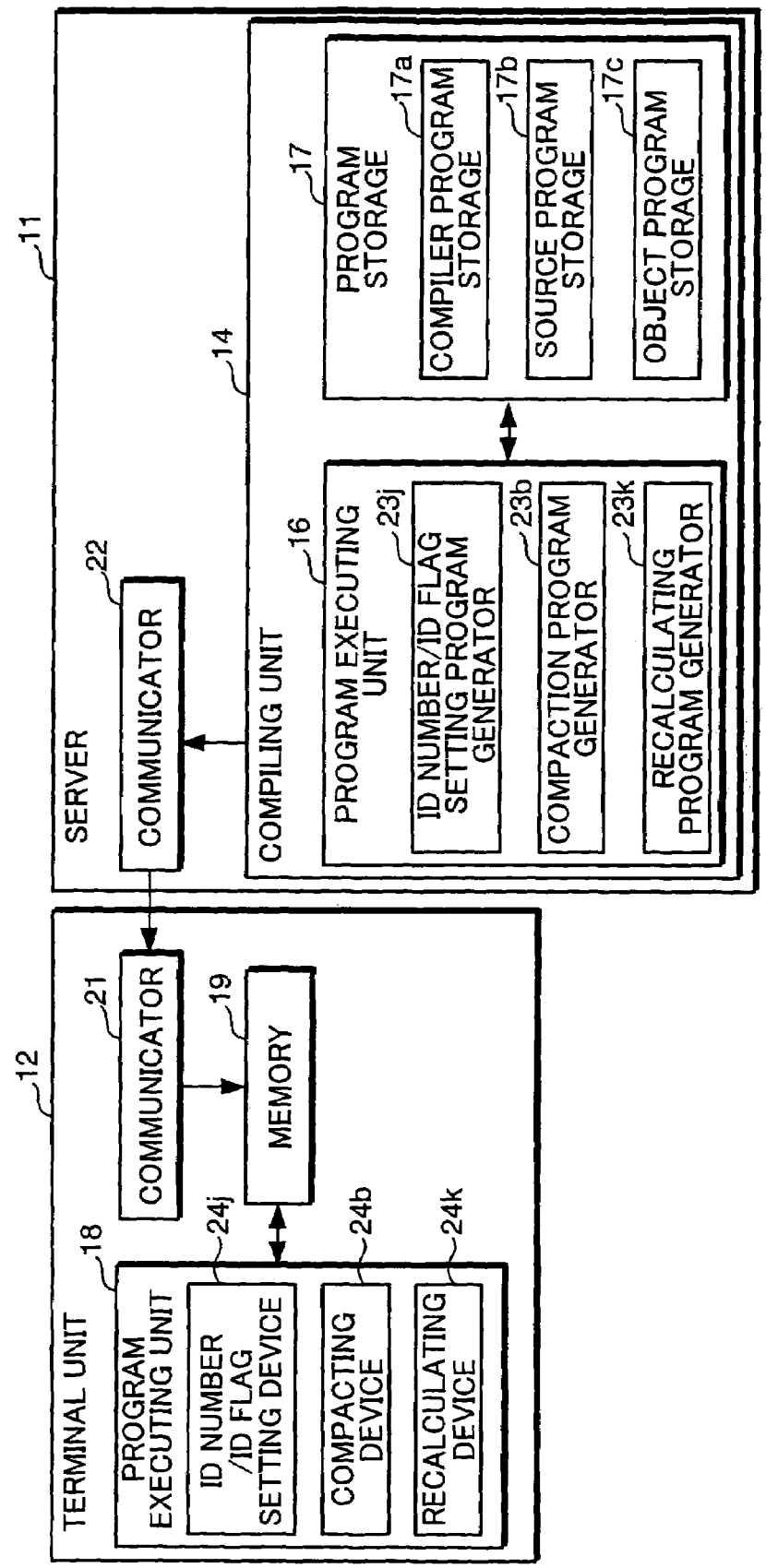

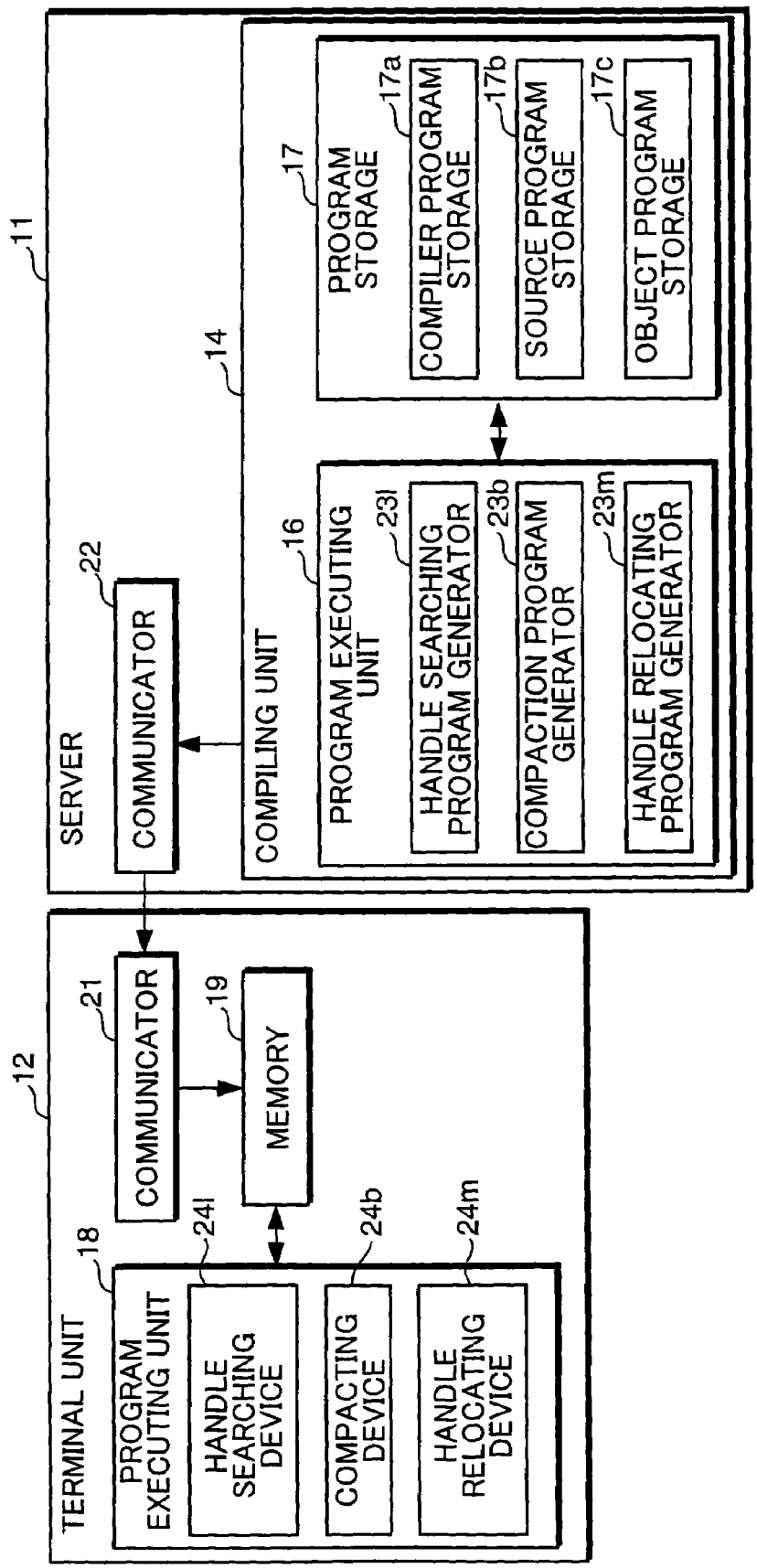

COMPILER PROGRAM, A COMPUTER-READABLE STORAGE MEDIUM STORING A COMPILER PROGRAM, A COMPILING METHOD AND A COMPILING UNIT

TECHNICAL FIELD

The present invention relates to a compiler program for the conversion (also referred to as "translation" in some cases, but means the same) of a source program (hereinafter, referred to as "source program codes" or "source codes") written in a certain programming language into an object program (hereinafter, referred to as "object code program" or "object codes") executable in a certain computer, a computer-readable storage medium storing a compiler program, a compiling method and a compiling unit.

The object program or the like mentioned in the specification of the present patent application contains, in addition to program codes directly executable in a computer, intermediate program codes which are the first stage of the conversion into such program codes; intermediate program codes of a stage where actually accessible memory addresses which are decided in the program codes directly executable in the computer are not yet decided; and an intermediate code program of a stage before the entire program codes directly executable in the computer are integrated.

The present invention also relates to a computer program for generating an object program, a computer-readable storage medium storing a computer program, a compiling method and a compiling unit which conform to the purpose of storing an object program in a limited memory area such as a so-called device installation program and storing an object program for an advanced and highly functional information processing in a limited memory like mobile information processings of recent years.

The present invention further relates to a computer program for automatically generating an object program which can be reentered (hereinafter, also referred to as "reentrant" object program), a computer-readable storage medium storing a computer program, a compiling method and a compiling unit.

BACKGROUND ART

Conventionally, function programs which are written on the conditions of using an operating system having time-division or priority preemptive takes or a process scheduling function and a similar function, and a function programming language, and which can be simultaneously called from a plurality of tasks or processes within a specific time interval have been required to be reentrant.

Such reentrant function programs have been coded by human programmers and programs for automatically judging whether a possibility of reentry is satisfied have been written by them. Such a prior art technology is disclosed, for example, in Japanese Unexamined Patent Publication No. 2001-134431 (patent document 1).

A condition of satisfying the possibility of reentry has depended on the syntax analysis of the entire source program describing functions to be judged to extract the entire flow, the determination of scopes for all the resources to be called in the entire flow and the judgment on the completely exclusive control according to the kind of the scope of the resource.

However, it is, in reality, very difficult due to a time restriction and a limit of the computer's processing ability to extract the entire flow by the syntax analysis of the entire source program, determine the scopes for the all the resources called in the entire flow and judge whether or not the completely exclusive control is executed according to the kind of the scope of the resource. Such a difficulty has obliged the judgment to be made up to a certain level.

Since the conventional reentrant program has its essential portion written by human programmer, only incompletely exclusive controls can be realized while a huge amount of time is taken. This brings about many maloperations when the program is executed.

Further, since such a reentrant program is frequently used in a multi-task and time-division environment, it has been quite difficult to found out the cause of the maloperation. It has been even more difficult to renew and revise such a reentrant program.

SUMMARY OF THE INVENTION

The present invention was developed in order to solve the above problems and an object thereof is to provide a computer program, a computer-readable storage medium storing a computer program, a compiling method and a compiling unit which can automatically generate a reentrant object program.

According to an aspect of the present invention, a source program is converted into an object program by saving a data memory area address used by a calling program module included in the source program, setting a data memory area address used by an other program module to be called by the calling program module, executing transfer from a first subprogram included in the calling program module to a second subprogram included in the other program module, reading and resetting the saved data memory area address for the calling program module after the return from the second subprogram as a transfer end to the first subprogram, and accessing a data memory area for the other program module using a relative address from the set data memory area address for the other program module when the other program module accesses the data memory area therefor included therein.

The object, features, aspects and advantages of the present invention are rendered clear by the following detailed description and the accompanying drawings.

BRIEF DESCRIPTION OF THE DRAWINGS

FIG. 5 is a block diagram showing the construction of a terminal unit shown in FIG. 1, FIGS. 10A and 10B are diagrams showing exemplary source program and object program according to a second embodiment, FIGS. 14A and 14B are diagrams showing exemplary source programs and object programs of an application program module and a library program module according to a third embodiment of the invention, FIGS. 16A, 16B and 16C are diagrams conceptually showing an application program module as a calling program to be converted by a compiler, a library program module as a program to be called, and an exemplary calling process according to a fourth embodiment of the invention, FIGS. 25A, 25B and 25C are diagrams showing a method for solving the fragmentation in the third modification, FIG. 26 is a diagram showing the construction of a compiling unit and a terminal unit for solving a fragmentation according to a fourth modification, and FIG. 27 is a block diagram showing the construction of a compiling unit and a terminal unit for solving a fragmentation according to a sixth modification.

DETAILED DESCRIPTION OF THE PREFERRED EMBODIMENTS OF THE INVENTION

Hereinafter, preferred embodiments of the present invention are described with reference to the accompanying drawings.

First Embodiment

Figure 1:
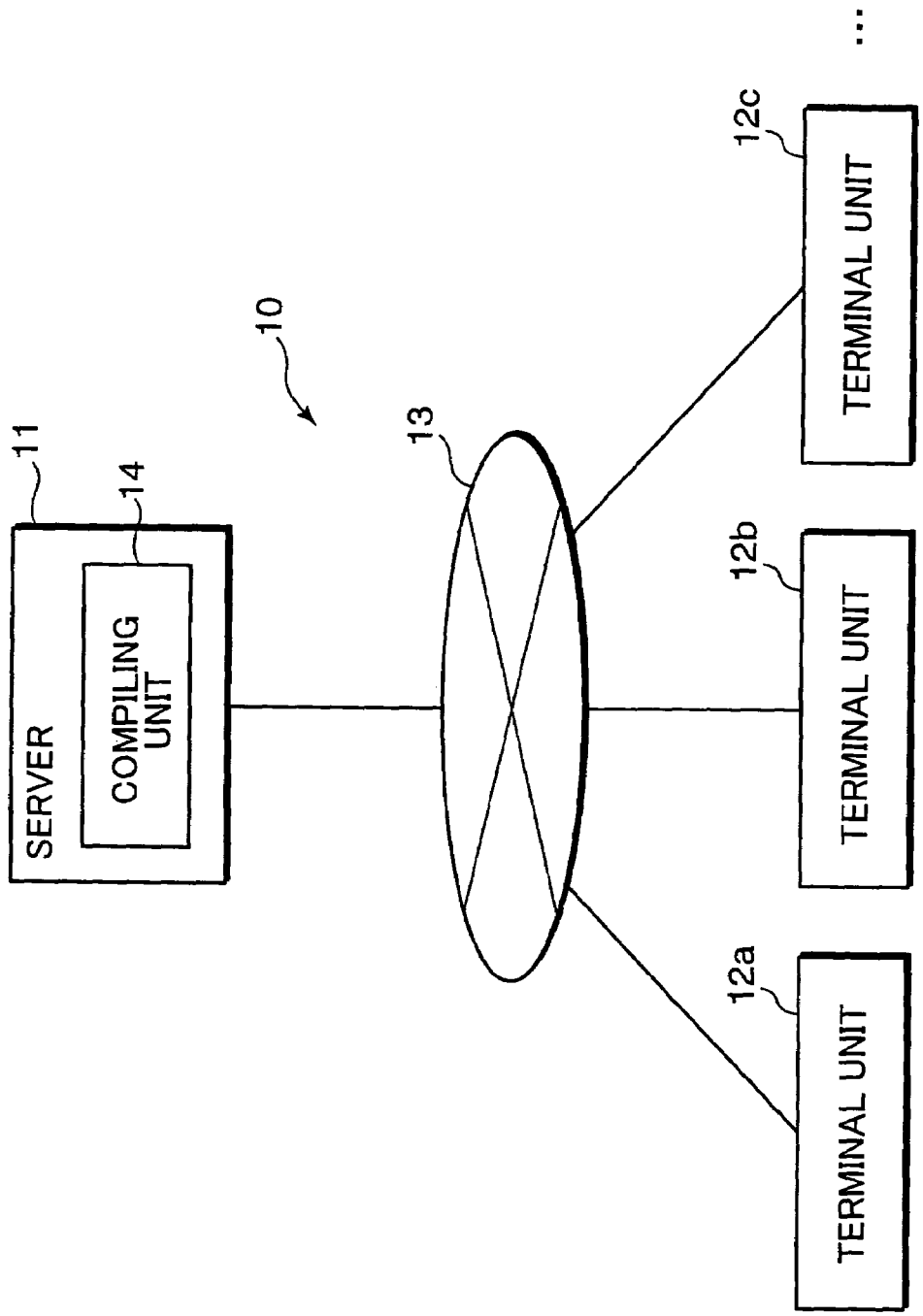
FIG. 1 is a diagram showing the construction of a dynamic module link system according to one embodiment of the invention.

FIG. 1 is a diagram showing the construction of a dynamic module linking system according to a first embodiment of the present invention. A dynamic module linking system shown in FIG. 1 is comprised of a server 11 and a plurality of terminal units 12 (12a, 12b, 12c, . . . ). The server 11 and the respective terminal units 12 are connected, for example, via Internet. It should be noted that the terminal unit in this embodiment is an object program executing unit for executing an object program generated by the conversion of a source program. The object program executing units include mobile communication terminals such as mobile phones and household electric appliances connected with a network such as Internet.

The terminal units in this embodiment receive the object program from the server 11 via a network such as Internet 13 and execute the received object program. However, the present invention is not particularly limited thereto. An object program generated by a compiling unit may be saved in a computer-readable storage medium such as a CD-ROM or DVD-ROM, the object program saved in the storage medium may be read by a storage medium driving device provided in the terminal unit such as a CD-ROM drive or a DVD-ROM drive, and the read object program may be executed.

The server 11 includes a compiling unit 14. The compiling unit 14 converts a source program written by a programmer into an object program. The terminal units 12 execute the object program converted by the compiling unit 14.

Figure 2:
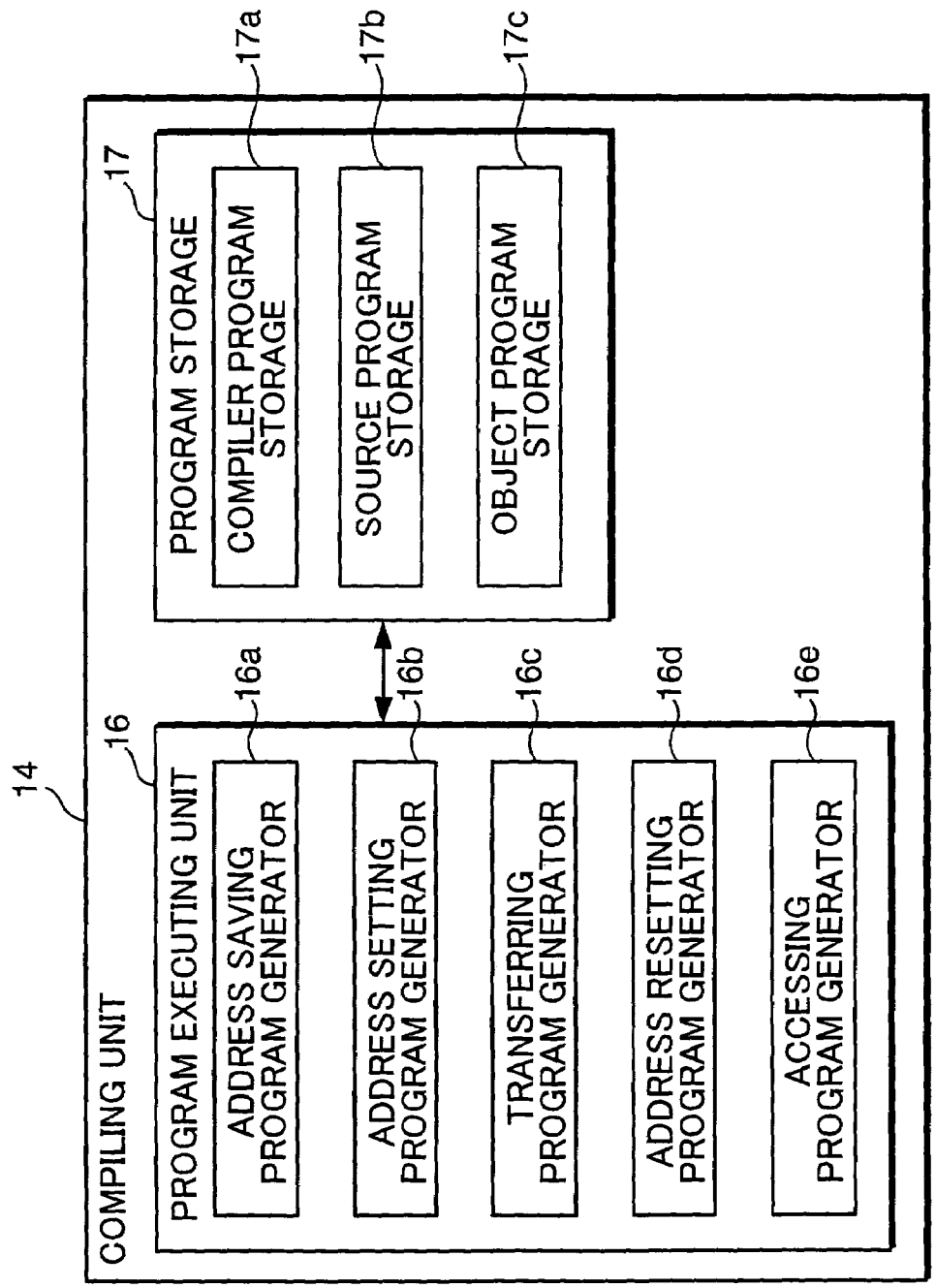
FIG. 2 is a block diagram showing the construction of a compiling unit shown in FIG. 1.

FIG. 2 is a block diagram showing the construction of the compiling unit 14 shown in FIG. 1. As shown in FIG. 2, the compiling unit 14 is provided with a program executing unit 16 and a program storage 17.

The program executing unit 16 is constructed by, for example, a CPU (central processing unit) and includes an address saving program generator 16a, an address setting program generator 16b, a transferring program generator 16c, an address resetting program generator 16d, and an accessing program generator 16e. The program storage 17 includes a compiler program storage 17a, a source program storage 17b and an object program storage 17c.

The address saving program generator 16a generates an address saving program for saving a data memory area address used by a calling program module contained in the source program.

The address setting program generator 16b generates an address setting program for setting a data memory area address used by the other program module called by the calling program module.

The transferring program generator 16c generates a transferring program for the transfer from a first subprogram contained in the calling program module to a second subprogram contained in the other program module.

The address resetting program generator 16d generates an address resetting program for reading and resetting the saved data memory area address for the calling program module after the return from the second subprogram as a transfer end to the first subprogram.

The accessing program generator 16e generates an accessing program for accessing the data memory area using a relative address from the data memory area address for the other program module when the other program module accesses the data memory area therefor included in the other program module.

The compiler program storage 17a stores a compiler program for converting a source program written beforehand into an object program. The source program storage 17b stores the source program written, for example, in C language, C++ language or the like. The source program is written not for the entire application, but module by module. The object program storage 17*c* stores the object program converted from the source program.

Figure 3:
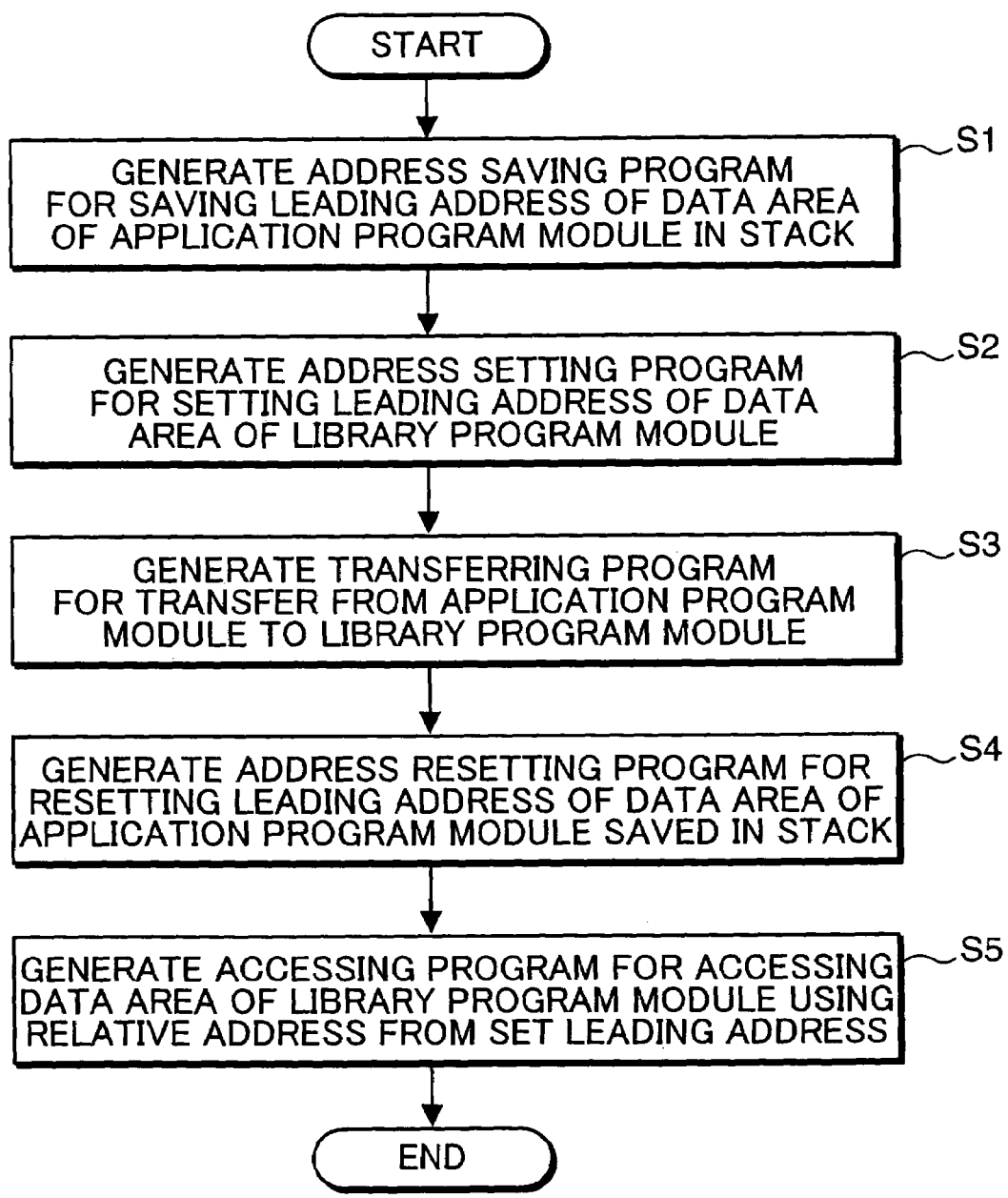
FIG. 3 is a flow chart showing an exemplary compiling process by the compiling unit shown in FIG. 2, FIGS. 4A and 4B are diagrams showing configurations of a source program to be converted by the compiling unit and an object program obtained as a result of the conversion by the compiling unit according to a first embodiment of the invention.

Next, a compiling process by the compiling unit shown in FIG. 2 is described. FIG. 3 is a flow chart showing an exemplary compiling process by the compiling unit shown in FIG. 2.

In Step 1, the address saving program generator 16*a* generates the address saving program for saving the leading address of a data area of an application program module in a stack.

In Step S2, the address setting program generator 16*b* generates the address setting program for setting the leading address of a data area of a library program module.

In Step S3, the transferring program generator 16*c* generates the transferring program for the transfer from the application program module to the library program module.

In Step S4, the address resetting program generator 16*d* generates the address resetting program for the reset to the leading address of the data area of the application program module saved in the stack.

In Step S5, the accessing program generator 16*e* generates the accessing program for accessing the data area using a relative address from the set leading address of the data area for the library program module when the library program module accesses the data area therefor contained therein.

In this way, the address saving program, the address setting program, the transferring program, the address resetting program and the accessing program which are generated by executing the compiler program are transmitted as the object programs to the respective terminal units 12, which in turn execute the received object programs.

FIGS. 4A and 4B are diagrams showing the configurations of the source program to be converted by the compiling unit and the object programs obtained as a result of the conversion by the compiling unit according to the first embodiment of the invention, wherein FIG. 4A shows the configuration of the application program module and FIG. 4B shows the configuration of the library program module.

It should be noted that these programs do not always exist in an incorporated form, but may be separately saved in physical mediums or files.

These programs include application program modules 121, 131, a library program module 151, and several other program modules unillustrated because they are not directly related to the description of the present invention.

The program modules are obtained by dividing a program into certain units (e.g. function units, link units, version-up units) and each have a program code area and an intrinsic data area. Here, although the latter area is called the intrinsic data area, it may not be necessarily intrinsic, strictly speaking, and may additionally have other certain purpose and/or application. This applies also to the other description.

The program code area of the program module is an area for latching a program execution command and the like written in the program module.

The intrinsic data area of the program module is an area for latching the substances of external variables and static variables defined in the program module. Hereinafter, the external variables and the static variables are sometimes collectively referred to as external variables.

The application program module 121 includes a program code area 123, an intrinsic data area 125 of the application program module 121, and several other areas unillustrated because they are not directly related to the description of the present invention.

The application program module 131 includes a program code area 133, an intrinsic data area 135 of the application program module 131, and several other areas unillustrated because they are not directly related to the description of the present invention.

These application program modules 121, 131 are calling programs and commonly call the library program module 151. Such a call is normally made in the form of a function call, a subroutine call or the like. This is a program call 1 and a program call 2 (reentry) shown in FIG. 4.

These program modules normally include several subprograms, which are normally functions, subroutines or the like. One of these functions and subroutines may be called a program module.

Normally, the program module is called by calling the subprogram of the other program module. In some cases, the subprogram of the same program module may be called.

In a so-called multi-task environment or other environment where a plurality of processes, tasks or applications are executed or have to be executed in parallel in a time division manner, for example, the application program module 131 may call and execute the library program module 151 while the application program module 121 calls and executes the library program module 151.

Such a state occurs countlessly in various information apparatuses. Several very simple examples are given here.

For example, in an apparatus having a mobile information communication function such as a mobile phone, a user has to monitor whether or not there has been any reception at the same time he inputs a data to be transmitted.

The data input and the reception can be monitored by another CPU, but they needs to be done in parallel in a time division manner in order to be done by one CPU to save the number of CPU to be used.

If a certain basic function subroutine is used both in the data input application and the reception monitoring application, this function subroutine may be called from one application while being called and executed by the other.

A case where a plurality of tasks and the like call and execute the same program module (function, subprogram, subroutine or the like) in a temporally overlapping manner is referred to as "reentry". If a certain program module is configured to be called from a program executing a plurality of tasks in a temporally overlapping and parallel manner, this program module is called to be "reentrant".

Several methods for configuring the program module to be reentrant have been conventionally known.

A first method is to process everything using internal variables (hereinafter, also called local variables, which means the same as internal variables) without using so-called external variables. Since the internal variables are newly secured in a stack area every time the program module is called and released simultaneously with the completion of the processing of this program module, accesses to the variables do not collide as long as only the internal variables are used. Thus, there has been no problem in simultaneously executing the program module in parallel.

A second method employs so-called external variables and reconciles accesses to the external variables using a state variable called semaphore.

Since the external variables cannot be used according to the first method, the transfer of the program module other than this program and data may be sometimes restricted.

According to the second method, the semaphore has to be tested and set despite its cumbersomeness every time an access is made to the external variable, thereby imposing much burden on a programmer and causing errors and maloperations.

The library program module 151 includes a program code area 153, intrinsic data areas 155, 157 of the library program module 151, and several other areas unillustrated because they are not directly related to the description of the present invention.

The data areas 155, 157 are for the application program module 121 and for the application program module 131, respectively, and are distinguished by the original program module which called this library program module 151.

For example, when this library program module 151 is called from the application program module 121, the program code area 153 accesses the data area 155 for the application program module 121 as an external variable area and executes the corresponding processing. When the library program module 151 is called from the application program module 131, the program code area 153 accesses the data area 157 for the application program module 131 as an external variable area and executes the corresponding processing.

By separately using the intrinsic data areas used by the library program module, particularly the data areas used for the external variables, the program can be written without paying attention to the collision of the accesses to the external variables.

As already described, there is no problem of the collision of accesses to the internal variables since the areas are secured in the stack area every time the library program module 151 is called.

Although the data area is prepared and used for each calling application program, the application programs mentioned here may be interpreted as application task units or may be thought to be of the same concept as application tasks.

The application programs mentioned here may also be interpreted as application process units or may be thought to be of the same concept as application processes.

A procedure of the process performed when the application program module 121 calls the library program module 151 is described in more detail with reference to FIGS. 5 to 8.

Figure 6:
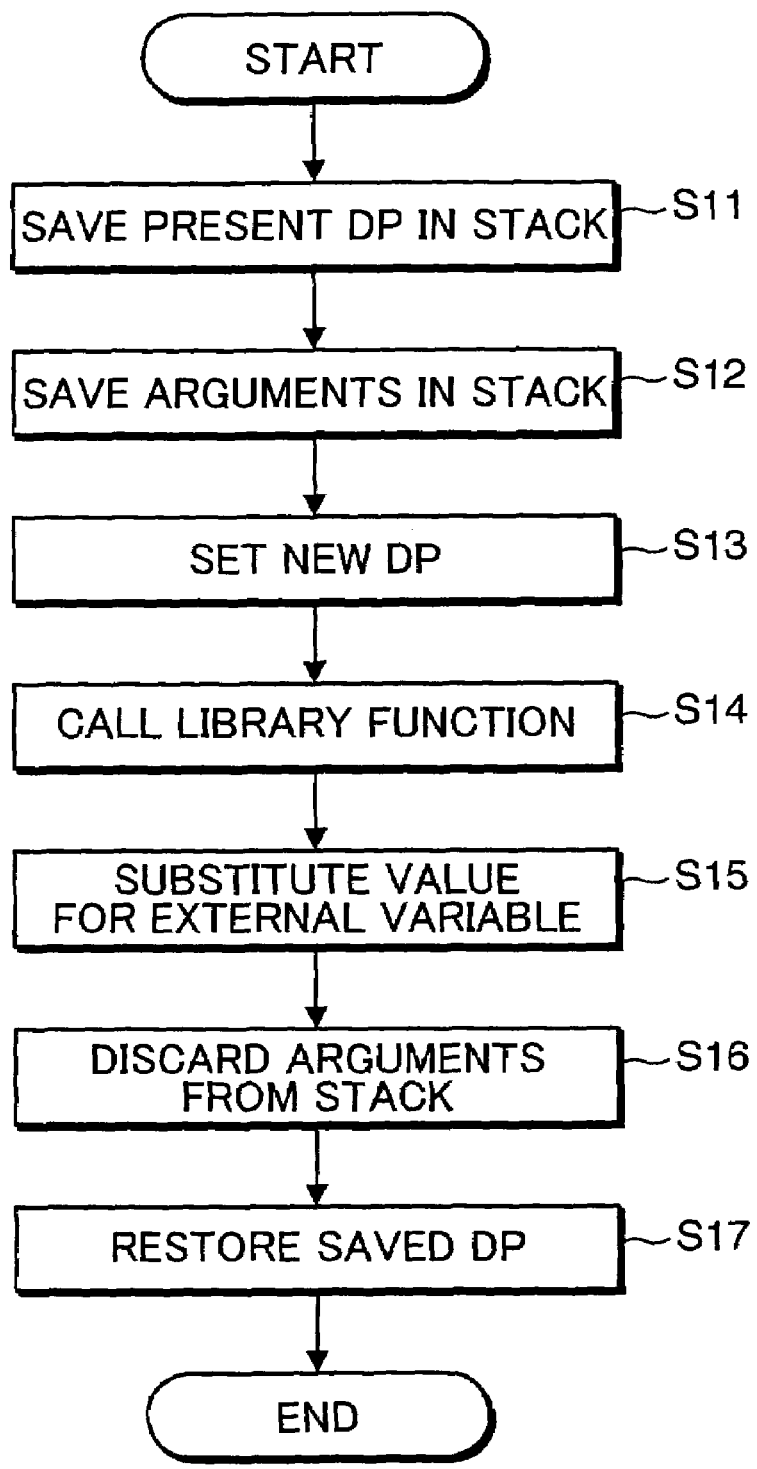
FIG. 6 is a flow chart showing a process in which an application program module calls a library program module via the terminal unit shown in FIG. 5, FIGS. 7A and 7B are diagrams showing the process of calling the library program module from the application program module.
Figure 7B:
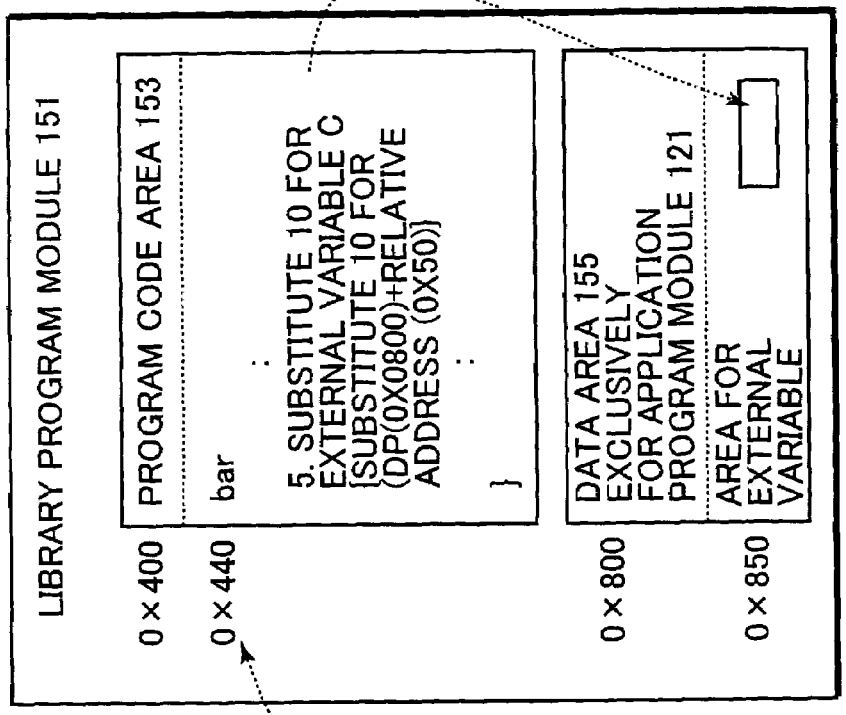
Figure 7A:
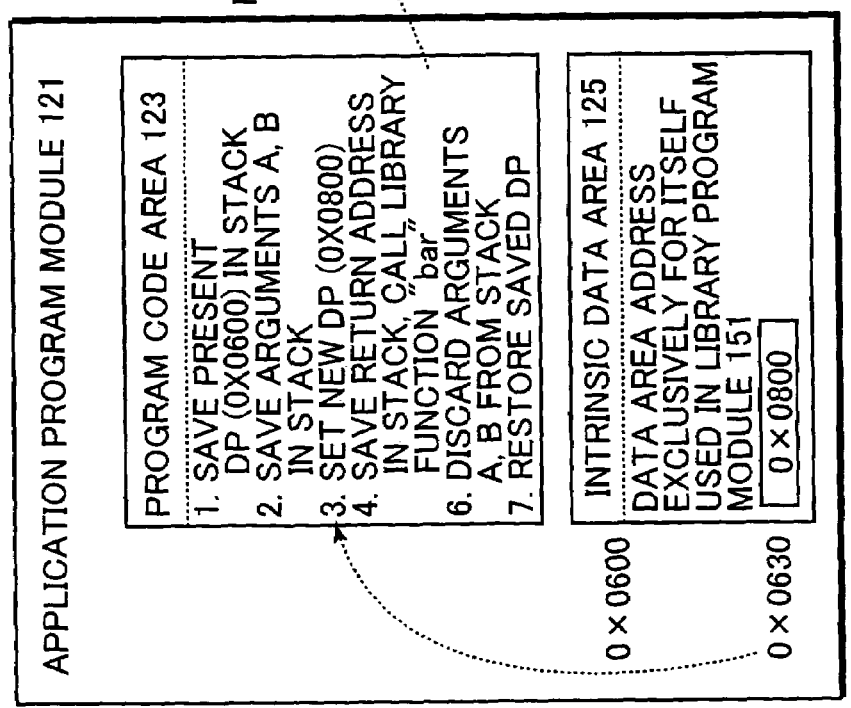
Figure 8B:
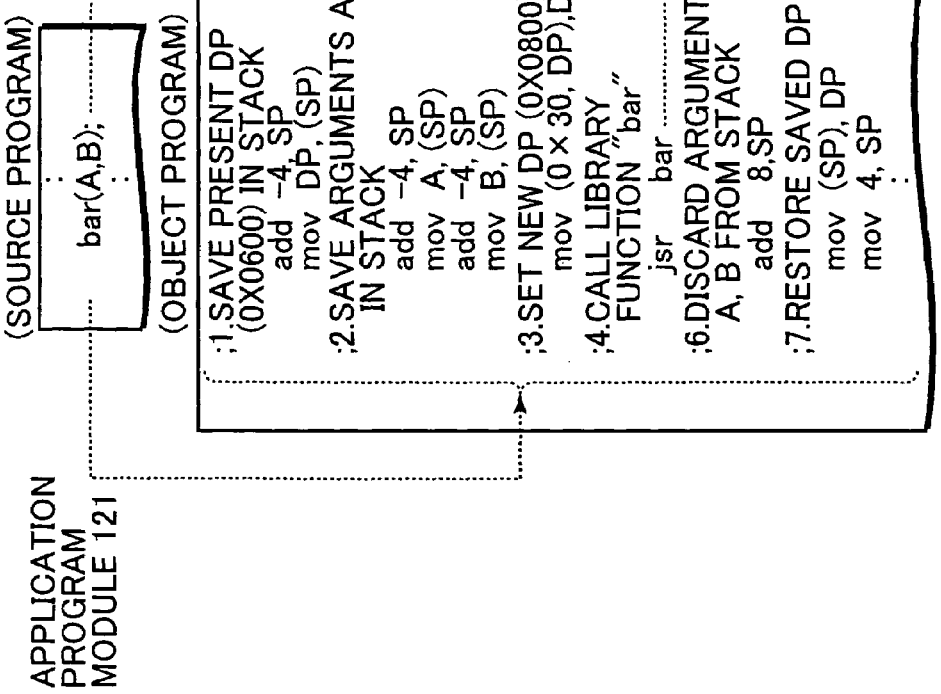
FIGS. 8A and 8B are diagrams showing exemplary source programs and object programs of the application program module and the library program module.
Figure 8A:
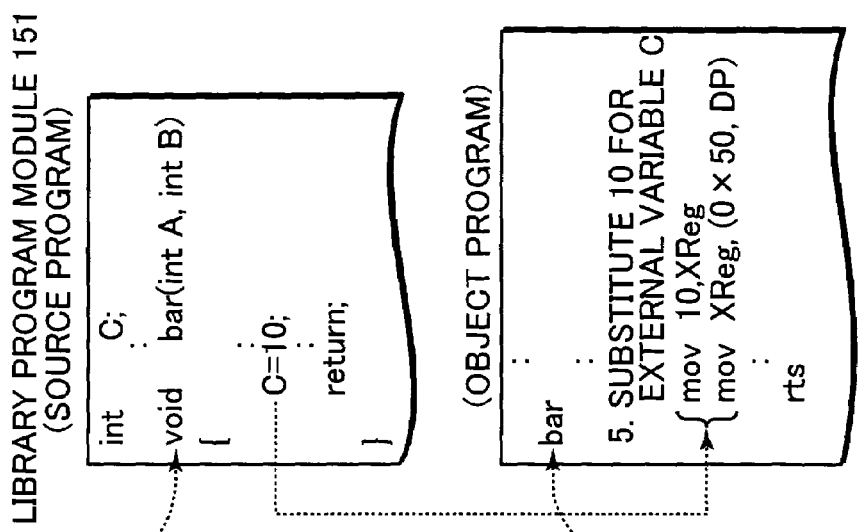

FIG. 5 is a block diagram showing the construction of the terminal unit 12 shown in FIG. 1. FIG. 6 is a flow chart showing a process of the application program module 121 calling the library program module 151 via the terminal unit 12 shown in FIG. 5. FIGS. 7A and 7B are diagrams showing the process of calling the library program module from the application program module, wherein FIG. 7A shows a process of the application program module and FIG. 7B shows a process of the library program module. FIGS. 8A and 8B are diagrams showing exemplary source and object programs of the application program module and the library program module, wherein FIG. 8A shows the source program and the object program of the application program module and FIG. 8B shows the source program and the object program of the library program module. The source programs shown in FIGS. 8A and 8B are programs written in C language.

As shown in FIG. 5, the terminal unit 12 is provided with a program executing unit 18 and a memory 19. The program executing unit 18 is constructed, for example, by a DSP (digital signal processor) and includes an address saving device 18a, an address setting device 18b, a transferring device 18c, an address resetting device 18d, an accessing device 18e. The memory 19 includes an application program module storage 19a, a library program module storage 19b and a stack 19c.

The application program module storage 19a saves the application program module transmitted from the compiling unit 14, the library program module storage 19b saves the library program module transmitted from the compiling unit 14, and the stack 19c temporarily saves data and addresses during the process of calling a subroutine or a function.

The address saving device 18a saves the leading address of the intrinsic data area 125 used by the calling application program module 121 in the stack 19c.

The address setting device 18b sets the leading address of the data area 155 for the application program module of the library program module 151 called by the application program module 121.

The transferring device 18c transfers from the program code area 123 included in the application program module 121 to the program code area 153 included in the library program module 151.

The address resetting device 18d reads and resets the saved leading address of the data area 125 for the application program module after the return from the program code area 153 of the transferred library program module 151 to the program code area 123 of the application program module 121.

The accessing device 18e accesses the data area 155 using a relative address from the set leading address of the data area 155 for the library program module when the program code area 153 of the library program module 151 accesses the data area 155 for the library program module included in the library program module 151.

Here, when a "bar(A, B);" command written in the source program of the application program module 121 is converted into an object program, an object program for calling a "bar" which is a function subroutine "bar" included in the library program module 151 (hereinafter, may be referred to as a function subprogram "bar" or merely referred to as a function "bar", but mean the same) is generated (see 1 to 7 of FIG. 7A).

In Step S11 of FIG. 6, the address saving device 18a saves a present content of a DP (data point) register (hereinafter, sometimes merely referred to as "DP") in the stack 19c. The program included in the program code area 123 of the application program module 121 first saves the contest of the DP register saving 0x0600(0600 in hexadecimal notation, $0*16^3+6*16^2+0*16+0$ when being converted in decimal notation, same below), which is the leading address of the intrinsic data area 125 used by the application program module 121 presently being executed, in the stack 19c (see 1 in FIG. 7A and 1 in FIG. 8A).

This is to enable the application program module 121 to set the content of the DP at 0x0600 again upon returning from the library program module 151 and to use the intrinsic data area 125 for itself again. Although the intrinsic data area is mentioned here, it may not be necessarily intrinsic, strictly speaking, and may additionally have other certain purpose and/or application. This applies also to the other description.

The DP register is an area for latching the leading address of the data area for the program module being executed. A special register is normally prepared as this area. However, a generally used register may be used without preparing any special register.

Next, in Step S12, the address saving device 18a saves arguments of the function "bar" in the stack 19c. Specifically, the program included in the application program module 121 saves arguments A and B to be transferred to the library program module 151 (see 2 of FIG. 7A and 2 of FIG. 8A).

Figure 9B:
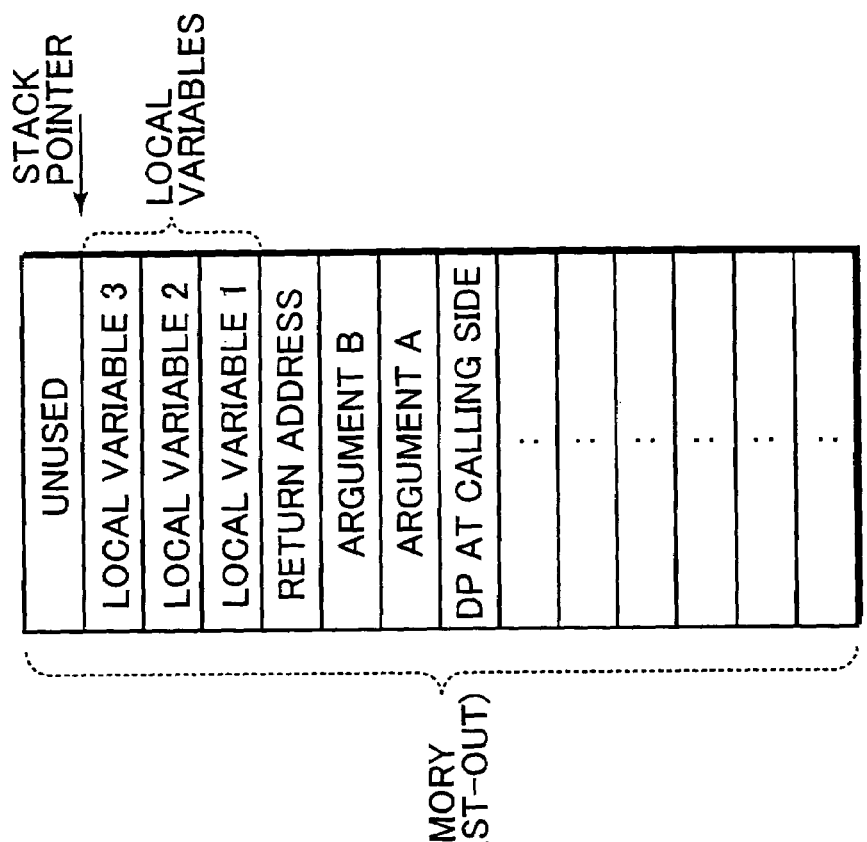
FIGS. 9A and 9B are diagrams showing states of a stack.
Figure 9A:
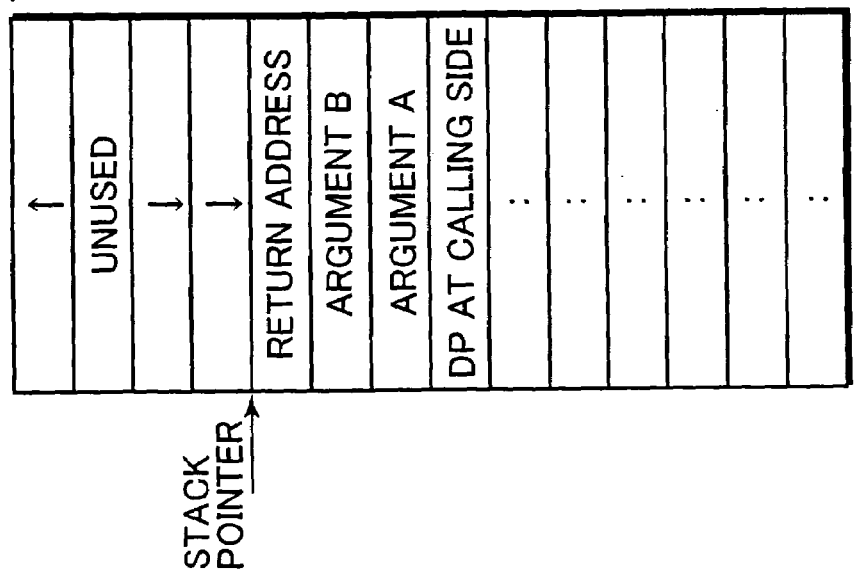

Here, the state of the stack 19c at this time is described. FIGS. 9A and 9B are diagrams showing the states of the stack, wherein FIG. 9A is a concept diagram showing the state of the stack when the arguments A and B are saved in the stack and FIG. 9B is a concept diagram showing how to use the stack.

As shown in FIG. 9A, the stack (hereinafter, may also be referred to as a stack memory) 19c is a memory area of the last-in/first-out type and saves data necessary upon calling an other program module (e.g. a function, a subroutine, a subprogram or the like) from a certain program module to use it in transferring data between the program modules, to use it as a memory area for local variable, to save an address to return from the called function or the like to the calling program, and to use it for other purposes.

An address of an area of the stack 19c where data are written and read is indicated by a register called a stack pointer (hereinafter, may also be merely referred to as a stack pointer or a stack pointer register).

How to use this stack 19c is described with reference to FIG. 9B. For example, a local variable 2 saved at the third address from above of the stack shown in FIG. 9B can be accessed by changing the value of the stack point or by way of an indirect reference using the value of the stack pointer register minus 2 as an address.

Next, in Step S13, the address setting device 18b sets a new DP. Specifically, the program included in the application program module 121 reads an address (0x800) of the data area 155 for the application program module 121 which address is saved in an area within the intrinsic data area 125 of the application program module 121 and used in the library program module 151 including the function "bar", and sets this address in the DP (see 3 of FIG. 7A and 3 of FIG. 8A).

The area for latching the address (0x800) of the data area 155 for the application program module 121 which address is used in the library program module 151 including the function "bar" is normally set by a compiler. However, this area may not necessarily be set by the compiler and may be prepared as a library and set at the time of a link.

Next, in Step S14, the transferring device 18c calls a library function. The program included in the application program module 121 saves an address used at the time of returning from the function "bar" as a called program to itself, i.e. an address of a command next to a jump command to the function "bar" in the stack 19c and jumps to the function "bar" (see 4 of FIG. 7A and 4 of FIG. 8A).

As shown in FIG. 7B, the function "bar" as a called program is included in the program code area 153 included in the library program module 151. This function "bar" is used to extract the arguments A and B saved in the stack 19c.

Further, in Step S15, the accessing device 18e substitutes a value for the external variable. The function "bar" uses, for example, an external variable C defined in the library program module 151 as an external variable. In the function "bar", upon accessing the external variable C and putting, for example, a value of 10 into its memory area, the value of 10 is substituted for an address (0x850) which is a sum of the value (0x800) saved in the DP and a relative address (0x50). This command format is shown in 5 of FIG. 7B and 5 of FIG. 8B.

In this way, the function "bar" can access the data area 155 for the application program module 121 which is a memory area starting from the address (0x800).

Upon the completion of the process in the function "bar", the control of the program is returned to the program included in the original application program module 121.

Then, in Step S16, the address resetting device 18d discards the arguments A, B of the function "bar" from the stack 19c. Immediately after the return from the function "bar", the arguments A and B are discarded from the stack 19c (see 6 of FIG. 7A and 6 of FIG. 8A). Although the arguments are discarded immediately after the return from the function "bar" here, they may not be necessarily discarded immediately thereafter, strictly speaking, and may be after a certain processing. This also applies to the other description.

Next, in Step S17, the address resetting device 18d takes the original value of the DP saved in the stack 19c out of the stack 19c and resets it in the DP (see 7 of FIG. 7A and 7 of FIG. 8A).

In this way, the program included in the application program module 121 at the calling side can access the intrinsic data area 125 of itself again.

At this time, since the value of the DP at the calling side is saved in the bottommost address of the stack as shown in FIGS. 9A and 9B, the called library program module 151 needs not read the content of the DP and can actually execute all the necessary processings without reading it, whereby no unnecessary access needs to be made.

For example, in an other embodiment like a second embodiment following below in which the saving of the value of DP in the stack can be selected, the same processing can be executed by an access to the same address regardless of whether or not the value of the DP is saved in the stack by saving the value of the DP at the bottommost address of the stack. Thus, it is not necessary to separate the processings after judging whether or not the value of the DP is saved in the stack.

By saving the value of the DP at the bottommost address of the stack, a stack position where necessary data such as arguments and return addresses are retrieved does not change at the side of the called library program module 151 regardless of whether or not the value of the DP is saved in the stack. In other words, since a relative position from the stack pointer of the stack for retrieving the arguments and the return addresses does not change, it is not necessary to retrieve these arguments and return addresses in view of it.

Although the library program module is called from the application program module in this example, an other library program module may be called from the library program module. Since the processings executed in such a case are same as those in the case of calling the other library program module from the application program module, no description is given thereon.

Although the other program module is called in this example, the same program module can also be called. Since the processings executed in such a case are same as those in the case of calling the other library program module, no description is given thereon.

In this way, even if the calling program module reenters the other program module, the leading address of the intrinsic data area 125 used by the application program module 121 can be retracted since it is saved in the stack, and the leading address of the data area 155 for the application program module 121 used by the library program module called by the application program module 121 is set. Thus, the reentrant object program can be generated to realize dynamic links between the modules.

Second Embodiment

In the first embodiment of the present invention, the object program generated by converting the command "bar(A,B);" written in the source program of the application program module 121 into the object program saves the content of the DP register saving the leading address of the intrinsic data area 125 used by the application program module 121 presently being executed in the stack; saves the arguments A, B, which are data to be transferred to the library program module 151, in the stack; reads the address of the data area 155 for the application program module 121 used by the function "bar" to be called and sets this address in the DP; saves the address at the time of returning from the function "bar" to itself in the stack; jumps to the function "bar"; discards the arguments A, B from the stack at the time of the return from the function "bar"; and resets the original value saved in the stack in the DP.

In the second embodiment of the present invention to be described below, a description as to whether the above process is to be executed or a part of the process is to be deleted is included in the source program of the library program module 151.

Although the other program module is called in the above first embodiment, a function "bar" within the same module is called in the second embodiment.

FIGS. 10A and 10B are diagrams showing exemplary source program and object program according to the second embodiment, wherein FIG. 10A shows an exemplary source program of a library program module and FIG. 10B shows an exemplary object program of the library program module. It should be noted that the programs are written in C language. In this example, the language specification of C language is extended to add a new keyword "private" and a declaration is written by giving a qualifier "private" to a source code.

For example, the call of a function "bar" shown in FIG. 10 shows that a part of the process executed in the first embodiment can be deleted. In the function "bar" shown in FIG. 10A, a declaration to delete a part of the process is written, for example, in "private void bar (int A, int B).

As shown in FIG. 10A, the function "bar" included in the source program of the library program module includes a description that the function "bar" is "private".

This description is to declare that "the function "bar" is a so-called private function", and is sometimes called, for example, a "private declaration" or a "private function declaration."

In the case that the presence of a description to call this private function "bar", there is not generated such an object program as described in the first embodiment to save the value of the DP used by the calling program module, to set the value of the DP indicating the address of the intrinsic data area used by the program module to be called and to reset the value of the DP to the original one saved in the stack at the time of the return from the function "bar".

Figure 11:
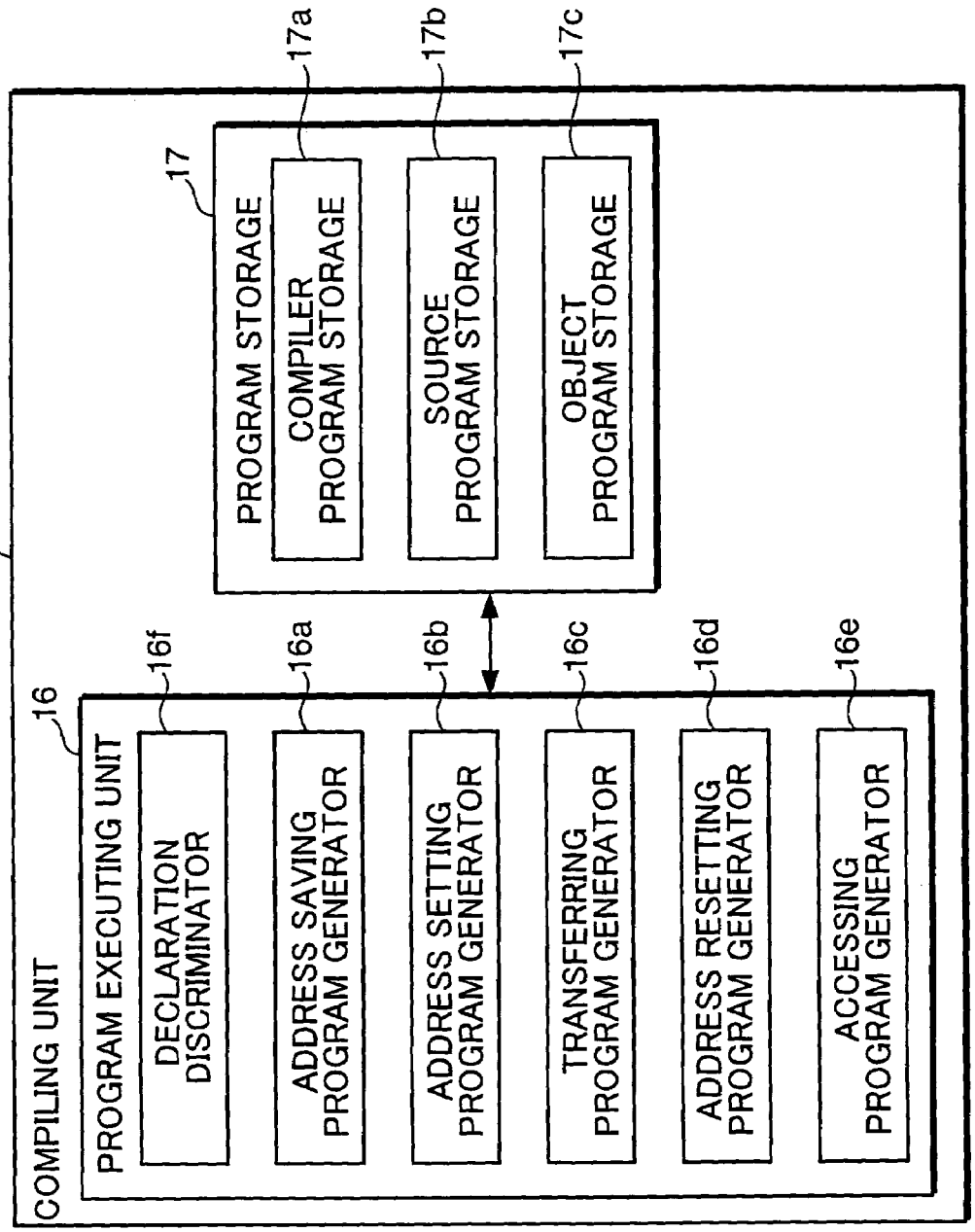
FIG. 11 is a block diagram showing the construction of a compiling unit according to a second embodiment of the invention.

FIG. 11 is a block diagram showing the construction of a compiling unit 14 according to the second embodiment of the present invention. The compiling unit 14 shown in FIG. 11 is provided with a program executing unit 16 and a program storage 17.

The program executing unit 16 is constructed by, for example, a CPU (central processing unit) and includes an address saving program generator 16a, an address setting program generator 16b, a transferring program generator 16c, an address resetting program generator 16d, an accessing program generator 16e, and a declaration discriminator 16f. The program storage 17 includes a compiler program storage 17a, a source program storage 17b and an object program storage 17c.

It should be noted that the same elements of the compiling unit of the second embodiment shown in FIG. 11 as those of the compiling unit of the first embodiment shown in FIG. 1 are identified by the same reference numerals and only a construction different from the first embodiment is described below.

The declaration discriminator 16f judges whether or not to shorten the process in accordance with the description of a program code area of the library program module called from a program code area included in the application program module included in the source program. In other words, the declaration discriminator 16f discriminates whether or not the aforementioned private declaration is included in the description of the source program.

Here, if the declaration discriminator 16f judges not to shorten the process, i.e. if it discriminates that the private declaration is not included, the process by the address saving program generator 16a, the address setting program generator 16b, the transferring program generator 16c, the address resetting program generator 16d and the accessing program generator 16e perform the process similar to the first embodiment.

Further, if the declaration discriminator 16f judges not to shorten the process, i.e. if it discriminates that the private declaration is included, the transferring program generator 16c generates a transferring program for the transfer from the program code area included in the application program module to the program code area included in the library program module, and the accessing program generator 16e generates an accessing program for accessing a data area for the library program module included in the library program module using a relative address from the leading address of this data area when the program code area included in the library program module accesses this data area.

Figure 12:
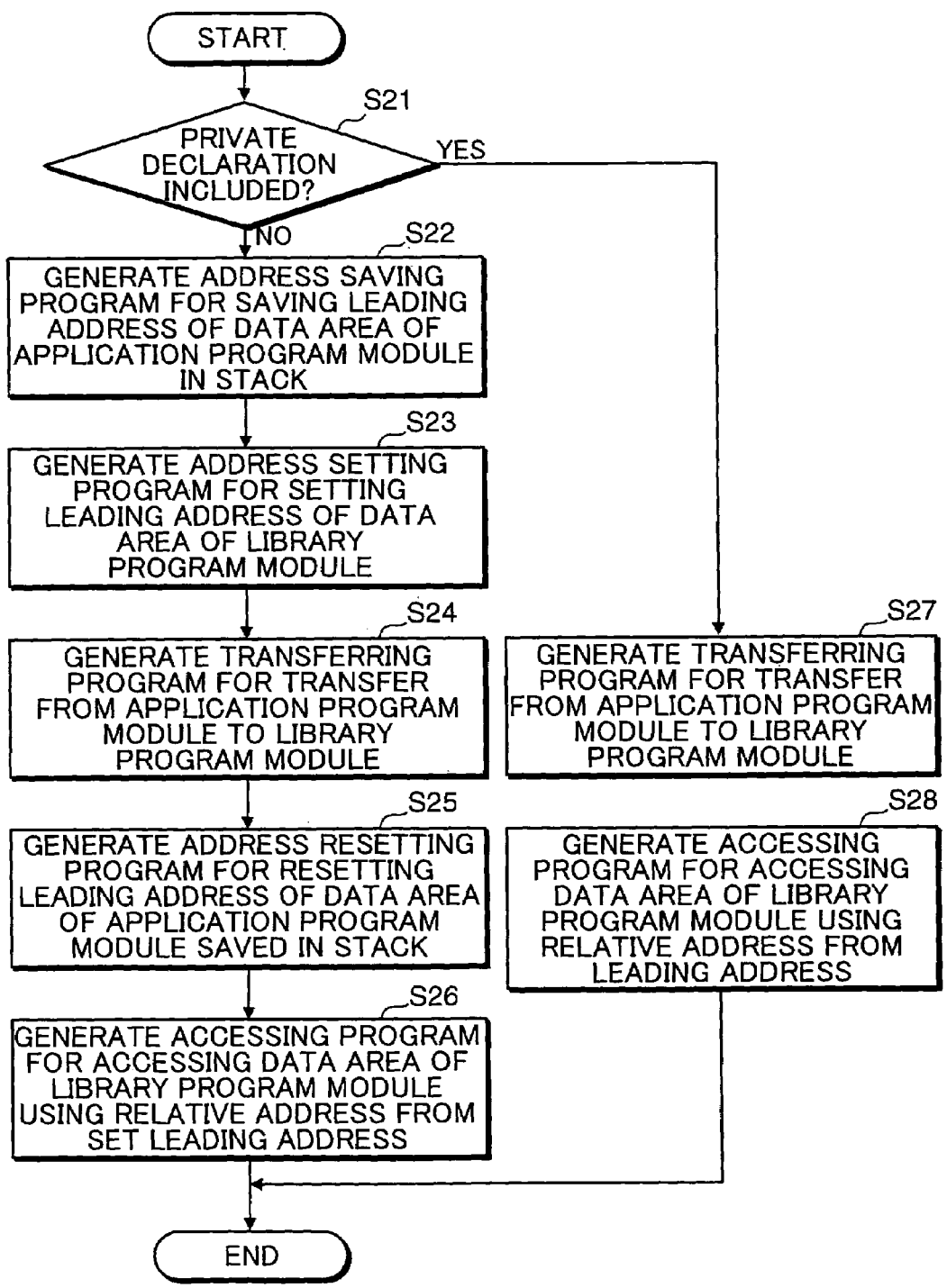
FIG. 12 is a flow chart showing an exemplary compiling process by the compiling unit shown in FIG. 11.

FIG. 12 is a flow chart showing an exemplary compiling process by the compiling unit 14 shown in FIG. 11.

In Step S21, the declaration discriminator 16f judges whether or not the private declaration is included in the description of the program code area of the library program module. Step S22 follows if the private declaration is judged not to be included (NO in Step S21), whereas Step S27 follows if it is judged to be included (YES in Step S21).

The processings from Step S22 to Step S26 are not described since they are same as those from Step S1 to Step S5 shown in FIG. 3. Further, the processing in Step S27 is not described, either, since it is same as the one in Step S3 shown in FIG. 3.

In Step S28, the accessing program generator 16e generates the accessing program for accessing the data area for the library program module included in the library program module using the relative address from the leading address of this data area when the program code area included in the library program module accesses this data area.

Figure 13:
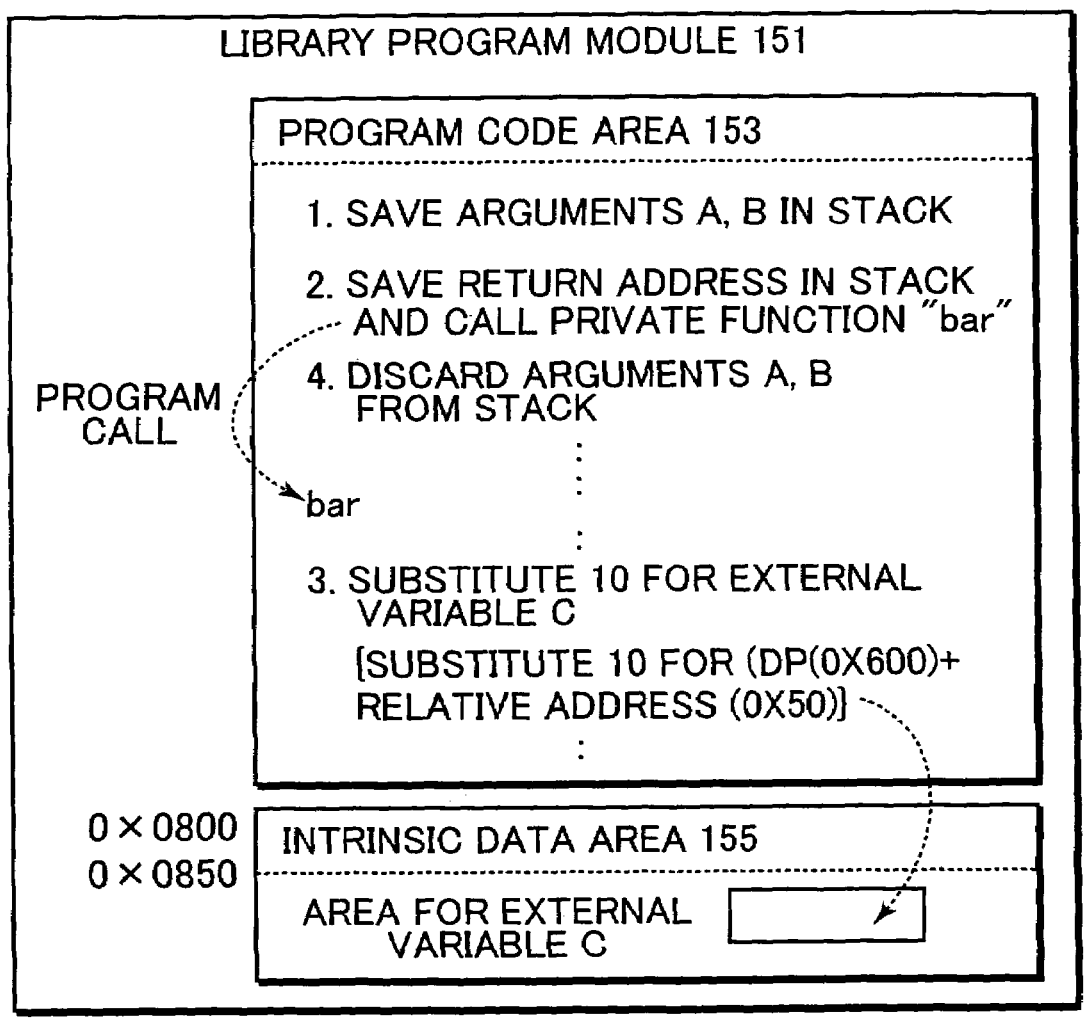
FIG. 13 is a diagram showing a code area and a data area of the library program module according to the second embodiment of the invention.

FIG. 13 is a diagram showing a code area and a data area of the library program module according to the second embodiment. When the description to call the private function "bar" is made in the program code area 153 of the library program module 151, an object program for executing a step of saving arguments A, B, which are data to be used in the function "bar", in the stack to transfer them to the function "bar", a step of saving an address (return address) of a command next to a command to jump to the function "bar" in the stack and jumping to the function "bar", and a step of discarding the arguments A, B from the stack at the time of the return from the function "bar" is generated by the compiling unit of this embodiment as shown in FIG. 11.

Thus, in cases where the calling program module and the program module to be called need not necessarily use different data areas, the execution of the object program can be speeded up by making the private declaration for the function "bar" to delete the steps of saving, setting and resetting the value of the DP, and the object program size can be made smaller since the unnecessary steps are not performed.

Upon the execution of such a private-declared function "bar", the content of the DP does not change while being left at the state in the program module as a calling program as shown in FIG. 11. Thus, when the readout of the data or the like is, for example, executed for an external variable C, the intrinsic data area (intrinsic data area 155 in this case) of the calling program module is accessed.

Although not shown, it is not necessary to, for example, reset the value of the DP, either, at the time of the return from the declared private function "bar" to the calling program.

In the embodiment described thus far, the private function is declared and a series of processings including the saving of the value of the DP are not performed, for example, if "private" is described before the function "bar" If no particular description is made, the function "bar" is not a private function and the processings of saving the value of the DP and the like are performed.

However, in another embodiment, a description "public" or the like can be given to explicitly indicate that the function is not private function.

Such a description is sometimes called a "public declaration" or a "public function declaration". A series of processings including the saving of the value of the DP can be explicitly indicated by giving this description.

In still another embodiment, a function to which this "private declaration" is given may be a function which is called or can be called only within the same program module. In further another embodiment, a function to which this "private declaration" is given may be a function which is called or can be called only between different program modules.

Although C language is extended by adding new keywords "private" and "public" to give declarations in this example, declarations may be given without extending the use of the language, by using pragmatics or the like. Alternatively, declarations may be described as separate files or designated as arguments of a compiler.

In this way, since whether or not to shorten the process is discriminated in accordance with the description of the program code area of the library program module called from the program code area included in the application program module, the execution of the object program can be speeded up by deleting the processings of saving, setting and resetting the address, and the object program size can be made smaller by performing no unnecessary processing in cases where the application program module and the library program module need not necessarily use different data areas.

Further, since the description of the program code area of the library program module is a declaration described for each program code area, the processings of saving, setting and resetting the address can be deleted depending on the processing content of the program code area of the library program module based on the presence or absence of this declaration. Therefore, the execution of the object program can be speeded up.

Third Embodiment

In the first embodiment, all the external variables (e.g. C) used by the function "bar" are accessed using an address obtained by adding the relative address (e.g. 0x50) from the DP to the value (e.g. 0x800) saved in the DP.

As a result, the function "bar" can use the intrinsic data area 155 for the application program module 121, which is the memory area whose starting address is, for example, 0x800, as an area for all the external variables to be used.

However, in a third embodiment of the present invention to be described next, the source program of, for example, the function "bar" can include a description relating to a data memory area commonly accessed by a plurality of application program modules for calling, for example, the function "bar" in its variable declaring portion.

FIGS. 14A and 14B are diagrams showing exemplary source program and object program according to the third embodiment, wherein FIG. 14A shows an exemplary source program of a library program module according to the third embodiment and FIG. 14B shows an exemplary object program of the library program module according to the third embodiment.

In FIGS. 14A and 14B, a declaration is written in C language. In this example, the language specification of C language is extended to add a new keyword "common" and a declaration is described by giving this qualifier "common" to a source code.

For example, in a program of a function "bar" shown in FIGS. 14A, D and C are used as external variables used by the function "bar". These declarations are, for example, descriptions "common int D;" and "int C;" shown in FIG. 14A.

The description "common int D;" declares that the external variable D is an external variable commonly accessed by a plurality of calling application programs to call the function "bar".

Although the declarations are given by adding the new keyword "common" to extend C language in this example, they may be given without extending the language specification, by using pragmatics or the like.

Alternatively, declarations may be described as separate files or designated as arguments of a compiler.

As shown in FIG. 14A, the external variable D included in the source program of the application program module includes a description that this external variable D is "common". This description is to declare that "the external variable D is a so-called common external variable" and is sometime called, for example, a "common declaration" or a "common external variable declaration".

Figure 15A:
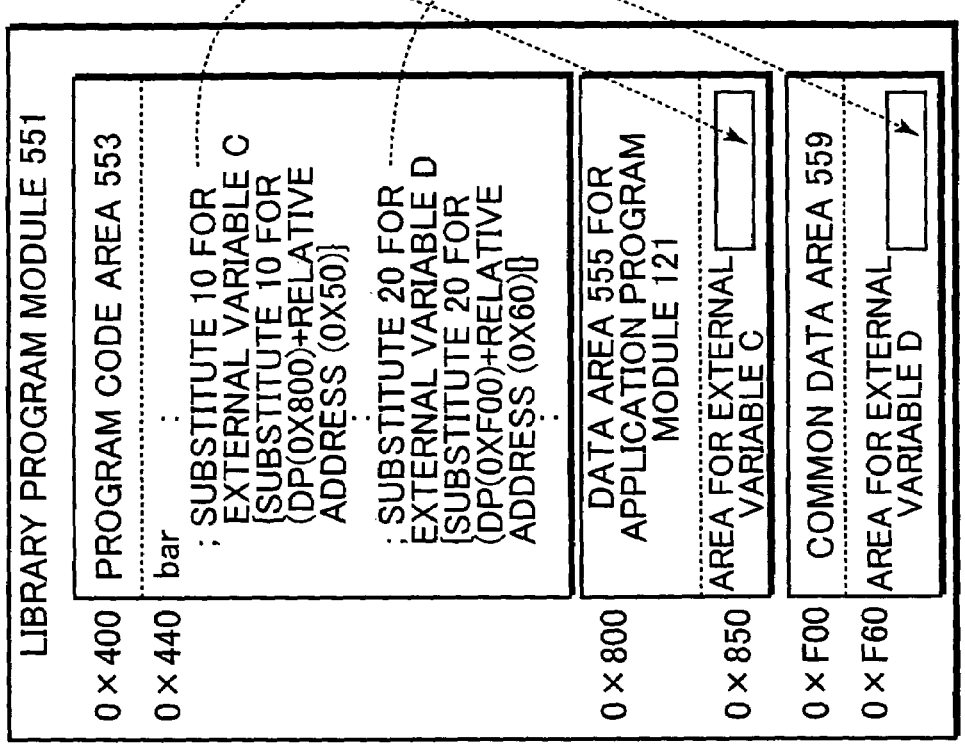
FIGS. 15A and 15B are diagrams showing a code area and a data area of the library program module according to the third embodiment of the invention.
Figure 15B:
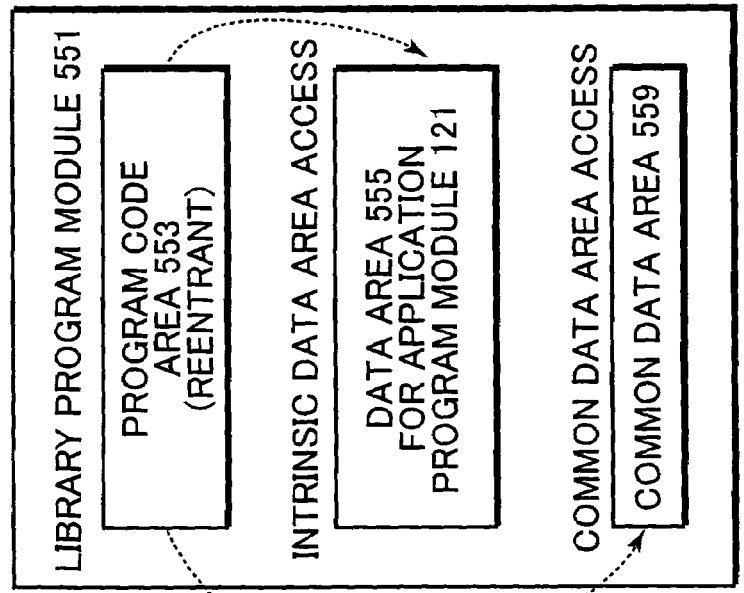

FIGS. 15A and 15B are diagrams showing a code area and a data area of the library program module according to the third embodiment.

FIG. 15A shows that a program code area 553 corresponds to a reentrant function "bar" and both a data area 555 for an application program module 121, which is an intrinsic data area, and a common data area 559 are accessed from this program. Although the term "common data area" is used here, this area needs not be commonly used for other certain purpose or application, strictly speaking, and may not be used for other certain purpose or application. This also applies to the other description.

FIG. 15B shows in more detail that the external variable C is saved in the data area 555 for the application program module 121 which area is an intrinsic data area, and the external variable D is saved in the common data area 559 accessed by a common data area access.

The description "int C;" of FIG. 14A is to declare that the external variable C uses an intrinsic memory area for each of a plurality of calling application program modules to call the function "bar". By this description, the external variable C is saved in the intrinsic data area 555 for the application program module (the program module 121 in this example) accessed by an intrinsic data area access as shown in FIG. 15B.

In the function "bar", when the external variable C saved in the intrinsic data area 555 for each of the calling application programs (e.g. the program module 121 in this example) is accessed to, for example, substitute a value of 10 for the external variable C in this memory area, this value of 10 is substituted at an address obtained by adding a relative address (e.g. 0x50) from the DP to the value saved in the DP (e.g.

0x800). This command format is shown in FIGS. 14B and 15B. The command format at this time is same as in the first embodiment.

As shown in FIG. 15B, the function "bar" can access the intrinsic data area 555 for the application program module 121 which is a memory area starting, for example, from the address 0x800. The function "bar" is simultaneously called by a plurality of application program modules (e.g. the application program module 121 and the application program module 131 of FIG. 4A). Even if the reentry occurs as a result, accesses to the external variables do not collide.

The description "common int D;" of FIG. 14A is to declare that the external variable D uses the memory area commonly used by a plurality of calling application programs to call the function "bar". By this description, the external variable D is saved in the common data area 559 commonly used by a plurality of application program modules and accessed by a common data area access as shown in FIG. 15B.

In the function "bar", when the external variable D saved in the common data area 559 commonly used by the calling application programs (e.g. the program module 121) to, for example, substitute a value of 20 for the external variable D in this memory area, this value of 20 is substituted at an address obtained by adding a relative address (e.g. 0x60) from a special register SDP to a value (e.g. 0xF00) saved in the special register SDP. This common format is shown in FIGS. 14B and 15B.

This SDP is a special register for saving the leading address of one common data area for all the program modules. The leading address of this common data area for all the application programs, which address is the value saved in the SDP, is itself called SDP sometimes.

In another embodiment, a generally used register may be used as this SDP without using a special register as such. Such an embodiment is particularly effective in an MPU (micro processing unit) provided with many generally used registers and is even more effective in an MPU in which this generally used register can be used as an offset address for a memory access.

In still another embodiment, an ordinary memory or stack may be used as the SDP without using a special register or a generally used register as such.

However, in such an embodiment, several processings may be necessary for a memory access using the SDP saved in the stack or the ordinary memory as an offset address.

These processings include, for example, a processing of reading the SDP saved in the stack or memory and saving it in a register usable as an offset address for a memory access and a processing of retracting the present content of the register as a preparation for the former processing.

By accessing the memory area using the value saved in the SDP register as an offset address in these methods, the function "bar" can access the common data area 559 for the application program modules, which is a memory area starting, for example, from the address 0xF00 as shown in FIG. 7B.

Although the value of the SDP is not shown, it may be saved in the intrinsic data area 125 similar to the intrinsic data area address of the library program module 151 as shown in FIG. 7A and may be saved and set during a processing of calling the library program module 151 from the application program module 121.

For example, the present SDP can be saved in the stack before the present DP (0x0600) is saved in the stack in Step S1 of FIG. 3.

Further, a new SDP (0x0F00) can be set before the new DP (0x0880) is set in Step S2 of FIG. 3.

By saving the present SDP in the stack before the arguments A, B are saved in the stack in this way, the presence or absence of the SDP saved in the SDP does not concern the library program module to be called. Since this is same as in the first embodiment, no detailed description is given here.

In such an embodiment, when the function "bar" is simultaneously called from a plurality of application program modules (e.g. the application program module 121 and the application program module 131 of FIG. 4A) and the reentry occurs as a result, it is explicit that the data can be commonly used and transferred and applied to other processings commonly using some of the external variables.

At this time, a reconciliation using the aforementioned semaphore or the like may be made or may have to be made. However, since it is not directly related to the content of the present invention, no description is given thereon.

As described above, even if the library program module is called from a plurality of application program modules, no collision occurs, for example, in the accesses to the external variables since the execution intrinsic data memory areas provided for the respective application program modules are accessed. Thus, the program module can be configured to be reentrant. Further, even if the library program module is called from a plurality of application program modules, some of the external variables can be, for example, commonly used since the execution common data memory area commonly used by the respective application program modules is accessed.

The description for specifying which of the execution common data memory area for the library program module and the execution intrinsic data memory area for the library program module is to be used is a common declaration described for each external variable included in the library program module. Thus, the execution common data memory area and the execution intrinsic data memory area can be easily properly used by judging the presence or absence of the common declaration.

Fourth Embodiment

FIGS. 16A, 16B and 16C are diagrams conceptually showing an exemplary application program module 121 which is a calling program to be converted by a compiler, an exemplary library program module 151 to be called, and an exemplary process performed at the time of calling the library program module 151 according to a fourth embodiment of the present invention. Specifically, FIG. 16A shows an exemplary table saving addresses of intrinsic data areas of each program module, FIG. 16B shows an exemplary code area and an exemplary data area of the application program module according to the fourth embodiment and FIG. 16C shows an exemplary code area and an exemplary data area of the library program module according to the fourth embodiment.

As shown in FIG. 16A, in the fourth embodiment, the table storing addresses of the intrinsic data areas of each program module called a CCT (context control table) is provided for each calling application program module, for each calling application program, for each calling application process, for each calling process, for each calling task, for each calling application, for each calling process or for each calling task.

In the calling application program module 121, an intrinsic data area 125 for the application program module 121 is used by referring to the CCT for the application program module 121 to read out "0x600" which is an address of the data area of the application program module 121 itself, setting this value in a DP, and accessing an external variable using this value as an offset address.

In order to call a function "bar" included in the library program module 151 from this application program module 121, arguments A, B to be transferred to the function "bar" are first saved in a stack.

Subsequently, in the application program module 121, an address used to return from the function "bar" to the application program module 121 itself, i.e. an address next to a jump command to jump to the function "bar" is saved in the stack and a control is switched over to the function "bar".

In the function "bar" which is included in the library program module 151 to be called and to which the control was switched over, a present content of the DP is saved. The present content of the DP is a value of the intrinsic data address for the calling application program module 121. This value is saved to be reset in the DP for the use of the intrinsic data area for the application program module 121 at the time of the return from the function "bar" to the calling program.

Subsequently, a pointer address for the CCT for the application program module 121 is read out by referring to the content of the DP; the CCT for the application program module 121 is read out by referring to this pointer address; and an address (0x800 in this example) of a data area 155 for the application program module 121 intrinsically used by the application program module 121 in the function "bar" is read out and set in the DP register.

In the function "bar" included in the library program module 151 called by the application program module 121, the value of the DP register is used as a base address of a relative address upon an access to an external variable. Thus, all the external variables used by the function "bar" are accessed using 0x800 as the base address of the relative address, and the data area 155 for the application program module 121 is allotted as long as the library program module 151 is called from the application program module 121.

Thus, accesses to the external variables do not collide even if the function "bar" experiences reentry upon being called by a plurality of application program modules.

At the time of returning from the function "bar" to the calling application program module 121, the content of the DP is reset to the saved value of the intrinsic data area address for the calling application program module 121 and the return is made.

Thus, in the calling application program module 121, its data area can be used again.

In the fourth embodiment, since the DP is not set at the library program module 151 to be called, the size of the object program at the called side can be made smaller, which is particularly effective in the case that the library program module 151 is frequently called.

In this way, even if the reentry of the application program modules to the library program module occurs, no collision occurs, for example, in accesses to the external variables since accesses are made via the tables (CCT) storing the leading addresses of the data memory areas of the respective program modules. Thus, the program module can be configured to be reentrant.

Although not shown, if a "private declaration" is given for the function "bar" in FIG. 16C, the aforementioned processings of saving the value of the DP and setting the value of the DP for the function "bar" used upon being called from the application program module 121 by reading it out from the CCT are not performed as in the second embodiment. If a "public" declaration is given, the aforementioned processings of saving the value of the DP and setting the value of the DP for the function "bar" used upon being called from the application program module 121 by reading it out from the CCT are explicitly performed. Since these are same as in the second embodiment, no description is given thereon.

In this case, whether or not to shorten the process is discriminated based on the description of the program code area included in the library program module called from the program code area included in the application program module. Accordingly, in cases where the application program module and the library program module to be called need not necessarily use different data areas, the processing of setting the leading address via the tables (CCT) storing the leading addresses of the data areas for the respective program modules can be deleted, thereby speeding up the execution of the object program. The size of the object program can be made smaller by not performing the unnecessary processing.

Although not shown, instead of saving not only the value of the DP, but also the value of the new SDP (0x0F00) described in the third embodiment in the intrinsic data area 125 of FIG. 7A and saving and setting them in the program code area 123 of the calling program module 121, a table similar to the CCT of FIG. 16A may be, for example, prepared; the leading address of the common data area for the respective program modules may be saved in this table; the table similar to the CCT and the value of the SDP saved in this table are read and set during the processing, for example, in the program code area 153 of the library program module 151 of FIG. 16C which is a library program module to be called. Since this is same as the saving and setting of the value of the DP mentioned above, no description is given thereon. Unlike the CCT, the table similar to the CCT may possess only one execution environment.

Fifth Embodiment

Next, a fifth embodiment of the present invention is described. In the fifth embodiment, identification numbers are given to program modules; a table corresponding the identification numbers and DPs of data areas of the respective program modules is prepared; the table is referred to using the identification number of the program module as an index when the library program module is called from the application program module, thereby switching the DP in the data area of the library program module and the one in the data of the application program module.

Figure 17:
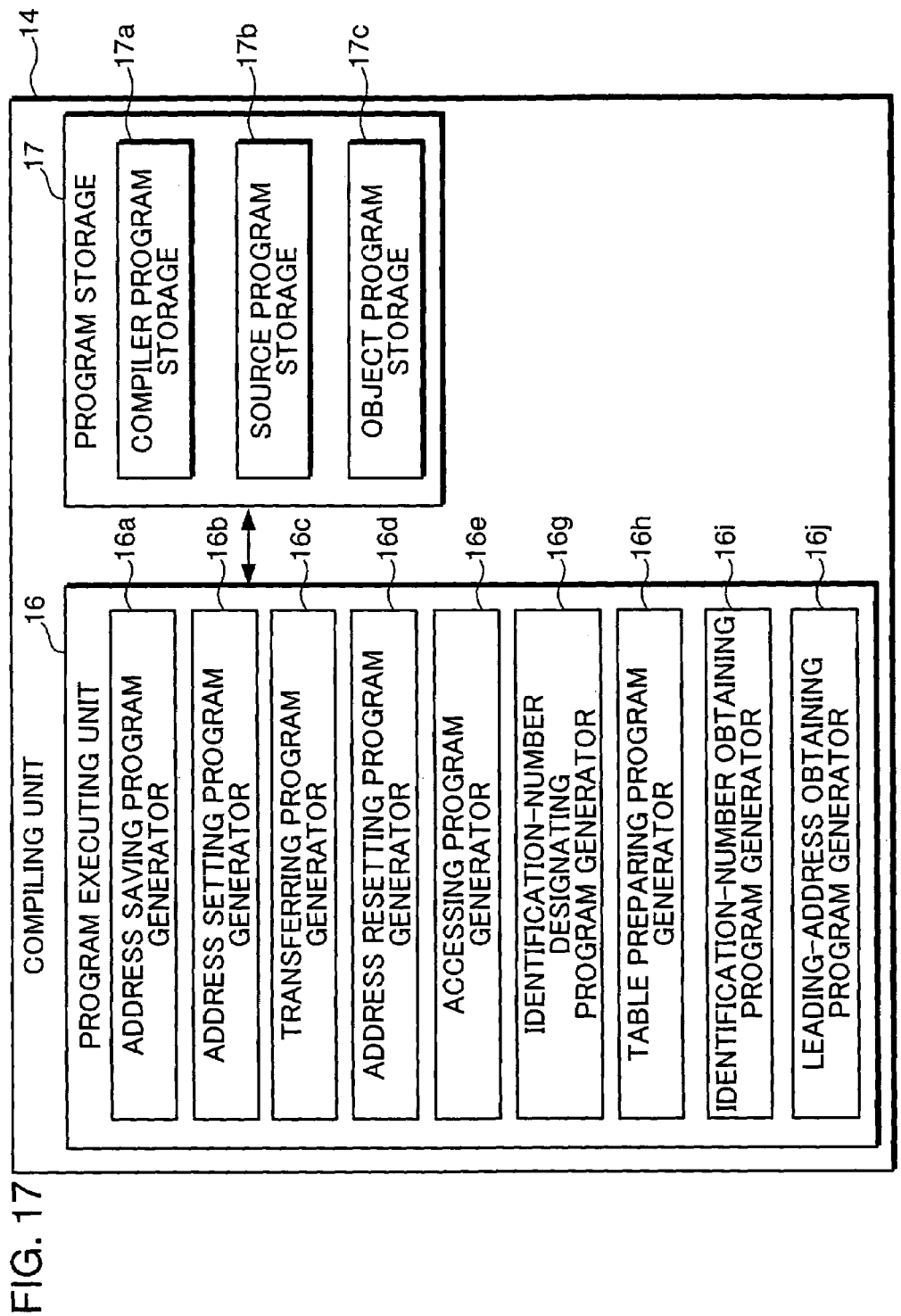
FIG. 17 is a block diagram showing the construction of a compiling unit according to a fifth embodiment of the invention.

FIG. 17 is a block diagram showing the construction of a compiling unit according to the fifth embodiment of the present invention. The compiling unit 14 shown in FIG. 17 is provided with a program executing unit 16 and a program storage 17.

The program executing unit 16 is constructed by, for example, a CPU (central processing unit) and includes an address saving program generator 16a, an address setting program generator 16bn, a transferring program generator 16c, an address resetting program generator 16d, an accessing program generator 16e, an identification-number designating program generator 16g, a table preparing program generator 16h, an identification-number obtaining program generator 16i and a leading-address obtaining program generator 16j. The program storage 17 includes a compiler program storage 17a, a source program storage 17b and an object program storage 17c.

The same elements of the compiling unit according to the fifth embodiment shown in FIG. 17 as those of the compiling unit according to the first embodiment shown in FIG. 2 are identified by the same reference numerals, and only the construction different from the first embodiment is described below.

The identification-number designating program generator 16g generates an identification-number designating program for designating identification numbers for identifying the calling program modules and the one for identifying the other program module.

The table preparing program generator 16h generates a table preparing program for relating the designated identification numbers of the calling program modules and the leading addresses of data areas of the calling program modules and relating the designated identification number of the other program module and the leading address of data area of the other program module.

The identification-number obtaining program generator 16i generates an identification-number obtaining program for obtaining the identification number of the other program module upon a call command to the other program module from the calling program module.

The leading-address obtaining program generator 16j generates a leading-address obtaining program for obtaining the leading address of the data area of the other program module from the prepared table using the obtained identification number as an index.

Figure 18:
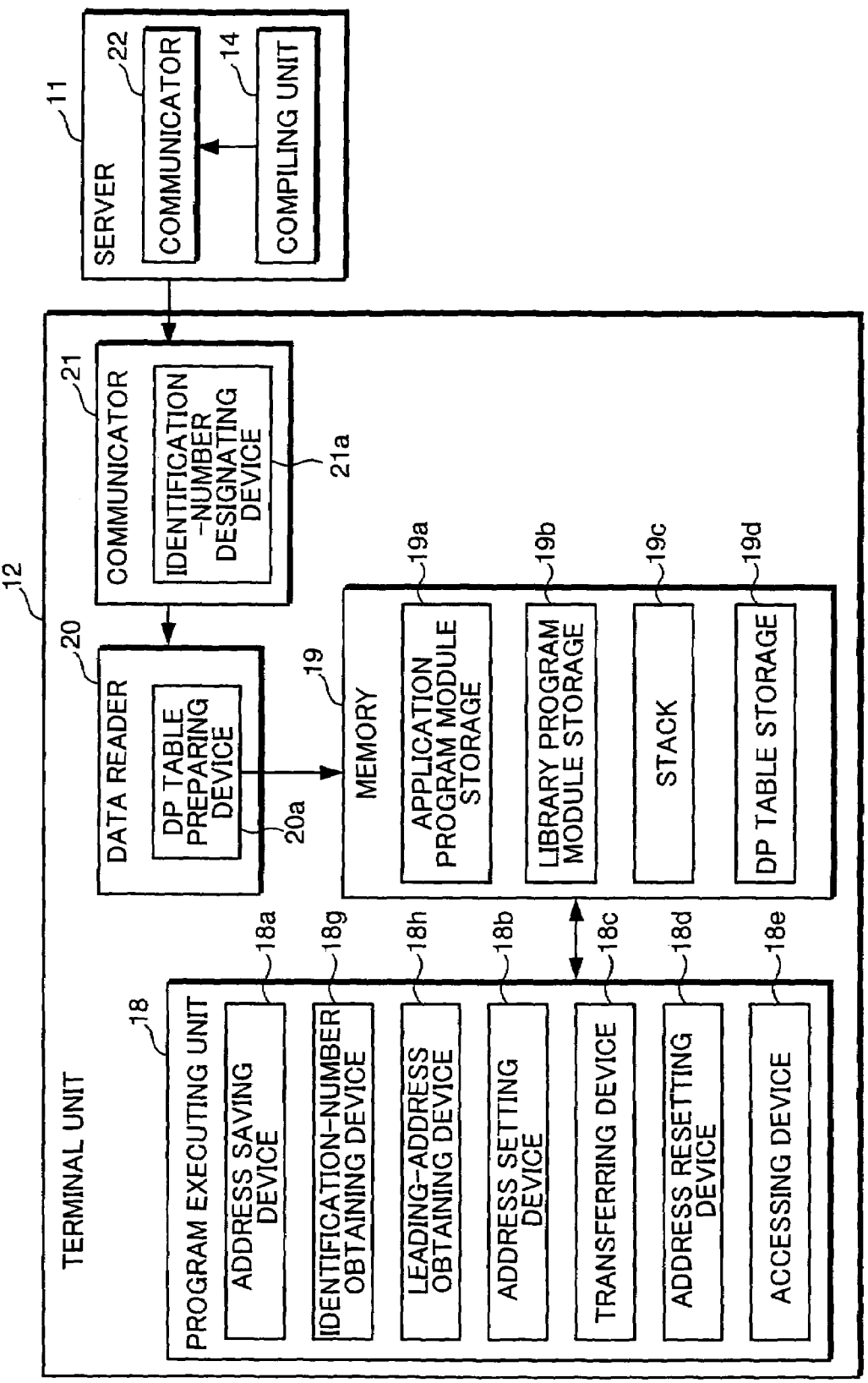
FIG. 18 is a block diagram showing the construction of a terminal unit according to the fifth embodiment of the invention.

FIG. 18 is a block diagram showing the construction of a terminal unit according to a fifth embodiment of the present invention. The terminal unit 12 shown in FIG. 18 is provided with a program executing unit 18, a memory 19, a data reader 20 and a communicator 21. The communicator 21 saves a downloaded object program transmitted from a server 11 in the memory 19 and includes an identification-number designating device 21a. The data reader 20 is adapted to read the object program downloaded by the communicator 21 in the memory 19 and includes a DP table preparing device 20a. The program executing unit 18 is constructed, for example, by a SDP or the like and includes an address saving device 18a, an address setting device 18b, a transferring device 18c, an address resetting device 18d, an accessing device 18e, an identification-number obtaining device 18g and a leading-address obtaining device 18h. The memory 19 includes an application program module storage 19a, a library program module storage 19b, a stack 19c and a DP table storage 19d.

The same elements of the terminal unit according to the fifth embodiment shown in FIG. 18 as those of the compiling unit according to the first embodiment shown in FIG. 5 are identified by the same reference numerals, and only the construction different from the first embodiment is described below.

The identification-number designating device 21a designates the identification numbers for identifying the application program modules as the calling program modules to the application program modules and the identification number for identifying the library program module as the other program module to the library program module.

The DP table preparing device 20a relates the identification numbers of the application program modules designated by the identification-number designating device 21a to the leading addresses (DPs) of the data areas of the application program modules and relates the identification number of the library program module designated by the identification-number designating device 21a to the leading address (DP) of the data area of the library program module, and saves it in the DP table storage 19d.

The identification-number obtaining device 18g obtains the identification number of the library program module upon the call command to the library program module from the application program module.

The leading-address obtaining device 18h obtains the leading address of the data area of the library program module from the DP table generated by the DP table preparing device 20a using the identification number obtained by the identification-number obtaining device 18g as an index.

The address setting device 18b sets the leading address of the data area used by the library program module to be called by the application program module at the leading address obtained by the leading-address obtaining device 18h.

The DP table storage 19d saves the DP table generated by the DP table preparing device 20a.

Figure 19:
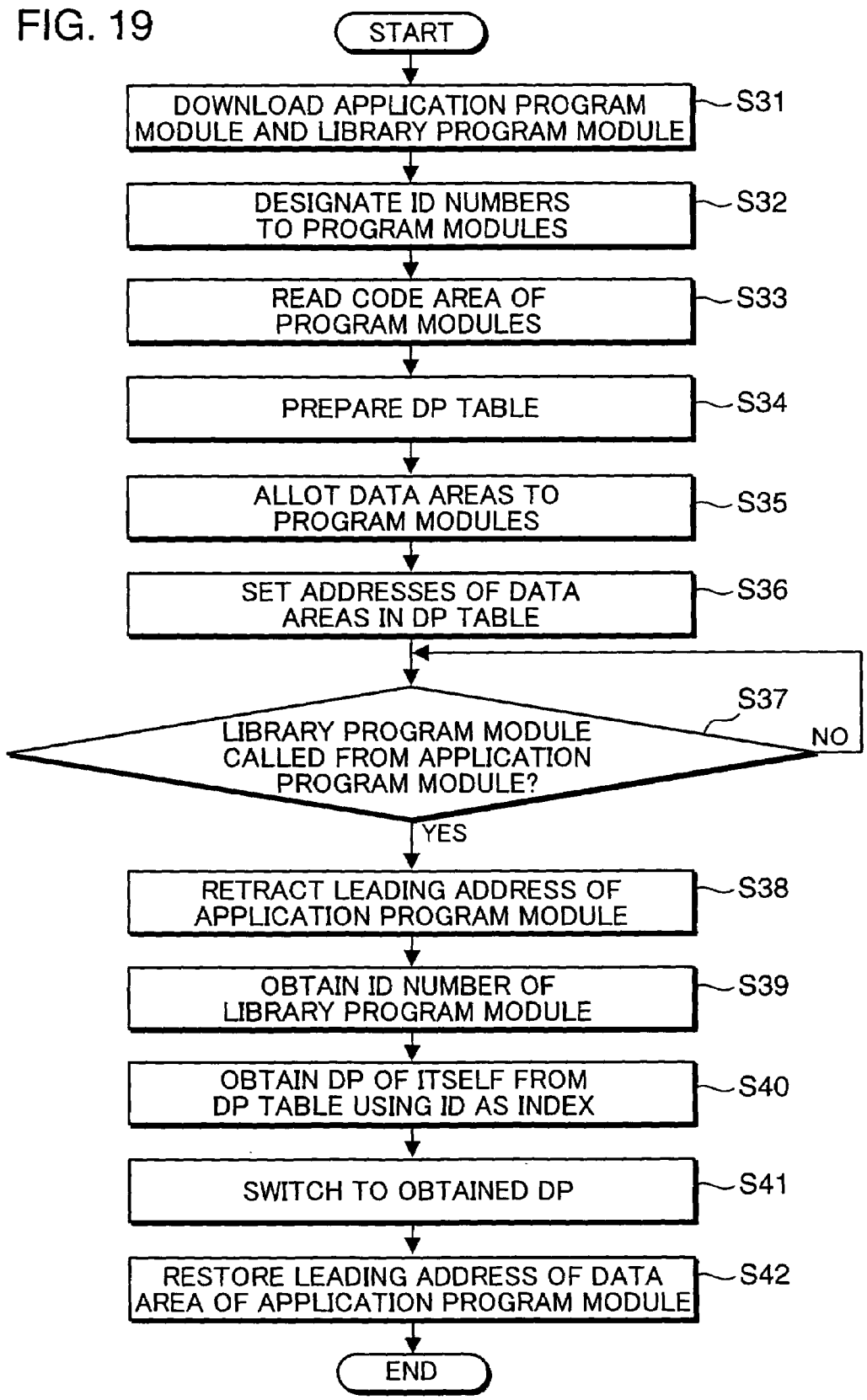
FIG. 19 is a flow chart showing an exemplary dynamic module linking process by the terminal unit shown in FIG. 18.

FIG. 19 is a flow chart showing an exemplary dynamic module linking process by the terminal unit shown in FIG. 18.

In Step S31, the communicator 21 downloads the application program module converted from a source program into an object program by the compiling unit 14 of the server 11 and the library program module.

In Step S32, the identification-number designating device 21a designates the intrinsic identification numbers to the downloaded application program module and library program module. The identification numbers designated by the identification-number designating device 21a are saved in the application program module storage 19a and the library program module storage 19b, respectively.

In Step S33, the data reader 20 reads the code areas of the application program module and the library program module.

In Step S34, the DP table preparing device 20a generates the DP table relating the leading addresses of the data areas of the respective program modules and the identification numbers of the respective program modules in the DP table storage 19d of the memory 19. It should be noted that no data is yet inputted to the DP table and only an area is secured in the memory at this time.

In Step S35, the data reader 20 allots the data areas to the accessing program and the library program module. Specifically, the data areas of the application program module and the library program module are saved in the application program module storage 19a and the library program module storage 19b of the memory 19.

In Step S36, the DP table preparing device 20a relates the leading address (DP) of the data area of the application program module to the identification number of the application program module saved in the DP table storage 19d, and relates the leading address of the data area of the library program module to the identification number of the library program module saved in the DP table storage 19d.

In Step S37, the identification-number obtaining device 18g judges whether or not the library program module has been called from the application program module. Here, Step S38 follows if the library program module is judged to have been called from the application program module, whereas a standby state is set until the library program module is called from the application program module if the library program module is judged not to have been called from the application program module.

In Step S38, the address saving device 18a retracts the leading addresses of the code area and the data area of the application program module by saving them in the stack 19c of the memory 19, In Step S39, the identification-number obtaining device 18g obtains the identification of the library program module saved in the library program module storage 19b.

In Step S40, the leading-address obtaining device 18h refers to the DP table saved in the DP table storage 19d using the identification number of the library program module obtained by the identification-number obtaining device 18g as an index and obtains the leading address corresponding to the identification number of the library program module.

In Step S41, the address setting device 18b switches the leading address of the data area of the application program module by setting the leading address of the data area of the library program module obtained by the leading-address obtaining device 18h.

In Step S42, the address resetting device 18d restores the leading addresses of the code area and the data area of the application program module retracted to the stack 19c of the memory 19 by the address saving device 18b by resetting them.

In this way, first, the identification-number designating program generator 16g generates the identification-number designating program for designating the identification number for identifying the application program module and the one for identifying the library program module. Then, the table preparing program generator 16h generates the table preparing program for preparing the table relating the designated identification number of the application program module and the leading address of the data area of the application program module and the designated identification number of the library program module and the leading address of the data area of the library program module. Upon the call command to the library program module from the application program module, the identification-number obtaining program generator 16i generates the identification-number obtaining program for obtaining the identification number of the library program module. The leading-address obtaining program generator 16j generates the leading-address obtaining program for obtaining the leading address of the data area of the library program module from the prepared table, using the obtained identification number as an index. Further, the address setting program generator 16b generates the leading-address switching program for switching the leading address of the data area of the application program module to the obtained leading address.

Accordingly, instead of preparing the table for the address conversion page by page as in a conventional MMU (memory management unit), such a table can be prepared module by module, whereby an amount of the data of the table can be reduced to conform to small-size apparatuses having a strict resource restriction. Further, since the amount of the data of the table can be reduced, an execution speed can be increased as compared to the address conversion by the conventional MMU.

The program executing unit 16 of the compiling unit 14 may be provided with an address latching program generator for generating an address latching program for latching addresses to variables or functions defined outside the library program module, and the program executing unit 18 of the terminal unit 12 may be provided with an address latching device for latching addresses to the variables or functions defined outside the library program module. In this case, the accessing device 18e accesses a variable defined inside the library program module using a relative address from the leading address obtained by the leading-address obtaining device 18h while accesses a function defined inside the library program module using a relative address from a PC (program counter). Further, the accessing device 18e indirectly accesses a variable or a function defined outside the library program module via the address latched by the address latching device after accessing the address latched by the address latching device using a relative address from the leading address obtained by the leading-address obtaining device 18h.

With this configuration, the address latching program generator generates the address latching program for latching the address to the variable or function defined outside the library program module. Then, the accessing program generator 16e generates the accessing program for accessing the variable or function defined inside the library program module using the relative address from the obtained leading address, accessing the function defined inside the library program module using the relative address from the program counter, and indirectly accessing the variable or function defined outside the library program module via the address latched by the latched address latching device after accessing the latched address using the relative address from the obtained leading address. Accordingly, the variable or function defined outside the library program module can be indirectly accessed via the latched address.

In this embodiment, the terminal unit 12 downloads the table preparing program generated by the table preparing program generator 16h provided in the compiling unit 14, whereby the data reader 20 functions as the DP table preparing device 20a, and the terminal unit 12 downloads the identification-number designating program generated by the identification-number designating program generator 16g, whereby the communicator 21 functions as the identification-number designating device 21a. However, the data reader 20 may be provided with a function as the DP table preparing device 20a in advance and the communicator 21 may be provided with a function as the identification-number designating device 21a in advance. In such a case, the program executing unit 16 of the compiling unit 14 shown in FIG. 17 only includes the address saving program generator 16a, the address setting program generator 16b, the transferring program generator 16c, the address resetting program generator 16d, the accessing program generator 16e, the identification-number obtaining program generator 16i and the leading-address obtaining program generator 16j.

In this way, the identification-number obtaining program generator 16i generates the identification-number obtaining program for obtaining the identification number for identifying the library program module upon the call command to the library program module from the application program module. The leading-address obtaining program generator 16j generates the leading-address obtaining program for obtaining the leading address of the data area of the library program module from the table relating the identification number of the application program module to the leading address of the data area of the application program module and relating the identification number of the library program module to the leading address of the data area of the library program module. Then, the address resetting program generator 16d generates the leading-address switching program for switching the leading address of the data area of the application program module to the obtained leading address.

By preparing the table for the address conversion not page by page, but module by module, the amount of the data of the table can be reduced and the table can conform to small-size apparatuses having a strict resource restriction. Further, a time required for the compiling process can be shortened and an amount of the data of the program module to be transmitted to the terminal units 12 can be reduced since the program for designating the identification numbers and the one for preparing the table need not be compiled.

Next, a method for solving a fragmentation is described. If data are repeatedly written in and deleted from a memory, empty areas in the memory are fragmented and it becomes difficult to continuously save one data in the memory. In such a case, one data has to be saved over a plurality of areas, leading to a reduction in an accessing speed to the memory. Thus, it is necessary to integrate the fragmented memory areas into a continuous memory area.

Figure 20:
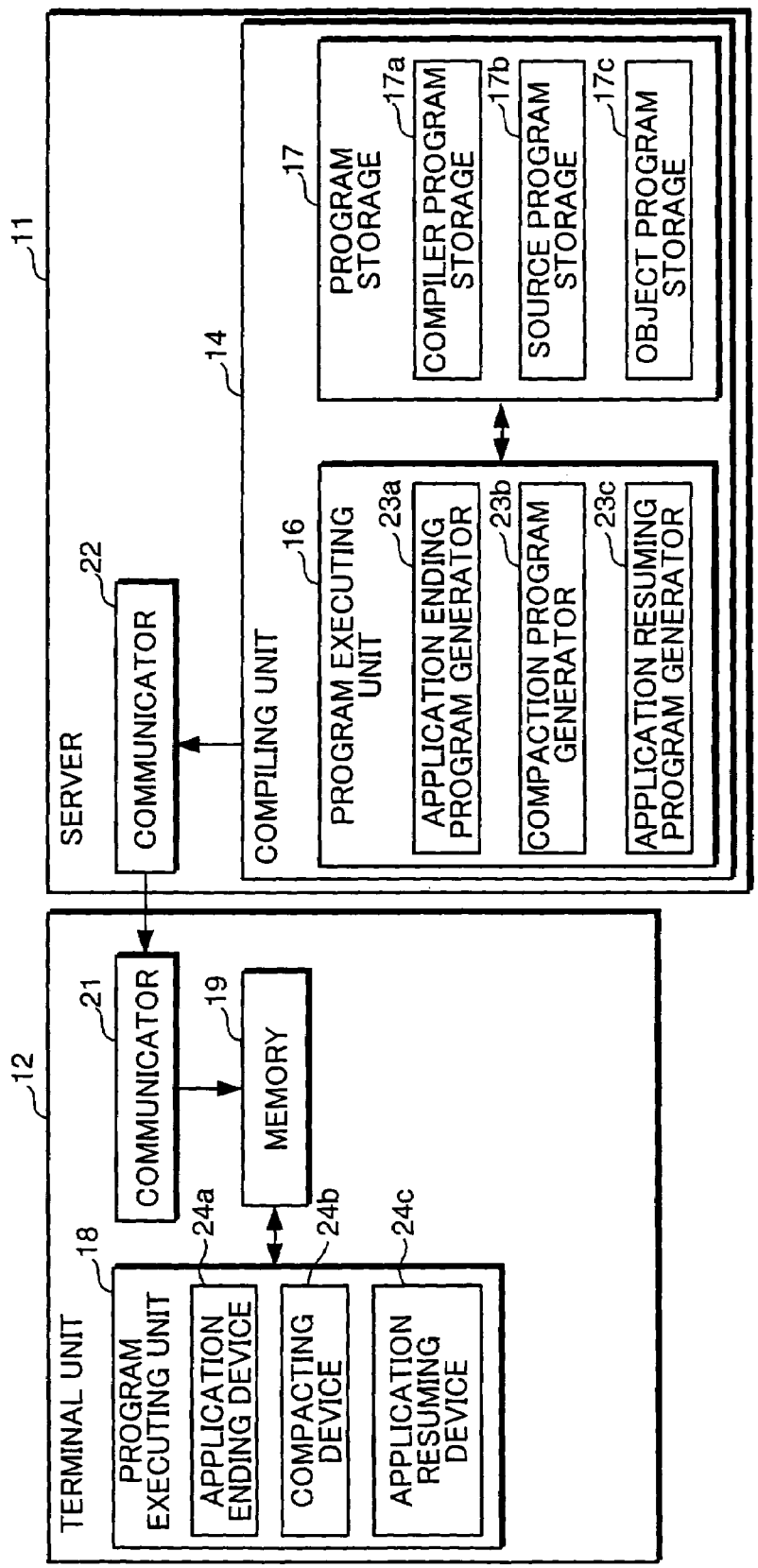
FIG. 20 is a block diagram showing the constructions of the compiling unit and the terminal unit for solving a fragmentation.

FIG. 20 is a block diagram showing the constructions of a compiling unit and a terminal unit for solving the fragmentation. It should be noted that no description is given on the same elements as those of the other embodiments by identifying them by the same reference numerals.

As shown in FIG. 20, a server 11 is provided with a communicator 22 and a compiling unit 14. The communicator 22 transmits an object program converted by the compiling unit 14 to a terminal unit 12. The compiling unit 14 is provided with a program executing unit 16 and a program storage 17. The program executing unit 16 includes an application ending program generator 23a, a compaction program generator 23b and an application resuming program generator 23c.

The application ending program generator 23a generates an ending program comprised of at least one program module and adapted to end an application being presently executed.

The compaction program generator 23b generates a compaction program for compacting a memory 19, i.e. applying a compaction to the memory 19 after the application is ended. The compaction means to integrate fragmented areas in the memory 19 into a continuous area.

The application resuming program generator 23c generates a resuming program for resuming the ended application from the beginning after the memory 19 is compacted.

The terminal unit 12 is provided with a program executing unit 18, the memory 19 and a communicator 21. The communicator 21 receives the object program transmitted from the server 11 and saved it in the memory 19. The program executing unit 18 includes an application ending device 24a, a compacting (compaction) device 24b, and an application resuming device 24c.

The application ending device 24a is comprised of at least one program module, and ends the application being presently executed. The compacting device 24b compacts the memory 18 after the application is ended by the application ending device 24a. The application resuming device 24c resumes the application ended by the application ending device 24a from the beginning after the memory 19 is compacted.

In this way, the application ending program generator 23a generates the ending program comprised of at least one module and adapted to end the application being presently executed. After the application is ended, the compaction program generator 23b generates the compaction program for compacting the memory 19. The application resuming program generator 23c generates the resulting program for resuming the application from the beginning after the memory 19 is compacted. Accordingly, the fragmentation of the memory can be solved, enabling the effective use of the memory.

Next, a first modification of the method for solving the fragmentation of the memory is described. In the first modification, the state of an application being presently executed is saved using such information independent of address values, and the application is executed in the saved state after the compaction.

Figure 21:
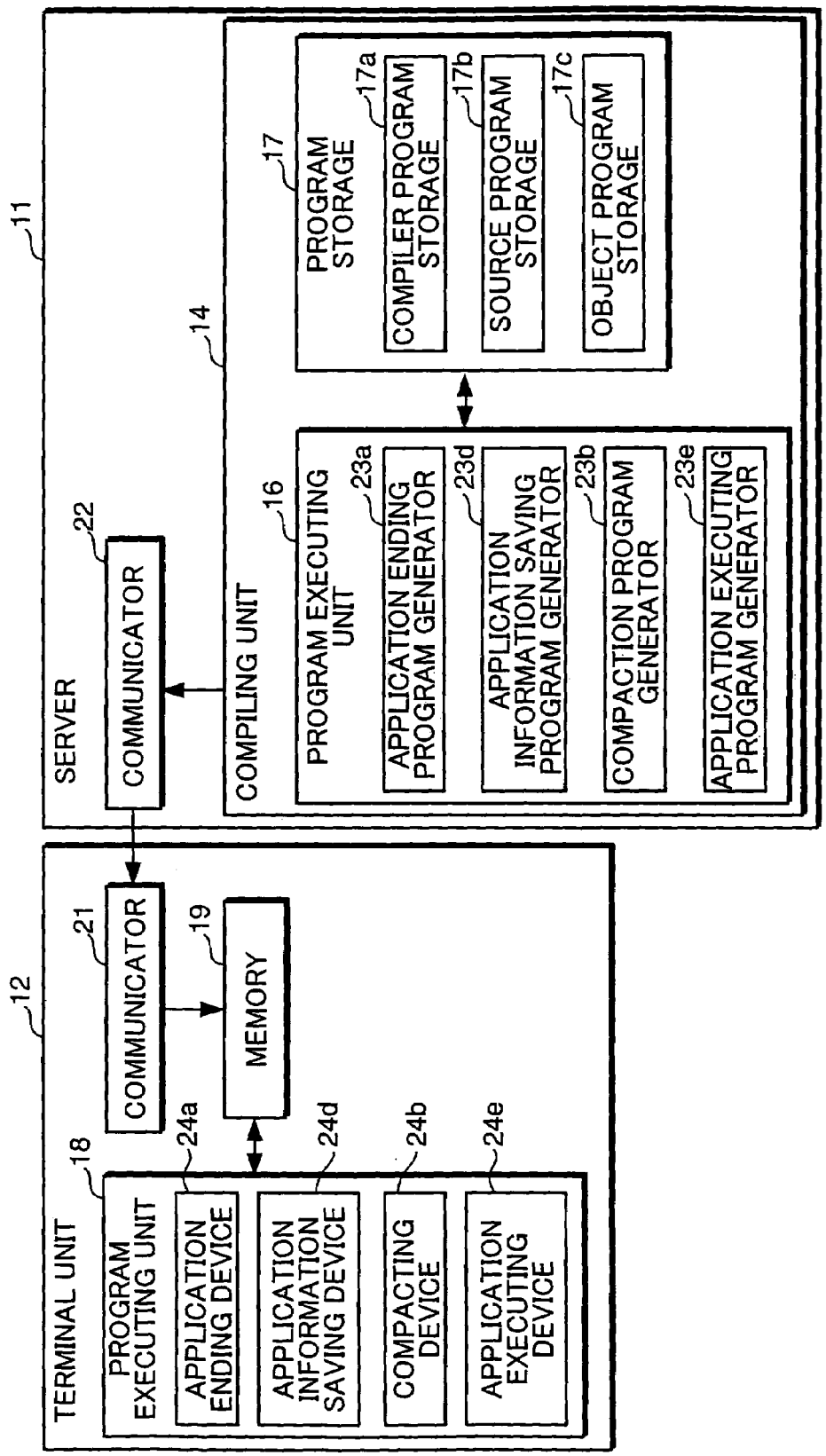
FIG. 21 is a block diagram showing the constructions of a compiling unit and a terminal unit for solving a fragmentation according to a first modification.

FIG. 21 is a block diagram showing the constructions of a compiling unit and a terminal unit for solving the fragmentation according to the first modification. It should be noted that no description is given on the same elements as those of the other embodiments by identifying them by the same reference numerals.

As shown in FIG. 21, a server 11 is provided with a communicator 22 and a compiling unit 14. The compiling unit 14 is provided with a program executing unit 16 and a program storage 17. The program executing unit 16 includes an application ending program generator 23a, an application information saving program generator 23d, a compaction program generator 23b and an application executing program generator 23e.

The application information saving program generator 23d generates a saving program for saving such information independent of address values of the application until the application was ended.

The application executing program generator 23e generates an executing program for reading the saved information after a memory 19 is compacted and executing the application up to a state where the application was ended based on the read information.

The terminal unit 12 is provided with a program executing unit 18, the memory 19 and a communicator 21. The program executing unit 18 includes an application ending device 24a, an application information saving device 24d, a compacting device 24b, and an application executing device 24c.

The application information saving device 24d saves such information independent of the address values of the application until the application was ended by the application ending device 24a. The application executing device 24e reads the information saved by the application information saving device 24d after the memory 19 is compacted and executes the application up to the state where the application was ended based on the read information.

In this way, the application ending program generator 23a generates the ending program comprised of at least one module and adapted to end the application being presently executed. Then, the application information saving program generator 23d generates the application information saving program for saving the information independent of the addresses values of the application until the application was ended. The compaction program generator 23b generates the compaction program for compacting the memory 19. After the memory 19 is compacted, the application executing program generator 23e generates the application executing program for reading the saved information and executing the application up to the state where the application was end based on the read information. Accordingly, the fragmentation of the memory can be solved, enabling the effective use of the memory.

Next, a second modification of the method for solving the fragmentation of the memory is described. In the second modification, an area of a reference flag (identifier) is provided for each of all memory spaces; the case of setting an address value and the case of setting a value other than the address value such as a numerical value can be discriminated based on the reference flag; and relocation is made for an entry having the address value set based on the reference flag after the compaction.

Figure 22:
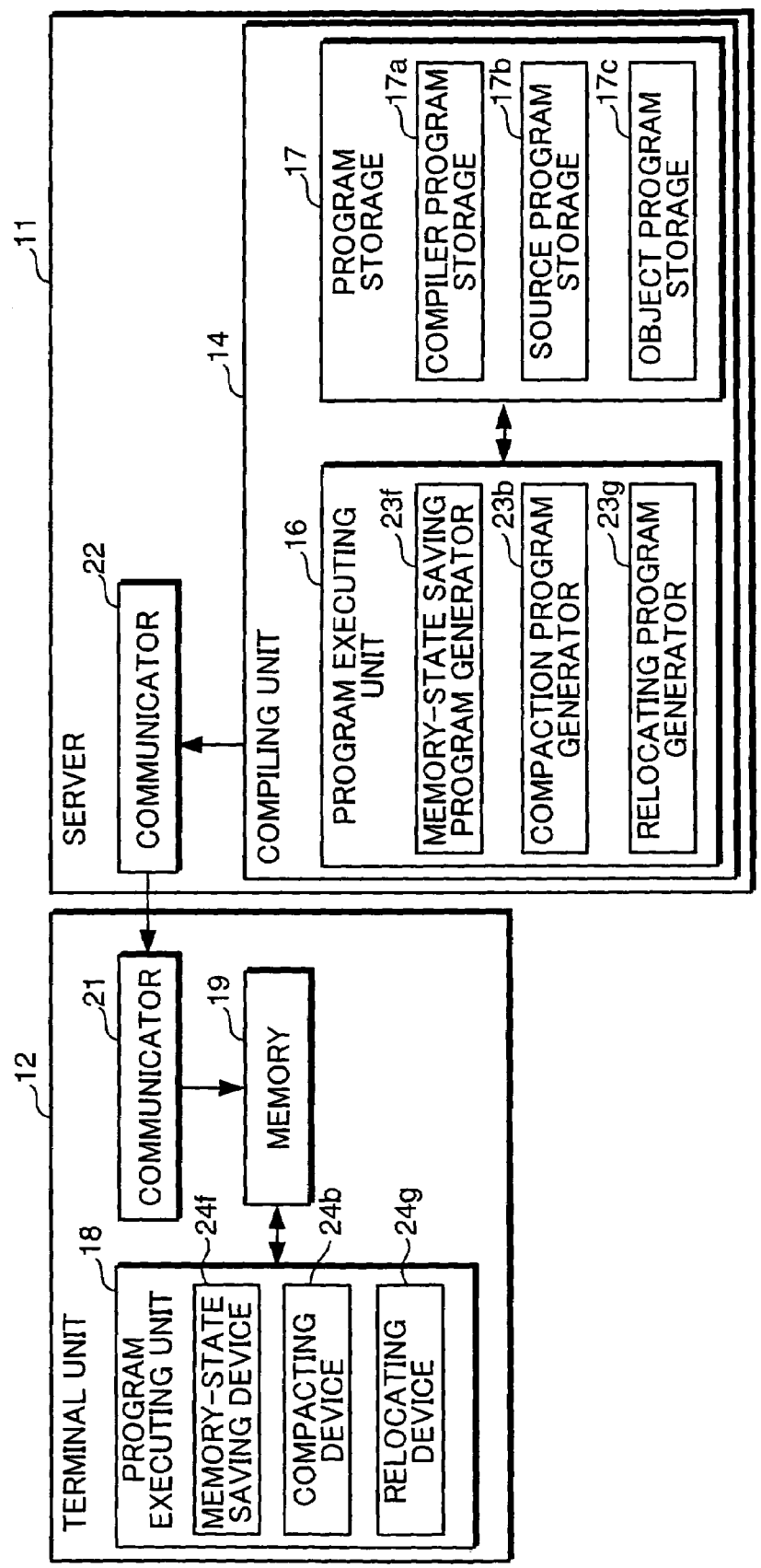
FIG. 22 is a block diagram showing the constructions of a compiling unit and a terminal unit for solving a fragmentation according to a second modification.

FIG. 22 is a block diagram showing the constructions of a compiling unit and a terminal unit for solving the fragmentation according to the second modification. It should be noted that no description is given on the same elements as those of the other embodiments by identifying them by the same reference numerals.

As shown in FIG. 22, a server 11 is provided with a communicator 22 and a compiling unit 14. The compiling unit 14 is provided with a program executing unit 16 and a program storage 17. The program executing unit 16 includes a memory-state saving program generator 23f, a compaction program generator 23b and a relocating program generator 23g.

The memory-state saving program generator 23f generates a memory-state saving program for saving the state (memory map) of a memory 19 before the compaction.

The relocating program generator 23*g* generates a relocating program for relocating an address value for an entry having the address value set based on a reference flag for identifying the case of setting the address value and the case of setting a value other than the address value such as a numeral value by referring to the saved state of the memory 19 before the compaction, after the memory 19 is compacted.

The terminal unit 12 is provided with a program executing unit 18, the memory 19 and a communicator 21. The program executing unit 18 includes a memory-state saving device 24*f*, a compacting device 24*b*, and a relocating device 24*g*.

The memory-state saving device 24*f* saves the state (memory map) of the memory 19 before the compaction. The relocating device 24*g* relocates the address value for the entry having the address value set based on the reference flag for identifying the case of setting the address value and the case of setting a value other than the address value such as a numeral value by referring to the saved state of the memory 19 before the compaction, after the memory 19 is compacted.

Figure 23:
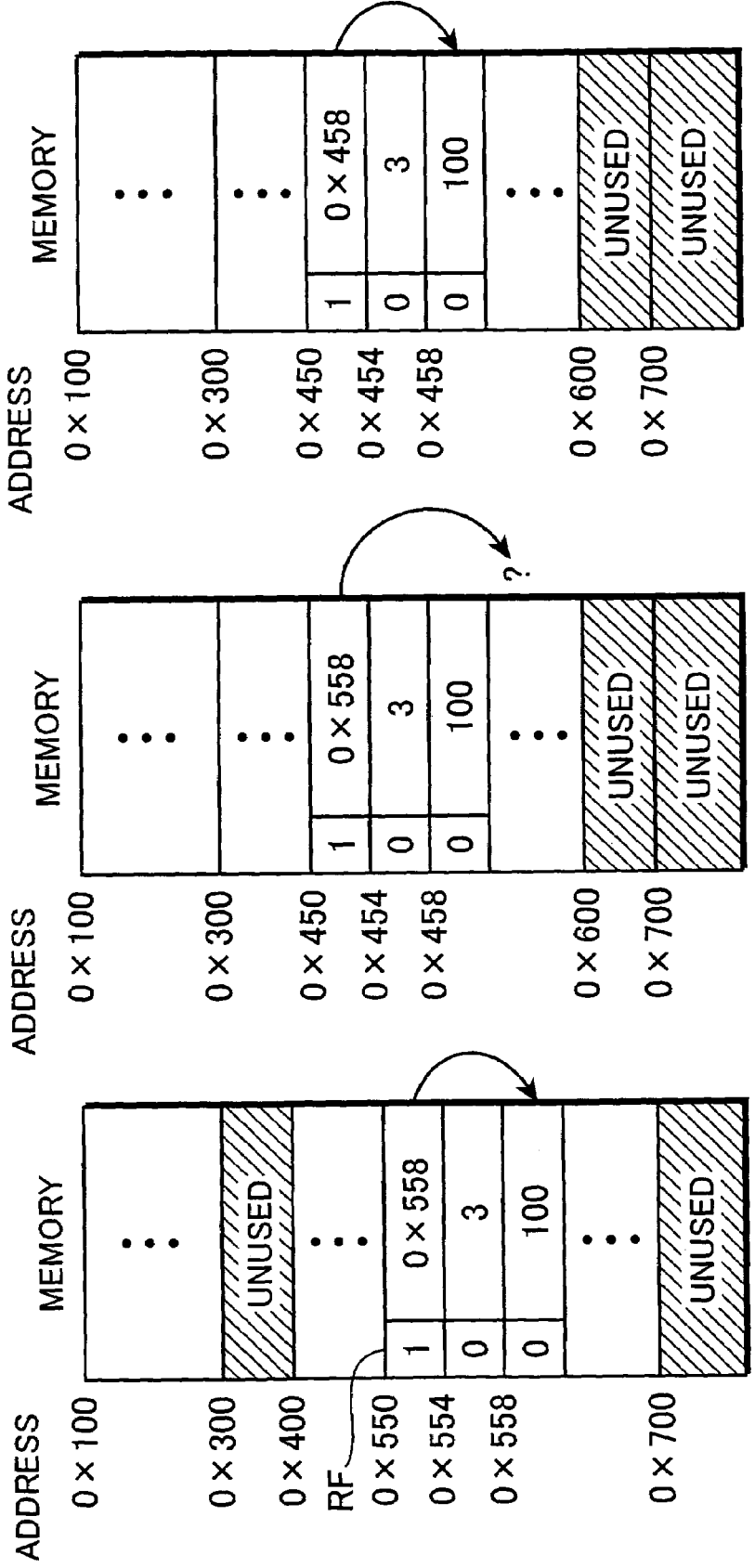
FIGS. 23A, 23B and 23C are diagrams showing a method for solving the fragmentation in the second modification.

FIGS. 23A, 23B and 23C are diagrams showing the method for solving the fragmentation according to the second modification, wherein FIG. 23A shows a fragmented state of a memory before the compaction, FIG. 23B shows a state of the memory after the compaction, and FIG. 23C shows a state of the memory after the relocation.

In the memory 19 shown in FIG. 23A, an area from 0x300 to 0x400 is unused; 0x558 which is an address value is saved at 0x500; a value of 3 is saved at 0x554; a value of 100 is saved at 0x558; and an area from 0x700 and above is unused; and other data are saved in other areas. In this modification, an area RF of the reference flag is provided for each memory space of the memory 19. In this area RF, "1" is set when the address value is set while "0" is set when a value other than the address value such as a numeral value is set. In FIG. 23A, the reference flag is set at "1" at the address 0x550 since the address value of 0x558 is set as a pointer variable there while being set at "0" at the addresses 0x554, 0x558 since the numerical values 3, 100 are set there.

When the memory 19 of the state shown in FIG. 23A is compacted, the state shown in FIG. 23B is attained. Specifically, as shown in FIG. 23B, the unused area from 0x300 to 0x400 disappears, an area from 0x100 to 0x600 is integrated, and an area from 0x600 and above is an unused area in the memory 19. In this case, since the addresses in the memory 19 are shifted, the address 0x550 where the address value 0x558 was saved before the compaction is shifted to 0x450, and the address 0x558 pointed by the address 0x550 is shifted to 0x458. As a result, the address pointed by the pointer variable saved at the address 0x450 disappears as shown in FIG. 23B.

Accordingly, the memory-state saving device 24*f* saves the state of the memory 19 before the compaction, and the relocating device 24*g* discriminates the value of the reference flag after the memory 19 is compacted and relocates the address value for the entry having the reference flag set at "1" by referring to the saved memory state before the compaction and the state of the memory 19 after the compaction. For example, as shown in FIG. 23C, the address value saved at the address 0x450 is relocated to a correct address value of 0x458 from 0x558.

In this way, the identifier indicating whether or not to set the address value is provided in the memory 19, and the memory-state saving program generator 23*f* generates the memory-state saving program for saving the state of the memory 19 before the compaction. Then, the compaction program generator 23*b* generates the compaction program for compacting the memory 19. Further, after the memory 19 is compacted, the relocating program generator 23*g* generates the relocating program for relocating the address value for the entry having the address value set based on the identifier by referring to the saved state of the memory 19 before the compaction. Accordingly, the fragmentation of the memory can be solved, enabling the effective use of the memory.

Next, a third modification of the method for solving the fragmentation of the memory is described. In the third modification, an area in a memory is divided into an address-value memory area where address values are saved and a non-address-value memory area where values other than the address values such as numerical values are saved, and the address values are relocated only for the address-value memory area after the compaction.

Figure 24:
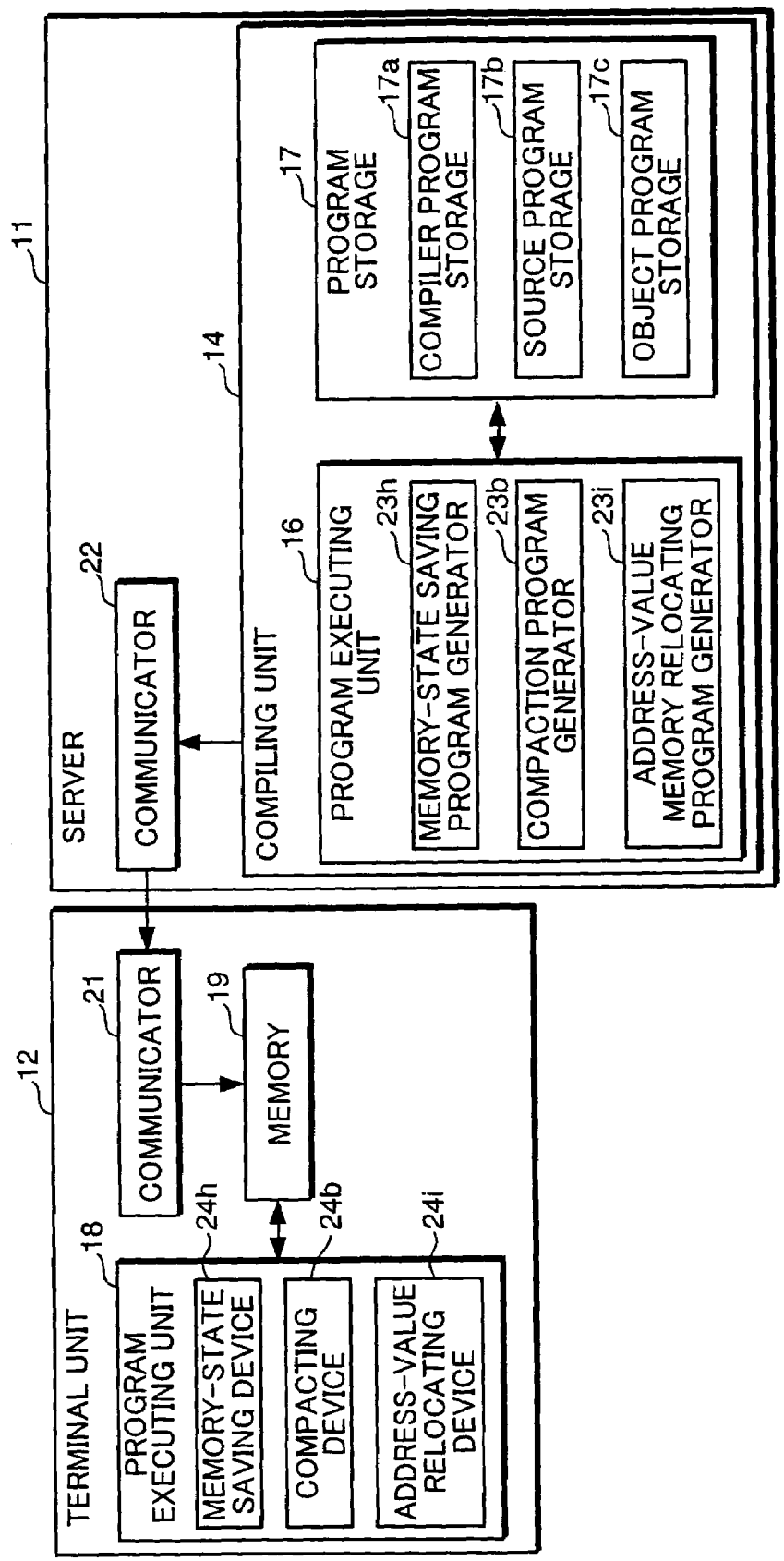
FIG. 24 is a diagram showing the construction of a compiling unit and a terminal unit for solving a fragmentation according to a third modification.

FIG. 24 is a block diagram showing the constructions of a compiling unit and a terminal unit for solving the fragmentation according to the third modification. It should be noted that no description is given on the same elements as those of the other embodiments by identifying them by the same reference numerals.

As shown in FIG. 24, a server 11 is provided with a communicator 22 and a compiling unit 14. The compiling unit 14 is provided with a program executing unit 16 and a program storage 17. The program executing unit 16 includes a memory-state saving program generator 23*h*, a compaction program generator 23*b* and an address-value memory relocating program generator 23*i*.

The memory-state saving program generator 23*h* generates a memory-state saving program for saving states of an address-value memory area where address values are saved and a non-address-value memory area where values other than the address values are saved.

The address-value memory relocating program generator 23*i* generates a relocating program for relocating the address values of only the address-value memory area by referring to the saved state of the address-value memory area before the compaction after the address-value memory area and non-address-value memory area are compacted.

The terminal unit 12 is provided with a program executing unit 18, a memory 19 and a communicator 21. The program executing unit 18 includes a memory-state saving device 24*h*, a compacting device 24*b*, and an address-value memory relocating device 24*i*.

The memory 19 is divided into an address-value memory area where address values are saved and a non-address-value memory area where values other than the address values such as numerical values are saved.

The memory-state saving device 24*h* saves the states of the address-value memory area where the address values are saved and the non-address-value memory area where values other than the address values such as numerical values are saved before the compaction.

The address-value memory relocating device 24*i* relocates the address values of only the address-value memory area by referring to the state of the address-value memory area before the compaction saved by the memory-state saving device 24*h* after the address-value memory area and non-address-value memory area are compacted.

FIGS. 25A, 25B and 25C are diagrams showing the method for solving the fragmentation according to the third modification, wherein FIG. 25A shows a fragmented state of a memory before the compaction, FIG. 25B shows a state of the memory after the compaction, and FIG. 25C shows a state of the memory after the relocation.

As shown in FIG. 25A, the memory 19 is divided into the address-value memory area where the address values are saved and the non-address-value memory area where values other than the address values such as numerical values are saved.

In the address-value memory area of the memory 19 shown in FIG. 23A, an area 0x100 to 0x200 is unused; 0x304 which is an address value is saved at 0x300; 0x200 is saved at 0x304; an area from 0x500 and above is unused, and other data are saved in other areas. Further, in the non-address-value memory area of the memory 19; an area from 0x5000 to 0x5100 is unused; a value of 1000 is saved at 0x5200; a value of 2000 is saved at 0x5204; an area from 0x5400 and above is unused; and other data are saved in other areas.

When the memory 19 of the state shown in FIG. 25A is compacted, the state shown in FIG. 25B is attained. Specifically, as shown in FIG. 25B, the unused area from 0x100 to 0x200 disappears, an area from 0x100 to 0x400 is integrated, and an area from 0x400 and above is an unused area in the address-value memory area of the memory 19. Further, in the non-address-value memory area of the memory 19, the unused area from 0x5000 to 0x5100 disappears; an area 0x5000 to 0x5300 is integrated; and an area from 0x5300 and above is unused.

In this case, since the addresses in memory 19 are shifted, the address 0x300 where the address value 0x304 was saved before the compaction is shifted to 0x200; the address 0x304 where the address value 0x200 was saved before the compaction is shifted to 0x204; and the address 0x200 pointed by the address 0x304 is shifted to 0x100. As a result, the addresses pointed by the pointer variables saved at the addresses 0x200 and 0x240 disappear as shown in FIG. 25B.

Accordingly, the memory-state saving device 24h saves the states of the address-value memory area and non-address-value memory area of the memory 19 before the compaction, and the address-value relocating device 24i relocates the address values of only the address-value memory area by referring to the state of the address-value memory area before the compaction saved by the memory-state saving device 24h and the state of the address-value memory area of the memory 19 after the compaction after the memory 19 is compacted. For example, as shown in FIG. 25C, the address-value memory relocating device 24i relocates the address value saved at the address 0x200 from 0x304 to 0x204 which is a correct address value and the address value saved at the address 0x204 from 0x200 to 0x100 which is a correct address value.

In this way, the address-value memory area for saving the address values and the non-address-value memory for saving the values other than the address values are provided, and the memory-state saving program generator 23h generates the memory-state saving program for saving the states of the address-value memory area and the non-address-value memory area before the compaction. The compaction program generator 23b generates the compaction program for compacting the address-value memory area and the non-address-value memory area. After the address-value memory area and the non-address-value memory area are compacted, the address-value memory relocating program generator 23i generates the address-value memory relocating program for relocating the address values of only the address-value memory area by referring to the saved state of the address-value memory area before the compaction. Accordingly, the fragmentation of the memory can be solved, enabling the effective use of the memory.

Next, a fourth modification of the method for solving the fragmentation of the memory is described. In the fourth modification, an area in a memory is divided into an address-value memory area where address values are saved and a non-address-value memory area where values other than the address values such as numerical values are saved; n identification number for identifying a module and an identification flag (identifier) for discriminating whether to set an address of a data area of the module or to set an address of a code area for a pointer variable in the memory are provided; the identification number and the identification flag are set upon substituting the address for the pointer variable at the time of executing the module; and the address is recalculated based on the identification number and the identification flag only for the address-value memory area after the compaction.

FIG. 26 is a block diagram showing the constructions of a compiling unit and a terminal unit for solving the fragmentation according to the fourth modification. It should be noted that no description is given on the same elements as those of the other embodiments by identifying them by the same reference numerals.

As shown in FIG. 26, a server 11 is provided with a communicator 22 and a compiling unit 14. The compiling unit 14 is provided with a program executing unit 16 and a program storage 17. The program executing unit 16 includes an identification number/identification flag setting program generator 23j, a compaction program generator 23b and a recalculating program generator 23k.

The identification number/identification flag setting program generator 23j generates a setting program for setting an identification number for identifying a program module and an identification flag for discriminating whether to set an address of a data area of the program module or to set an address of a code area upon substituting an address value for a pointer at the time of executing the program module.

The recalculating program generator 23k generates a recalculating program for recalculating the address value based on the identification number and the identifier after the memory 19 is compacted.

The terminal unit 12 is provided with a program executing unit 18, a memory 19 and a communicator 21. The program executing unit 18 includes an identification number/identification flag setting device 24j, a compacting device 24b, and a recalculating device 24k.

The memory 19 is divided into an address-value memory area where address values are saved and a non-address-value memory area where values other than the address values such as numerical values are saved. The memory 19 is also provided with an area for saving the identification number for identifying the program module and an identification flag for discriminating whether to set the address of the data area of the program module or to set the address of the code area.

The identification number/identification flag setting device 24j sets the identification number for identifying the program module and the identification flag for discriminating whether to set the address of the data area of the program module or to set the address of the code area upon substituting the address value for the pointer at the time of executing the program module.

The recalculating device 24k recalculates the address value based on the identification number and the identifier after the memory 19 is compacted.

First, in this modification, upon saving the program module in the memory, the identification number for identifying the program module is designated and a table relating this identification number to the leading addresses of the data area and the code area of the program module is saved beforehand. Then, the identification number/identification flag setting device 24j sets the identification number for identifying the program module and the identification flag for discriminating whether to set the address of the data area of the program module or to set the address of the code area upon substituting the address value for the pointer at the time of executing the program module. The identification flag is set to "1" in the case of setting the address of the data area of the program module for the pointer while being set to "0" in the case of setting the address of the code area of the program module for the pointer. Then, the compacting device 24*b* compacts the memory 19.

After the memory 19 is compacted, the recalculating device 24*k* recalculates the address value based on the identification number and the identifier by referring to the table saved beforehand, and sets the recalculated address value as a new address value.

Although the memory 19 is divided into the address-value memory area where the address values are saved and the non-address-value memory area where the values other than the address values such as numerical values are saved in this modification, the present invention is not particularly limited thereto. Information indicating the location of the address value may be latched.

In this way, the identification number for identifying the module and the identification flag for discriminating whether to set the address of the data area of the module or to set the address of the code area are provided in the memory 19, and the identification number/identification flag setting program generator 23*j* generates the setting program for setting the identification number and the identification flag upon substituting the address value for the pointer. The compaction program generator 23*b* generates the compaction program for compacting the memory 19. After the memory 19 is compacted, the recalculating program generator 23*k* generates the recalculating program for recalculating the address value based on the identification number and the identification flag. Accordingly, the fragmentation of the memory can be solved, enabling the effective use of the memory.

Next, a fifth modification of the method for solving the fragmentation is described. In the fifth modification, an area in a memory is divided into an address-value memory area where address values are saved and a non-address-value memory area where values other than the address values such as numerical values are saved; identification number for identifying a module and an identification flag (identifier) for discriminating whether to set an address of a data area of the module or to set an address of a code area for a pointer variable in the memory is provided; the identification number and the identification flag are set upon substituting the address for the pointer variable at the time of executing the module and an offset value from the leading address of the data area or an offset value from the leading address of the code area is set as the address value. Upon using the pointer variable at the time of executing the program module, an actual address converted by adding the offset value to the leading address of the data area or the leading address of the code area is used.

Since the fifth and fourth modifications differ only in that the address value is saved as the offset value, no further description is given.

In this way, the identification number for identifying the module and the identification flag for discriminating whether to set the address of the data area of the module or to set the address of the code area are provided in the memory 19, and an offset-value setting program for setting the identification number and the identification flag upon substituting the address value for the pointer and setting the offset value from the leading address of the data area or from the leading address of the code area is generated. Then, an actual address converting program for converting the address value into the actual address by adding the leading address of the data area or the leading address of the code area to the offset value upon using the pointer is generated. Accordingly, the fragmentation of the memory can be solved, enabling the effective use of the memory.

Next, a sixth modification of the method for solving the fragmentation is described. In the sixth modification, a reference is provided with handles for indirectly referring to objects; whether or not there is any handle indicating a code area or a data area shifted by the compaction is searched; and if the handle indicating the code area or the data area is found, this handle is relocated and the code area or the data area is compacted after all the handles are relocated.

FIG. 27 is a block diagram showing the constructions of a compiling unit and a terminal unit for solving the fragmentation according to the sixth modification. It should be noted that no description is given on the same elements as those of the other embodiments by identifying them by the same reference numerals.

As shown in FIG. 27, a server 11 is provided with a communicator 22 and a compiling unit 14. The compiling unit 14 is provided with a program executing unit 16 and a program storage 17. The program executing unit 16 includes a handle searching program generator 23*l*, a compaction program generator 23*b* and a handle relocating program generator 23*m*.

The handle searching program generator 23*l* generates a searching program for searching whether or not there is any handle indicating a code area or a data area of a program shifted by the compaction.

The compaction program generator 23*b* generates a compaction program for applying the compaction for each code area or each data area of the program module.

The handle relocating program generator 23*m* generates a handle relocating program for relocating the handle if the handle indicating the code area or the data area was found.

The compaction program generator 23*b* also generates a compaction program for compacting the code area or the data area after all the handles are relocated.

The terminal unit 12 is provided with a program executing unit 18, a memory 19 and a communicator 21. The program executing unit 18 includes a handle searching device 24*l*, a compacting device 24*b*, and a handle relocating device 24*m*.

An area for the handles used by the reference to indirectly refer to the address of an object is provided in the memory 19. Accordingly, the reference indirectly refers to the object via the handle instead of directly referring to the object. The handles and the objects have an one-to-one correspondence. This means no existence of a plurality of handles indicating the same object. Further, the references and the objects have a many-to-one correspondence because the objects have a possibility of being referred to by a plurality of different references.

The handle searching device 24*l* searches whether or not there is any handle indicating the code area or the data area of the program module shifted by the compaction. The compacting device 24*b* applies the compaction to each code area or each data area of the program module. The handle relocating device 24*m* relocates an address value of the handle in the case of finding the handle indicating the code area or the data area. The compacting device 24*b* compacts the code area or the data area after all the handles are relocated.

In this way, the handle searching program generator 23*l* generates the searching program for searching whether or not there is any handle indicating the code area or the data area shifted by the compaction. If the handle indicating the code area or the data area is found, the handle relocating program generator 23*m* generates the handle relocating program for relocating the handle. After all the handles are relocated, the compaction program generator 23*b* generates the compaction program for compacting the code area or the data area. Accordingly, the fragmentation of the memory can be solved, enabling the effective use of the memory.

The source program, the object program and all the other programs described above are saved in a computer-readable storage medium and used and executed upon being read from the computer and are caused to communicate with other computers via a network such as Internet in some cases. Similarly, a compiler program to execute the above translation is also saved in the computer-readable storage medium and executes a compiling (translation/conversion from the source program to the object program) by being read from the computer and is caused to communicate with the other computers via a network such as Internet.

By this compiler program, the computer executes a compiling method specified by this compiler program. This computer hardware and the compiler program construct the compiling unit as a whole.

Summary of the Embodiments

Various embodiments of the present invention described above can be summarized as follows.

Specifically, the complier program according to the present invention is for converting the source program into the object program and causes the computer to function as the address saving program generating means for saving the address saving program for saving the data memory area address used by the calling program module included in the source program; the address setting program generating means for generating the address setting program for setting the data memory area address used by the other program module to be called by the calling program module; the transferring program generating means for generating the transferring program for the transfer from the first subprogram included in the calling program module to the second subprogram included in the other program module; the address resetting program generating means for generating the address resetting program for reading and resetting the saved data memory area address for the calling program module after the return from the second subprogram as a transfer end to the first subprogram; and the accessing program generating means for generating the accessing program for accessing the data memory area for the other program module using the relative address from the set data memory area address for the other program module when the other program module accesses the data memory area therefor included therein.

With this configuration, the address saving program generating means generates the address saving program for saving the data memory area address used by the calling program module included in the source program. The address setting program generating means generates the address setting program for setting the data memory area address used by the other program module to be called by the calling program module. Further, the transferring program generating means generates the transferring program for the transfer from the first subprogram included in the calling program module to the second subprogram included in the other program module. The address resetting program generating means generates the address resetting program for reading and resetting the saved data memory area address for the calling program module after the return from the second subprogram as the transfer end to the first subprogram. The accessing program generating means generates the accessing program for accessing the data memory area for the other program module using the relative address from the set data memory area address for the other program module when the other program module accesses the data memory area therefor included therein Accordingly, even if the calling program module reenters the other program module, the data memory area address for the calling program module can be retracted since the data memory area address used by the calling program module is saved, and the reentrant object program can be generated since the data memory area address for the other program module to be called by the calling program module is set. Thus, dynamic links between the modules can be realized.

Particularly, a reentrant object program which can conform to the purpose of storing an object program in a limited memory area such as a so-called device installation program and storing an object program for an advanced and highly functional information processing in a limited memory like mobile information processings of recent years can be automatically generated. Thus, dynamic links between the modules can be realized.

In the above compiler program, it is preferred that the computer is caused to further function as the discriminating means for discriminating whether or not to shorten the process based on the description of the other program module including the second subprogram called by the first subprogram included in the calling program module included in the source program; if the discriminating means discriminates the process not to be shortened, the address saving program generating means generates the address saving program for saving the data memory area address used by the calling program module, the address setting program generating means generates the address setting program for setting the data memory area address used by the other program module called by the calling program module, the transferring program generating means generates the transferring program for the transfer from the first subprogram included in the calling program module to the second subprogram included in the other program module, the address resetting program generating means generates the address resetting program for reading and resetting the saved data memory area address for the calling program module after the return from the second subprogram as the transfer end to the first subprogram, and the accessing program generating means generates the accessing program for accessing the data memory area for the other program module using the relative address from the set data memory area address for the other program module when the other program module accesses the data memory area therefor included therein; and if the discriminating means discriminates the process to be shortened, the transferring program generating means generates the transferring program for the transfer from the first subprogram included in the calling program module to the second subprogram included in the other program module and the accessing program generating means generates the accessing program for accessing the data memory area for the other program module using the relative address from the data memory area address for the calling program module when the other program module accesses the data memory area therefor included therein.

With this configuration, whether or not to shorten the process is discriminated based on the description of the other program module including the second subprogram called from the first subprogram included in the calling program module included in the source program. If the discriminating means discriminates the process not to be shortened, the address saving program generating means generates the address saving program for saving the data memory area address used by the calling program module. Then, the address setting program generating means generates the address setting program for setting the data memory area address used by the other program module called by the calling program module. Further, the transferring program generating means generates the transferring program for the transfer from the first subprogram included in the calling program module to the second subprogram included in the other program module, and the address resetting program generating means generates the address resetting program for reading and resetting the saved data memory area address for the calling program module after the return from the second subprogram as the transfer end to the first subprogram. Furthermore, the accessing program generating means generates the accessing program for accessing the data memory area for the other program module using the relative address from the set data memory area address for the other program module when the other program module accesses the data memory area therefor included therein.

On the other hand, if the discriminating means discriminates the process to be shortened, the transferring program generating means generates the transferring program for the transfer from the first subprogram included in the calling program module to the second subprogram included in the other program module. Then, the accessing program generating means generates the accessing program for accessing the data memory area for the other program module using the relative address from the data memory area address for the calling program module when the other program module accesses the data memory area therefor included therein.

Since whether or not to shorten the process is discriminated based on the description of the other program module including the second subprogram called from the first subprogram included in the calling program module included in the source program, the processings of saving, setting and resetting the address can be deleted to speed up the execution of the object program and the size of the object program can be made smaller by performing no unnecessary processing in cases where the calling program module and the called-side program module need not necessarily use different data areas.

In the above compiler program, it is preferable that, after the second subprogram included in the other program module is called from the first subprogram included in the calling program module included in the source program, the address setting program generating means generates the address setting program for reading and setting the data memory area address for the other program module from the data memory area address tables for the respective program modules saved in the executing units of the calling program module, and the accessing program generating means generates the accessing program for accessing the other program module for the other program module using the relative address from the set data memory area address for the other program module when the other program module accesses the data memory area therefor included therein.

With this configuration, after the second subprogram included in the other program module is called from the first subprogram included in the calling program module included in the source program, the address setting program generating means generates the address setting program for reading and setting the data memory area address for the other program module from the data memory area address tables for the respective program modules saved in the executing units of the calling program module. Then, the accessing program generating means generates the accessing program for accessing the other program module for the other program module using the relative address from the set data memory area address for the other program module when the other program module accesses the data memory area therefor included therein.

Accordingly, even if the calling program module reenters the other program module, accesses to, for example, the external variables do not collide since they are made via the data memory area address tables for the respective program modules. Thus, the program module can be configured to be reentrant.

In the above compiler program, it is preferable that the computer is caused to further function as the discriminating means for discriminating whether or not to shorten the process based on the description of the other program module including the second subprogram called from the first subprogram included in the calling program module included in the source program; if the discriminating means discriminates the process not to be shortened, after the second subprogram included in the other program module is called from the first subprogram included in the calling program module included in the source program, the address setting program generating means generates the address setting program for setting and reading the data memory area address for the other program module from the data memory area address tables for the respective program modules saved in the executing units of the calling program module, and the accessing program generating means generates the accessing program for accessing the data memory area for the other program module using the relative address from the set data memory area address for the other program module when the other program module accesses the data memory area therefor included therein; and if the discriminating means discriminates the process to be shortened, the accessing program generating means generates the accessing program for accessing the data memory area for the other program module using the relative address from the data memory area address for the calling program module when the other program module accesses the data memory area therefor included therein.

With this configuration, the discriminating means discriminates whether or not to shorten the process based on the description of the other program module including the second subprogram to be called from the first subprogram included in the calling program module included in the source program. If the discriminating means discriminates the process not to be shortened, after the second subprogram included in the other program module is called from the first subprogram included in the callings-de program module included in the source program, the address setting program generating means generates the address setting program for setting and reading the data memory area address for the other program module from the data memory area address tables for the respective program modules saved in the executing units of the calling program module. Then, the accessing program generating means generates the accessing program for accessing the data memory area for the other program module using the relative address from the set data memory area address for the other program module when the other program module accesses the data memory area therefor included therein.

On the other hand, if the discriminating means discriminates the process to be shortened, the accessing program generating means generates the accessing program for accessing the data memory area for the other program module using the relative address from the data memory area address for the calling program module when the other program module accesses the data memory area therefor included therein.

Since whether or not to shorten the process is discriminated based on the description of the other program module including the second subprogram called from the first subprogram included in the calling program module, the processing of setting the address via the data memory area address tables for the respective program modules can be deleted to speed up the execution of the object program and the size of the object program can be made Smaller by performing no unnecessary processing in cases where the calling program module and the called-side program module need not necessarily use different data areas.

Further, in the above compiler program, the description of the other program module including the second subprogram to be called from the first subprogram included in the calling program module included in the source program is preferably a declaration described for each second subprogram.

With this configuration, the processing of setting the address can be deleted based on the presence or absence of this declaration according to the processing content of the second subprogram, thereby speeding up the execution of the object program, since the description of the other program module including the second subprogram called from the first subprogram included in the calling program module included in the source program is a declaration described for each second subprogram.

Further, in the above compiler program, the source program including the other program module including the second subprogram called by the calling program module preferably includes a description for specifying which of the execution common data memory area for the other program module the external variables included in the other program module commonly access upon a plurality of executions of the calling program module and the execution intrinsic data memory areas for the other program module they commonly access every time the calling program module is executed is to be used.

With this configuration, which of the execution common data memory area for the other program module the external variables included in the other program module commonly access upon a plurality of executions of the calling program module and the execution intrinsic data memory areas for the other program module they commonly access every time the calling program module is executed is to be used is specified by the description included in the source program including the other program module including the second subprogram called by the calling program module.

Accordingly, even if the other program module is called from a plurality of calling program modules, accesses are made to the execution intrinsic data memory areas provided for the respective calling program modules. Thus, no collision occurs in accesses to, for example, the external variables and the program module can be configured to be reentrant. Further, even if the other program module is called from a plurality of calling program modules, accesses are made to the execution common data memory area shared by the respective calling program modules. Thus, for example, some of the external variables can be commonly used.

Further, in the above compiler program, the description for specifying which of the execution common data memory area for the other program module and the execution intrinsic data memory area for the other program module is to be used is preferably a declaration described for each external variable included in the other program module.

With this configuration, since the description for specifying which of the execution common data memory area for the other program module and the execution intrinsic data memory area for the other program module is to be used is the declaration described for each external variable included in the other program module, the execution common data memory area and the execution intrinsic data memory area can be easily properly used by judging the presence or absence of this declaration.

In the above complier program, it is preferable that the address saving program generating means generates the address saving program for saving the execution common data memory area address and the execution intrinsic data memory area address for the calling program module; the address setting program generating means sets the execution common data memory area address and the execution intrinsic data memory area address for the other program module to be called by the calling program module; the transferring program generating means generates the transferring program for the transfer from the first subprogram to the second subprogram; the address resetting program generating means generates the address resetting program for reading and resetting the saved execution intrinsic data memory area address and execution common data memory area address for the calling program module after the return from the second subprogram as the transfer end to the first subprogram; and the accessing program generating means generates the accessing program for accessing the data memory area for the other program module using the relative address from the set execution intrinsic data memory area address for the other program module when the other program module accesses the execution intrinsic data memory area therefor included therein and accessing the data memory area using the relative address from the set execution common data memory area address for the other program module when the other program module accesses the execution common data memory area therefor included therein.

With this configuration, the address saving program generating means generates the address saving program for saving the execution common data memory area address and the execution intrinsic data memory area address for the calling program module. The address setting program generating means sets the execution common data memory area address and the execution intrinsic data memory area address for the other program module to be called by the calling program module. The transferring program generating means generates the transferring program for the transfer from the first subprogram to the second subprogram. The address resetting program generating means generates the address resetting program for reading and resetting the saved execution intrinsic data memory area address and execution common data memory area address for the calling program module after the return from the second subprogram as the transfer end to the first subprogram. The accessing program generating means generates the accessing program for accessing the data memory area using the relative address from the set execution intrinsic data memory area address for the other program module when the other program module accesses the execution intrinsic data memory area therefor included therein and accessing the data memory area using the relative address from the set execution common data memory area address for the other program module when the other program module accesses the execution common data memory area therefor included therein.

Accordingly, the execution intrinsic data memory area and the execution common data memory area can be properly used. Even if the other program module is called by a plurality of calling program modules, accesses to, for example, an external variable do not collide, whereby the program module can be configured to be reentrant and a plurality of program modules can share the external variable.

In the above compiler program, it is preferable that, after the other program module is called from the calling program module included in the source program, the address setting program generating means generates the address setting program for reading and setting the execution intrinsic data memory area address for the other program module from the data memory area address tables for the respective program modules saved in the execution units of the calling program module and reading and setting the execution common data memory area address for the other program commonly accessed by a plurality of executions of the calling program module; and the accessing program generating means generates the accessing program for accessing the data memory area using the relative address from the set execution intrinsic data memory area address for the other program when the other program module accesses the execution intrinsic data memory area therefor included therein and accessing the data memory area using the relative address from the set execution common data memory area address for the other program module when the other program module accesses the execution common data memory area therefor included therein.

With this configuration, after the other program module is called from the calling program module included in the source program, the address setting program generating means generates the address setting program for reading and setting the execution intrinsic data memory area address for the other program module from the data memory area address tables for the respective program modules saved in the execution units of the calling program module and reading and setting the execution common data memory area address for the other program commonly accessed by a plurality of executions of the calling program module. The accessing program generating means generates the accessing program for accessing the data memory area using the relative address from the set execution intrinsic data memory area address for the other program when the other program module accesses the execution intrinsic data memory area therefor included therein and accessing the data memory area using the relative address from the set execution common data memory area address for the other program module when the other program module accesses the execution common data memory area therefor included therein.

Accordingly, the execution intrinsic data memory area and the execution common data memory area can be properly used. Even if the other program module is called by a plurality of calling program modules, accesses to, for example, an external variable do not collide, whereby the program module can be configured to be reentrant and a plurality of program modules can share the external variable.

Further, in the above compiler program, the address saving program generating means preferably generates the address saving program for saving the execution common data memory area address and the execution intrinsic data memory area address for the calling program module in the stack memory prior to the data necessary for the transfer from the first subprogram to the second subprogram.

With this configuration, the address saving program generating means generates the address saving program for saving the execution common data memory area address and the execution intrinsic data memory area address for the calling program module in the stack memory prior to the data necessary for the transfer from the first subprogram to the second subprogram.

Accordingly, the other program module to be called by the calling program module can be exempted from the need to concern the presence or absence of the execution common data memory area address and execution intrinsic data memory area address saved in the stack memory.

Further, in the above compiler program, the calling program module included in the source program and the other program module including the second subprogram to be called from the first subprogram included in the calling program module are preferably the same program module.

With this configuration, the calling program module included in the source program and the other program module including the second subprogram to be called from the first subprogram included in the calling program module are the same program module.

Accordingly, the process inside the module can be completed without reducing its processing speed by shortening the call within the same module.

Further, in the above compiler program, it is preferable that the calling program module includes the code area and the data area; the other program module includes the code area and the data area; and the computer is caused to further function as the identification-number obtaining program generating means for generating the identification-number obtaining program for obtaining the identification number for identifying the other program module upon the receipt of the call command to the other program from the calling program module; the leading-address obtaining program generating means for generating the leading-address obtaining program for obtaining the leading address of the data area of the other program module from the table relating the identification number of the calling program module to the leading address of the data area of the calling program module and relating the identification number of the other program module to the leading address of the data area of the other program module, using the obtained identification number as an index; and the leading-address switching program generating means for generating the leading-address switching program for switching the obtained leading address of the data area of the other program module and the leading address of the data area of the calling program module.

With this configuration, the calling program module includes the code area and the data area, and the other program module includes the code area and the data area. The identification-number obtaining program generating means generates the identification-number obtaining program for obtaining the identification number for identifying the other program module upon the receipt of the call command to the other program from the calling program module. The leading-address obtaining program generating means generates the leading-address obtaining program for obtaining the leading address of the data area of the other program module from the table relating the identification number of the calling program module to the leading address of the data area of the calling program module and relating the identification number of the other program module to the leading address of the data area of the other program module, using the obtained identification number as an index. The leading-address switching program generating means generates the leading-address switching program for switching the obtained leading address of the data area of the other program module and the leading address of the data area of the calling program module.

Accordingly, the amount of the data of the table can be reduced and the table can conform to small-size apparatuses having a strict resource restriction by preparing the table for the address conversion not page by page, but module by module.

In the above compiler program, it is preferable that the calling program module includes the code area and the data area; the other program module includes the code area and the data area; and the computer is caused to further function as the identification-number designating program generating means for generating the identification-number designating program for designating the identification number for identifying the calling program module and the one for identifying the other program module; the table preparing program generating means for generating the table preparing program for preparing the table relating the designated identification number of the calling program module to the leading address of the data area of the calling program module and relating the designated identification number of the other program module to the leading address of the data area of the other program module; the identification-number obtaining program generating means for generating the identification-number obtaining program for obtaining the identification number of the other program module upon the receipt of the call command to the other program from the calling program module; the leading-address obtaining program generating means for generating the leading-address obtaining program for obtaining the leading address of the data area of the other program module from the prepared table using the obtained identification number as an index; and the leading-address switching program generating means for generating the leading-address switching program for switching the obtained leading address of the data area of the other program module and the leading address of the data area of the calling program module.

With this configuration, the calling program module includes the code area and the data area, and the other program module includes the code area and the data area. The identification-number designating program generating means generates the identification-number designating program for designating the identification number for identifying the calling program module and the one for identifying the other program module. The table preparing program generating means generates the table preparing program for preparing the table relating the designated identification number of the calling program module to the leading address of the data area of the calling program module and relating the designated identification number of the other program module to the leading address of the data area of the other program module. The identification-number obtaining program generating means generates the identification-number obtaining program for obtaining the identification number of the other program module upon the receipt of the call command to the other program from the calling program module. The leading-address obtaining program generating means generates the leading-address obtaining program for obtaining the leading address of the data area of the other program module from the prepared table using the obtained identification number as an index. The leading-address switching program generating means generates the leading-address switching program for switching the obtained leading-address of the data area of the other program module and the leading address of the data area of the calling program module.

Accordingly, the amount of the data of the table can be reduced and the table can conform to small-size apparatuses having a strict resource restriction by preparing the table for the address conversion not page by page, but module by module.

In the above compiler program, it is preferable that the computer is caused to further function as the address latching program generating means for generating the address latching program for latching the address to the variable or function defined outside the other program module; and the accessing program generating means generates the accessing program for accessing the variable defined inside the other program module using the relative address from the obtained leading address and accessing the function defined inside the other program module using the relative address from the program counter while indirectly accessing the variable or function defined outside the other program module via the latched address after accessing the latched address using the relative address from the obtained leading address.

With this configuration, the address latching program generating means generates the address latching program for latching the address to the variable or function defined outside the other program module. The accessing program generating means generates the accessing program for accessing the variable defined inside the other program module using the relative address from the obtained leading address and accessing the function defined inside the other program module using the relative address from the program counter while indirectly accessing the variable or function defined outside the other program module via the latched address after accessing the latched address using the relative address from the obtained leading address. Accordingly, the variable or function defined outside the other program module can be indirectly accessed via the latched address.

In the above compiler program, it is preferable to cause the computer to further function as the ending program generating means for generating the ending program for ending the application comprised of at least one module and being presently executed; the compaction program generating means for generating the compaction program for compacting the memory after the application is ended; and the resuming program generating means for generating the resuming program for resuming the application from the beginning after the memory is compacted.

With this configuration, the ending program generating means generates the ending program for ending the application comprised of at least one module and being presently executed. After the application is ended, the compaction program generating means generates the compaction program for compacting the memory. After the memory is compacted, the resuming program generating means generates the resuming program for resuming the application from the beginning. Accordingly, the fragmentation of the memory can be solved, thereby enabling the effective use of the memory.

In the above compiler program, it is preferable to cause the computer to further function as the ending program generating means for generating the ending program for ending the application comprised of at least one module and being presently executed; the saving program generating means for generating the saving program for saving the information independent of the address values of the application until the application was ended; the compaction program generating means for generating the compaction program for compacting the memory; and the executing program generating means for generating the executing program for reading the saved information and executing the application based on the read information up to the state where the application was ended after the memory was compacted.

With this configuration, the ending program generating means generates the ending program for ending the application comprised of at least one module and being presently executed. The saving program generating means generates the saving program for saving the information independent of the address values of the application until the application was ended. The compaction program generating means generates the compaction program for compacting the memory. After the memory is compacted, the executing program generating means generates the executing program for reading the saved information and executing the application based on the read information up to the state where the application was ended. Accordingly, the fragmentation of the memory can be solved, thereby enabling the effective use of the memory.

In the above compiler program, it is preferable that the identifier indicating whether or not to set the address value is provided in the memory and the computer is caused to further function as the memory-state saving program generating means for generating the memory-state saving program for saving the state of the memory before the compaction; the compaction program generating means for generating the compaction program for compacting the memory; and the relocating program generating means for generating the relocating program for relocating the address value based on the identifier for an entry having the address value set by referring to the saved state of the memory before the compaction.

With this configuration, the identifier indicating whether or not to set the address value is provided in the memory, and the memory-state saving program generating means generates the memory-state saving program for saving the state of the memory before the compaction. The compaction program generating means generates the compaction program for compacting the memory. Further, after the memory is compacted, the relocating program generating means generates the relocating program for relocating the address value based on the identifier for an entry having the address value set by referring to the saved state of the memory before the compaction. Accordingly, the fragmentation of the memory can be solved, thereby enabling the effective use of the memory.

In the above compiler program, it is preferable that the address-value memory for saving the address values and the non-address-value memory for saving values other than the address values are provided and the computer is caused to further function as the memory-state saving program generating means for generating the memory-state saving program for saving the states of the address-value memory and the non-address-value memory before the compaction; the compaction program generating means for generating the compaction program for compacting the address-value memory and the non-address-value memory; and the relocating program generating means for generating the relocating program for relocating the address values of only the address-value memory by referring to the saved states of the address-value memory and the non-address-value memory before the compaction after the address-value memory and the non-address-value memory are compacted.

With this configuration, the address-value memory for saving the address values and the non-address-value memory for saving values other than the address values are provided, and the memory-state saving program generating means generates the memory-state saving program for saving the states of the address-value memory and the non-address-value memory before the compaction. The compaction program generating means generates the compaction program for compacting the address-value memory and the non-address-value memory. After the address-value memory and the non-address-value memory are compacted, the relocating program generating means generates the relocating program for relocating the address values of only the address-value memory by referring to the saved states of the address-value memory and the non-address-value memory before the compaction. Accordingly, the fragmentation of the memory can be solved, thereby enabling the effective use of the memory.

In the above compiler program, it is preferable that the identification number for identifying the module and the identifier for identifying whether to set the address of the data area of the module or to set the address of the code area are provided in the memory, and the computer is caused to further function as the setting program generating means for generating the setting program for setting the identification number and the identifier upon substituting the address value for the pointer; the compaction program generating means for generating the compaction program for compacting the memory; and the recalculating program generating means for generating the recalculating program for recalculating the address value based on the identification number and the identifier after the memory is compacted.

With this configuration, the identification number for identifying the module and the identifier for identifying whether to set the address of the data area of the module or to set the address of the code area are provided in the memory, and the setting program generating means generates the setting program for setting the identification number and the identifier upon substituting the address value for the pointer. The compaction program generating means generates the compaction program for compacting the memory. After the memory is compacted, the recalculating program generating means generates the recalculating program for recalculating the address value based on the identification number and the identifier. Accordingly, the fragmentation of the memory can be solved, thereby enabling the effective use of the memory.

Further, in the above compiler program, it is preferable that the identification number for identifying the module and the identifier for identifying whether to set the address of the data area of the module or to set the address of the code area are provided in the memory, and the computer is caused to further function as the offset-value setting program generating means for generating the offset-value setting program for setting the identification number and the identifier upon substituting the address value for the pointer and setting the offset value from the leading address of the data area or that of the code area; and the actual-address converting program generating means for generating the actual-address converting program for the conversion into the actual address by adding the leading address of the data area or that of the code area to the offset value upon using the pointer.

With this configuration, the identification number for identifying the module and the identifier for identifying whether to set the address of the data area of the module or to set the address of the code area are provided in the memory, and the offset-value setting program generating means generates the offset-value setting program for setting the identification number and the identifier upon substituting the address value for the pointer and setting the offset value from the leading address of the data area or that of the code area. Upon using the pointer, the actual-address converting program generating means generates the actual-address converting program for the conversion into the actual address by adding the leading address of the data area or that of the code area to the offset value. Accordingly, the fragmentation of the memory can be solved, thereby enabling the effective use of the memory.

In the above compiler program, it is preferable that the computer is caused to further function as the compaction program generating means for generating the compaction program for compacting each code area or each data area of the module, the searching program generating means for generating the searching program for searching whether or not there is any handle indicating the code area or the data area to be shifted by the compaction, and the handle relocating program generating means for generating the handle relocating program for relocating the handle if the handle indicating the code area or the data area is found, and the compaction program generating means generates the compaction program for compacting the code area or the data area after all the handles are relocated.

With this configuration, the searching program generating means generates the searching program for searching whether or not there is any handle indicating the code area or the data area to be shifted by the compaction. If the handle indicating the code area or the data area was found, the handle relocating program generating means generates the handle relocating program for relocating this handle. After all the handles are relocated, the compaction program generating means generates the compaction program for compacting the code area or the data area. Accordingly, the fragmentation of the memory can be solved, thereby enabling the effective use of the memory.

Further, the computer-readable storage medium storing the compiler program according to the present invention is the computer-readable storage medium storing the compiler program for converting the source program into the object program and causing the computer to function as the address saving program generating means for saving the address saving program for saving the data memory area address used by the calling program module included in the source program; the address setting program generating means for generating the address setting program for setting the data memory area address used by the other program module to be called by the calling program module; the transferring program generating means for generating the transferring program for the transfer from the first subprogram included in the calling program module to the second subprogram included in the other program module; the address resetting program generating means for generating the address resetting program for reading and resetting the saved data memory area address for the calling program module after the return from the second subprogram as the transfer end to the first subprogram; and the accessing program generating means for generating the accessing program for accessing the data memory area for the other program module using the relative address from the set data memory area address for the other program module when the other program module accesses the data memory area therefor included therein.

With this storage medium, the address saving program generating means generates the address saving program for saving the data memory area address used by the calling program module included in the source program. The address setting program generating means generates the address setting program for setting the data memory area address used by the other program module to be called by the calling program module. Further, the transferring program generating means generates the transferring program for the transfer from the first subprogram included in the calling program module to the second subprogram included in the other program module. The address resetting program generating means generates the address resetting program for reading and resetting the saved data memory area address for the calling program module after the return from the second subprogram as the transfer end to the first subprogram. The accessing program generating means generates the accessing program for accessing the data memory area for the other program module using the relative address from the set data memory area address for the other program module when the other program module accesses the data memory area therefor included therein.

Accordingly, even if the calling program module reenters the other program module, the data memory area address for the calling program module can be retracted since the data memory area address used by the calling program module is saved, and the reentrant object program can be generated since the data memory area address for the other program module to be called by the calling program module is set. Thus, dynamic links between the modules can be realized.

Further, the compiling method according to the present invention is for converting the source program into the object program and comprises the address saving program generating step of causing the computer to save the address saving program for saving the data memory area address used by the calling program module included in the source program; the address setting program generating step of causing the computer to generate the address setting program for setting the data memory area address used by the other program module to be called by the calling program module; the transferring program generating step of causing the computer to generate the transferring program for the transfer from the first subprogram included in the calling program module to the second subprogram included in the other program module; the address resetting program generating step of causing the computer to generate the address resetting program for reading and resetting the saved data memory area address for the calling program module after the return from the second subprogram as the transfer end to the first subprogram; and the accessing program generating step of causing the computer to generate the accessing program for accessing the data memory area using the relative address from the set data memory area address for the other program module when the other program module accesses the data memory area therefor included therein.

With this method, the address saving program for saving the data memory area address used by the calling program module included in the source program is generated in the address saving program generating step. The address setting program for setting the data memory area address used by the other program module to be called by the calling program module is generated in the address setting program generating step. Further, the transferring program for the transfer from the first subprogram included in the calling program module to the second subprogram included in the other program module is generated in the transferring program generating step. The address resetting program for reading and resetting the saved data memory area address for the calling program module after the return from the second subprogram as the transfer end to the first subprogram is generated in the address resetting program generating step. The accessing program for accessing the data memory area for the other program module using the relative address from the set data memory area address for the other program module when the other program module accesses the data memory area therefor included therein is generated in the accessing program generating step.

Accordingly, even if the calling program module reenters the other program module, the data memory area address for the calling program module can be retracted since the data memory area address used by the calling program module is saved, and the reentrant object program can be generated since the data memory area address for the other program module to be called by the calling program module is set. Thus, dynamic links between the modules can be realized.

Further, the compiling unit according to the present invention is for converting the source program into the object program and comprises the address saving program generating means for saving the address saving program for saving the data memory area address used by the calling program module included in the source program; the address setting program generating means for generating the address setting program for setting the data memory area address used by the other program module to be called by the calling program module; the transferring program generating means for generating the transferring program for the transfer from the first subprogram included in the calling program module to the second subprogram included in the other program module; the address resetting program generating means for generating the address resetting program for reading and resetting the saved data memory area address for the calling program module after the return from the second subprogram as the transfer end to the first subprogram; and the accessing program generating means for generating the accessing program for accessing the data memory area for the other program module using the relative address from the set data memory area address for the other program module when the other program module accesses the data memory area therefor included therein.

With this construction, the address saving program generating means generates the address saving program for saving the data memory area address used by the calling program module included in the source program. The address setting program generating means generates the address setting program for setting the data memory area address used by the other program module to be called by the calling program module. Further, the transferring program generating means generates the transferring program for the transfer from the first subprogram included in the calling program module to the second subprogram included in the other program module. The address resetting program generating means generates the address resetting program for reading and resetting the saved data memory area address for the calling program module after the return from the second subprogram as the transfer end to the first subprogram. The accessing program generating means generates the accessing program for accessing the data memory area for the other program module using the relative address from the set data memory area address for the other program module when the other program module accesses the data memory area therefor included therein.

Accordingly, even if the calling program module reenters the other program module, the data memory area address for the calling program module can be retracted since the data memory area address used by the calling program module is saved, and the reentrant object program can be generated since the data memory area address for the other program module to be called by the calling program module is set. Thus, dynamic links between the modules can be realized.

Further, the object program according to the present invention is generated by converting the source program and causes the computer to function as the address saving means for saving the data memory area address used by the calling program module included in the source program; the address setting means for setting the data memory area address used by the other program module to be called by the calling program module; the transferring means for executing the transfer from the first subprogram included in the calling program module to the second subprogram included in the other program module; the address resetting means for reading and resetting the data memory area address for the calling program module saved by the address saving means after the return from the second subprogram as the transfer end of the transferring means end to the first subprogram; and the accessing means for accessing the data memory area for the other program module using the relative address from the data memory area address for the other program module set by the address setting means when the other program module accesses the data memory area therefor included therein.

With this configuration, the address saving means saves the data memory area address used by the calling program module included in the source program. The address setting means sets the data memory area address used by the other program module to be called by the calling program module. Further, the transferring means executes the transfer from the first subprogram included in the calling program module to the second subprogram included in the other program module. The address resetting means reads and resets the data memory area address for the calling program module saved by the address saving means after the return from the second subprogram as the transfer end to the first subprogram. The accessing means accesses the data memory area for the other program module using the relative address from the set data memory area address for the other program module when the other program module accesses the data memory area therefor included therein.

Accordingly, even if the calling program module reenters the other program module, the data memory area address for the calling program module can be retracted since the data memory area address used by the calling program module is saved, and the reentrant object program can be generated since the data memory area address for the other program module to be called by the calling program module is set. Thus, dynamic links between the modules can be realized.

Further, the computer-readable storage medium storing the compiler program according to the present invention is the computer-readable storage medium storing the object program generated by converting the source program and causing the computer to function as the address saving means for saving the data memory area address used by the calling program module included in the source program; the address setting means for setting the data memory area address used by the other program module to be called by the calling program module; the transferring means for executing the transfer from the first subprogram included in the calling program module to the second subprogram included in the other program module; the address resetting means for reading and resetting the data memory area address for the calling program module saved by the address saving means after the return from the second subprogram as the transfer end of the transferring means to the first subprogram; and the accessing means for accessing the data memory area for the other program module using the relative address from the data memory area address for the other program module set by the address setting means when the other program module accesses the data memory area therefor included therein.

With this configuration, the address saving means saves the data memory area address used by the calling program module included in the source program. The address setting means sets the data memory area address used by the other program module to be called by the calling program module. Further, the transferring means executes the transfer from the first subprogram included in the calling program module to the second subprogram included in the other program module. The address resetting means reads and resets the data memory area address for the calling program module saved by the address saving means after the return from the second subprogram as the transfer end to the first subprogram. The accessing means accesses the data memory area for the other program module using the relative address from the set data memory area address for the other program module when the other program module accesses the data memory area therefor included therein.

Accordingly, even if the calling program module reenters the other program module, the data memory area address for the calling program module can be retracted since the data memory area address used by the calling program module is saved, and the reentrant object program can be generated since the data memory area address for the other program module to be called by the calling program module is set. Thus, dynamic links between the modules can be realized.

Further, the object program executing method according to the present invention is for executing the object program generated by converting the source program and comprises the address saving step of causing the computer to save the data memory area address used by the calling program module included in the source program; the address setting step of causing the computer to set the data memory area address used by the other program module to be called by the calling program module; the transferring step of causing the computer to execute the transfer from the first subprogram included in the calling program module to the second subprogram included in the other program module; the address resetting step of causing the computer to read and reset the data memory area address for the calling program module saved by the address saving means after the return from the second subprogram as the transfer end in the transferring step to the first subprogram; and the accessing step of causing the computer to access the data memory area for the other program module using the relative address from the data memory area address for the other program module set by the address setting means when the other program module accesses the data memory area therefor included therein.

With this method, the data memory area address used by the calling program module included in the source program is saved in the address saving step. The data memory area address used by the other program module to be called by the calling program module is set in the address setting step. Further, the transfer from the first subprogram included in the calling program module to the second subprogram included in the other program module is executed in the transferring step. In the address resetting step, the saved data memory area address for the calling program module is read and reset after the return from the second subprogram as the transfer end in the transferring step to the first subprogram. In the accessing step, the data memory area for the other program module is accessed using the relative address from the set data memory area address for the other program module when the other program module accesses the data memory area therefor included therein.

Accordingly, even if the calling program module reenters the other program module, the data memory area address for the calling program module can be retracted since the data memory area address used by the calling program module is saved, and the reentrant object program can be generated since the data memory area address for the other program module to be called by the calling program module is set. Thus, dynamic links between the modules can be realized.

Further, the object program executing unit according to the present invention is for executing the object program generated by converting the source program and comprises the address saving means for saving the data memory area address used by the calling program module included in the source program; the address setting means for setting the data memory area address used by the other program module to be called by the calling program module; the transferring means for executing the transfer from the first subprogram included in the calling program module to the second subprogram included in the other program module; the address resetting means for reading and resetting the data memory area address for the calling program module saved by the address saving means after the return from the second subprogram as the transfer end of the transferring means to the first subprogram; and the accessing means for accessing the data memory area for the other program module using the relative address from the data memory area address for the other program module set by the address setting means when the other program module accesses the data memory area therefor included therein.

With this construction, the address saving means saves the data memory area address used by the calling program module included in the source program. The address setting means sets the data memory area address used by the other program module to be called by the calling program module. Further, the transferring means executes the transfer from the first subprogram included in the calling program module to the second subprogram included in the other program module. The address resetting means reads and resets the saved data memory area address for the calling program module after the return from the second subprogram as the transfer end to the first subprogram. The accessing means accesses the data memory area for the other program module using the relative address from the set data memory area address for the other program module when the other program module accesses the data memory area therefor included therein.

Accordingly, even if the calling program module reenters the other program module, the data memory area address for the calling program module can be retracted since the data memory area address used by the calling program module is saved, and the reentrant object program can be generated since the data memory area address for the other program module to be called by the calling program module is set. Thus, dynamic links between the modules can be realized.

In the above object program executing unit, it is preferable that the calling program module includes the code area and the data area; the other program module includes the code area and the data area; and the object program executing unit further comprises the identification-number designating means for designating the identification number for identifying the calling program module and the one for identifying the other program module; the table preparing means for preparing the table relating the identification number of the calling program module designated by the identification-number designating means to the leading address of the data area of the calling program module and relating the identification number of the other program module designated by the identification-number designating means to the leading address of the data area of the other program module; the identification-number obtaining means for obtaining the identification number of the other program module upon the receipt of the call command to the other program from the calling program module; the leading-address obtaining means for obtaining the leading address of the data area of the other program module from the table prepared by the table generating means using the identification number obtained by the identification-number obtaining means as an index; and the leading-address switching means for switching the leading address of the data area of the other program module obtained by the leading-address obtaining means and the leading address of the data area of the calling program module.

With this construction, the calling program module includes the code area and the data area; the other program module includes the code area and the data area; and the identification-number designating means designates the identification number for identifying the calling program module and the one for identifying the other program module. Then, the table preparing means prepares the table relating the designated identification number of the calling program module to the leading address of the data area of the calling program module and relating the designated identification number of the other program module to the leading address of the data area of the other program module. The identification-number obtaining means obtains the identification number of the other program module upon the receipt of the call command to the other program from the calling program module. The leading-address obtaining means obtains the leading address of the data area of the other program module from the table prepared by the table generating means using the obtained identification number as an index. The leading-address switching means switches the obtained leading address of the data area of the other program module and the leading address of the data area of the calling program module.

Accordingly, by preparing the table for the address conversion not page by page, but module by module, the amount of the data of the table can be reduced and the table can conform to small-size apparatuses having a strict resource restriction.

Further, in the above object program executing unit, it is preferable that the calling program module includes the code area and the data area; the other program module includes the code area and the data area; and the object program executing unit further comprises the identification-number designating means for designating the identification number for identifying the calling program module and the one for identifying the other program module; and the table preparing means for preparing the table relating the identification number of the calling program module designated by the identification-number designating means to the leading address of the data area of the calling program module and relating the identification number of the other program module designated by the identification-number designating means to the leading address of the data area of the other program module.

With this construction, the calling program module includes the code area and the data area, the other program module includes the code area and the data area, and the identification-number designating means designates the identification number for identifying the calling program module and the one for identifying the other program module. Then, the table preparing means for preparing the table relating the designated identification number of the calling program module to the leading address of the data area of the calling program module and relating the designated identification number of the other program module to the leading address of the data area of the other program module.

Accordingly, by preparing the table for the address conversion not page by page, but module by module, the amount of the data of the table can be reduced and the table can conform to small-size apparatuses having a strict resource restriction.

Although the present invention has been described in detail, the above description is only an example in all aspects and the present invention is not limited thereto. It should be appreciated that countless unillustrated modifications and embodiments can be supposed without departing from the scope of the present invention.

INDUSTRIAL APPLICABILITY

The compiler program, the computer-readable storage medium storing the compiler program, the compiling method and the compiling unit according to the present invention enable the automatic generation of a reentrant object program and are effectively usable as a compiler program, a computer-readable storage medium storing the compiler program, a compiling method, a compiling unit and the like for converting a source program written in a certain program language into an object program to be executed by a certain computer.

The invention claimed is:

1. A computer-readable storage medium storing a compiler program for converting a source program into an object program, the compiler program causing a computer to function as:
an address saving program generating means for generating an address saving program for saving in a memory a data memory area address used by a calling program module included in the source program,
an address setting program generating means for generating an address setting program for setting a data memory area address used by an other program module to be called by the calling program module,
a transferring program generating means for generating a transferring program for the transfer from a first subprogram included in the calling program module to a second subprogram included in the other program module,
an address resetting program generating means for generating an address resetting program for reading and resetting the data memory area address saved in the memory for the calling program module after the return from the second subprogram as a transfer end to the first subprogram, and
an accessing program generating means for generating an accessing program for accessing a data memory area for the other program module using a relative address from the set data memory area address for the other program module when the other program module accesses the data memory area therefor included therein.

2. A computer-readable storage medium storing a compiler program according to claim 1, wherein:
the computer is caused to further function as a discriminating means for discriminating whether or not to shorten a process based on a description of the other program module including the second subprogram to be called from the first subprogram included in the calling program module included in the source program,
if the discriminating means discriminates the process not to be shortened,
the address saving program generating means generates the address saving program for saving the data memory area address used by the calling program module,
the address setting program generating means generates the address setting program for setting the data memory area address used by the other program module to be called by the calling program module,
the transferring program generating means generates the transferring program for the transfer from the first subprogram included in the calling program module to the second subprogram included in the other program module,
the address resetting program generating means generates the address resetting program for reading and resetting the saved data memory area address for the calling program module after the return from the second subprogram as the transfer end to the first subprogram, and
the accessing program generating means generates the accessing program for accessing the data memory area for the other program module using the relative address from the set data memory area address for the other program module when the other program module accesses the data memory area therefor included therein, and
if the discriminating means discriminates the process to be shortened,
the transferring program generating means generates the transferring program for the transfer from the first subprogram included in the calling program module to the second subprogram included in the other program module, and
the accessing program generating means generates the accessing program for accessing the data memory area for the other program module using the relative address from the data memory area address for the calling program module when the other program module accesses the data memory area therefor included therein.

3. A computer-readable storage medium storing a compiler program according to claim 1, wherein, after the second subprogram included in the other program module is called from the first subprogram included in the calling program module included in the source program;

the address setting program generating means generates an address setting program for reading the data memory area address for the other program module from data memory area address tables for the respective program modules saved in executing units of the calling program module and setting this data memory area address, and the accessing program generating means generates the accessing program for accessing the data memory area for the other program module using the relative address from the set data memory area address for the other program module when the other program module accesses the data memory area therefor included therein.

4. A computer-readable storage medium storing a compiler program according to claim 3, wherein the computer is caused to further function as a discriminating means for discriminating whether or not to shorten a process based on a description of the other program module including the second subprogram to be called from the first subprogram included in the calling program module included in the source program, if the discriminating means discriminates the process not to be shortened, after the second subprogram included in the other program module is called from the first subprogram included in the calling program module included in the source program:

the address setting program generating means generates the address setting program for reading the data memory area address for the other program module from the data memory area address tables for the respective program modules saved in executing units of the calling program module and setting this data memory area address, and the accessing program generating means generates the accessing program for accessing the data memory area for the other program module using the relative address from the set data memory area address for the other program module when the other program module accesses the data memory area therefor included therein, and if the discriminating means discriminates the process to be shortened, the accessing program generating means generates the accessing program for accessing the data memory area for the other program module using the relative address from the data memory area address for the calling program module when the other program module accesses the data memory area therefor included therein.

5. A computer-readable storage medium storing a compiler program according to claim 2, wherein the description of the other program module including the second subprogram to be called from the first subprogram included in the calling program module included in the source program is a declaration described for each second subprogram.

6. A computer-readable storage medium storing a compiler program according to claim 1, wherein the source program including the other program module including the second subprogram to be called by the calling program module includes a description for specifying which of an execution common data memory area for the other program module external variables included in the other program module commonly access upon a plurality of executions of the calling program module and an execution intrinsic data memory areas for the other program module the external variables included in the other program module commonly access every time the calling program module is executed is to be used.

7. A computer-readable storage medium storing a compiler program according to claim 6, wherein the description for specifying which of the execution common data memory area for the other program module and the execution intrinsic data memory area for the other program module is to be used is a declaration described for each external variable included in the other program module.

8. A computer-readable storage medium storing a compiler program according to claim 6, wherein:

the address saving program generating means generates an address saving program for saving an execution common data memory area address for the calling program module and an execution intrinsic data memory area address for the calling program module, the address setting program generating means generates an address setting program for setting the execution common data memory area address for the other program module to be called by the calling program module and setting the execution intrinsic data memory area address for the other program module to be called by the calling program module, the transferring program generating means generates the transferring program for the transfer from the first subprogram to the second subprogram, the address resetting program generating means generates an address resetting program for reading and resetting the saved execution intrinsic data memory area address and execution common data memory area address for the calling program module after the return from the second subprogram as the transfer end to the first subprogram, and the accessing program generating means generates an accessing program for accessing the execution intrinsic data memory area for the other program using a relative address from the set execution intrinsic data memory area address for the other program module when the other program module accesses the execution intrinsic data memory area address therefor included therein and accessing the execution common data memory area for the other program using a relative address from the set execution common data memory area address for the other program module when the other program module accesses the execution intrinsic data memory area address therefor included therein.

9. A computer-readable storage medium storing a compiler program according to claim 6, wherein, after the other program module is called from the calling program module included in the source program:

the address setting program generating means generates an address setting program for reading the execution intrinsic data memory area address for the other program module and the execution common data memory area address for the other program module commonly accessed by a plurality of executions of the calling program module from the data memory area address tables for the respective program modules saved in executing units of the calling program module and setting these data memory area addresses, and the accessing program generating means generates an accessing program for accessing the execution intrinsic data memory area for the other program using a relative address from the set execution intrinsic data memory area address for the other program module when the other program module accesses the execution intrinsic data memory area address therefor included therein and accessing the execution common data memory area for the other program using a relative address from the set execution common data memory area address for the other program module when the other program module accesses the execution intrinsic data memory area address therefor included therein.

10. A computer-readable storage medium storing a compiler program according to claim 1, wherein the address saving program generating means generates an address saving program for saving the execution common data memory area address and the execution intrinsic data memory area address for the calling program module in a stack memory prior to data necessary for the transfer from the first subprogram to the second subprogram.

11. A computer-readable storage medium storing a compiler program according to claim 1, wherein the calling program module included in the source program and the other program module including the second subprogram to be called from the first subprogram included in the calling program module are the same program module.

12. A computer-readable storage medium storing a compiler program according to claim 1, wherein the calling program module includes a code area and a data area, the other program module includes a code area and a data area, and the computer is caused to further function as:
an identification-number obtaining program generating means for generating an identification-number obtaining program for obtaining an identification number for identifying the other program module upon the receipt of a call command to the other program module from the calling program module,
a leading-address obtaining program generating means for generating a leading-address obtaining program for obtaining the leading address of the data area of the other program module using the obtained identification number as an index from a table relating an identification number of the calling program module to the leading address of the data area of the calling program module and relating the identification number of the other program module to the leading address of the data area of the other program module, and
a leading-address switching program generating means for generating a leading-address switching program for switching the obtained leading address of the data area of the other program module and the leading address of the data area of the calling program module.

13. A computer-readable storage medium storing a compiler program according to claim 1, wherein the calling program module includes a code area and a data area, the other program module includes a code area and a data area, and the computer is caused to further function as:
an identification-number designating program generating means for generating an identification-number generating program for designating an identification number for identifying the calling program module and an identification number for identifying the other program module,
a table preparing program generating means for generating a table preparing program for preparing a table relating the designated identification number of the calling program module to the leading address of the data area of the calling program module and relating the designated identification number of the other program module to the leading address of the data area of the other program module,
an identification-number obtaining program generating means for generating an identification-number obtaining program for obtaining the identification number of the other program module upon the receipt of a call command to the other program module from the calling program module,
a leading-address obtaining program generating means for generating a leading-address obtaining program for obtaining the leading address of the data area of the other program module from the prepared table using the obtained identification number as an index, and
a leading-address switching program generating means for generating a leading-address switching program for switching the obtained leading address of the data area of the other program module and the leading address of the data area of the calling program module.

14. A computer-readable storage medium storing a compiler program according to claim 1, wherein the computer is caused to further function as an address latching program generating means for generating an address latching program for latching an address of a variable or function defined outside the other program module, and the accessing program generating means generates an accessing program for accessing a variable defined inside the other program module using a relative address from the obtained leading address, accesses a function defined inside the other program module using a relative address from a program counter, and indirectly accessing the variable or function defined outside the other program module via the latched address after accessing the latched address using a relative address from the obtained leading address.

15. A computer-readable storage medium storing a compiler program according to claim 1, wherein the computer is caused to further function as:
an ending program generating means for generating an ending program for ending an application comprised of at least one module and being presently executed,
a compaction program generating means for generating a compaction program for compacting a memory after the application is ended, and
a resuming program generating means for generating a resuming program for resuming the application from the beginning after the memory is compacted.

16. A computer-readable storage medium storing a compiler program according to claim 1, wherein the computer is caused to further function as:
an ending program generating means for generating an ending program for ending an application comprised of at least one module and being presently executed,
a saving program generating means for generating a saving program for saving information independent of address values of the application until the application was ended,
a compaction program generating means for generating a compaction program for compacting a memory, and
an executing program generating means for generating an executing program for reading the saved information and executing the application up to a state where the application was ended based on the read information after the memory is compacted.

17. A computer-readable storage medium storing a compiler program according to claim 1, wherein an identifier indicating whether or not to save an address value is provided in a memory, and the computer is caused to further function as:
- a memory-state saving program generating means for generating a memory state saving program for saving the state of the memory before the compaction, a compaction program generating means for generating a compaction program for compacting the memory, and
- a relocating program generating means for generating a relocating program for relocating the address value based on the identifier for an entry having the address value set by referring to the saved state of the memory before the compaction, after the memory is compacted.

18. A computer-readable storage medium storing a compiler program according to claim 1, wherein an address-value memory for saving address values and a non-address-value memory for saving values other than address values are provided, and the computer is caused to further function as:
- a memory-state saving program generating means for generating a memory-state saving program for saving the states of the address-value memory and the non-address-value memory before the compaction,
- a compaction program generating means for generating a compaction program for compacting the address-value memory and the non-address-value,
- a relocating program generating means for generating a relocating program for relocating the address values of only the address-value memory by referring to the saved state of the address-value memory before the compaction, after the address-value memory and the non-address-value memory are compacted.

19. A computer-readable storage medium storing a compiler program according to claim 1, wherein identification numbers for identifying the modules and identifiers indicating whether to set addresses of data areas of the modules or to set addresses of code areas of the modules are provided in a memory, and the computer is caused to further function as:
- a setting program generating means for generating a setting program for setting the identification number and the identifier upon substituting an address value for a pointer,
- a compaction program generating means for generating a compaction program for compacting the memory, and
- a recalculating program generating means for generating a recalculating program for recalculating the address value based on the identification number and the identifier after the memory is compacted.

20. A computer-readable storage medium storing a compiler program according to claim 1, wherein identification numbers for identifying the modules and identifiers indicating whether to set addresses of data areas of the modules or to set addresses of code areas of the modules are provided in a memory, and the computer is caused to further function as:
- an offset-value setting program generating means for generating an offset-value setting program for setting the identification number and the identifier upon substituting an address value for a pointer and setting an offset value from the leading address of the data area or the leading address of the code area, and
- an actual-address converting program generating means for generating an actual-address converting program for the conversion into an actual address by adding the leading address of the data area or the leading address of the code area to the offset value upon using the pointer.

21. A computer-readable storage medium storing a compiler program according to claim 1, wherein the computer is caused to further function as:
- a compaction program generating means for generating a compaction program for compacting each code area of the modules or each data area of the modules,
- a searching program generating means for generating a searching program for searching whether or not there is any handle indicating the code area or the data area shifted by the compaction, and
- a handle relocating program generating means for generating a handle relocating program for relocating the handle if the handle indicating the code area or the data area is found,
- wherein the compaction program generating means generates the compaction program for compacting the code areas or the data areas after all the handles are relocated.

22. A compiling method implemented by a compiling unit comprising a program storage and a program executing unit for converting a source program into an object program, the compiling method comprising:
- a step of causing a computer to generate an address saving program for saving in a memory a data memory area address used by a calling program module included in the source program,
- a step of causing the computer to generate an address setting program for setting a data memory area address used by an other program module to be called by the calling program module,
- a step of causing the computer to generate a transferring program for the transfer from a first subprogram included in the calling program module to a second subprogram included in the other program module,
- a step of causing the computer to generate an address resetting program for reading and resetting the data memory area address saved in the memory for the calling program module after the return from the second subprogram as a transfer end to the first subprogram, and
- a step of causing the computer to generate an accessing program for accessing a data memory area for the other program module using a relative address from the set data memory area address for the other program module when the other program module accesses the data memory area therefor included therein.

23. A compiling unit for converting a source program into an object program, the compiling unit comprising:
- a program storage; and
- a program executing unit comprising:
  - an address saving program generating means for generating an address saving program for saving in a memory a data memory area address used by a calling program module included in the source program,
  - an address setting program generating means for generating an address setting program for setting a data memory area address used by an other program module to be called by the calling program module,
  - a transferring program generating means for generating a transferring program for the transfer from a first subprogram included in the calling program module to a second subprogram included in the other program module,
  - an address resetting program generating means for generating an address resetting program for reading and resetting the saved data memory area address saved in the memory for the calling program module after the return from the second subprogram as a transfer end to the first subprogram, and
  - an accessing program generating means for generating an accessing program for accessing a data memory area for the other program module using a relative address from the set data memory area address for the other program module when the other program module accesses the data memory area therefor included therein.

24. A computer-readable storage medium storing an object program generated by converting a source program and causing a computer to functions as:
an address saving means for saving in a memory a data memory area address used by a calling program module included in the source program,
an address setting means for setting a data memory area address used by an other program module to be called by the calling program module,
a transferring means for executing the transfer from a first subprogram included in the calling program module to a second subprogram included in the other program module,
an address resetting means for reading and resetting the data memory area address saved in the memory for the calling program module after the return from the second subprogram as a transfer end to the first subprogram, and
an accessing means for accessing a data memory area for the other program module using a relative address from the set data memory area address for the other program module when the other program module accesses the data memory area therefor included therein.

25. An object program executing method implemented by a computing unit comprising a program storage and an object program executing unit for executing an object program generated by converting a source program, the object program executing method comprising:
an address saving step of causing a computer to save in a memory a data memory area address used by a calling program module included in the source program,
an address setting step of causing the computer to set a data memory area address used by an other program module to be called by the calling program module,
a transferring step of causing the computer to execute the transfer from a first subprogram included in the calling program module to a second subprogram included in the other program module,
an address resetting step of causing the computer to read and reset the-saved data memory area address saved in the memory for the calling program module after the return from the second subprogram as a transfer end to the first subprogram, and
an accessing step of causing the computer to access a data memory area for the other program module using a relative address from the set data memory area address for the other program module when the other program module accesses the data memory area therefor included therein.

26. An-A computing unit comprising:
a program storage; and
an object program executing unit for executing an object program generated by converting a source program, the object program executing unit comprising:
an address saving means for saving in a memory a data memory area address used by a calling program module included in the source program,
an address setting means for setting a data memory area address used by an other program module to be called by the calling program module,
a transferring means for executing the transfer from a first subprogram included in the calling program module to a second subprogram included in the other program module,
an address resetting means for reading and resetting the-saved data memory area address saved in the memory for the calling program module after the return from the second subprogram as a transfer end to the first subprogram, and
an accessing means for accessing a data memory area for the other program module using a relative address from the set data memory area address for the other program module when the other program module accesses the data memory area therefor included therein.

27. A computing unit according to claim 26, wherein the calling program module includes a code area and a data area, the other program module includes a code area and a data area, and the object program executing unit further comprises:
an identification-number designating means for designating an identification number for identifying the calling program module and an identification number for identifying the other program module,
a table preparing means for preparing a table relating the identification number of the calling program module designated by the identification-number designating means to the leading address of the data area of the calling program module and relating the identification number of the other program module designated by the identification-number designating means to the leading address of the data area of the other program module,
an identification-number obtaining means for obtaining the identification number of the other program module upon the receipt of a call command to the other program module from the calling program module,
a leading-address obtaining means for obtaining the leading address of the data area of the other program module from the table prepared by the table preparing means using the identification number obtained by the identification-number obtaining means as an index, and
a leading-address switching means for switching the leading address of the data area of the other program module obtained by the leading-address obtaining means and the leading address of the data area of the calling program module.

28. A computing unit according to claim 26, wherein the calling program module includes a code area and a data area, the other program module includes a code area and a data area, and the object program executing unit further comprises:
an identification-number designating means for designating an identification number for identifying the calling program module and an identification number for identifying the other program module, and
a table preparing means for preparing a table relating the identification number of the calling program module designated by the identification-number designating means to the leading address of the data area of the calling program module and relating the identification number of the other program module designated by the identification-number designating means to the leading address of the data area of the other program module.

29. A computer-readable storage medium storing a compiler program according to claim 4, whereins the description of the other program module including the second subprogram to be called from the first subprogram included in the calling program module included in the source program is a declaration described for each second subprogram.

* * * * *